US009760915B2

(12) United States Patent
Pavlou et al.

(10) Patent No.: US 9,760,915 B2
(45) Date of Patent: Sep. 12, 2017

(54) SYSTEM AND METHOD FOR PREPARING MULTI-LEVEL TAX RETURNS

(75) Inventors: Pavlos T. Pavlou, Long Grove, IL (US); Nicholas M. Mavros, Mt. Prospect, IL (US)

(73) Assignee: PTP Oneclick, LLC, Riverwoods, IL (US)

( * ) Notice: Subject to any disclaimer, the term of this patent is extended or adjusted under 35 U.S.C. 154(b) by 2010 days.

(21) Appl. No.: 11/701,226

(22) Filed: Feb. 1, 2007

(65) Prior Publication Data

US 2009/0132399 A1 May 21, 2009

(51) Int. Cl.
*G06Q 40/00* (2012.01)
*G06Q 30/04* (2012.01)

(52) U.S. Cl.
CPC .......... *G06Q 30/04* (2013.01); *G06Q 40/123* (2013.12)

(58) Field of Classification Search
USPC .................................. 705/31, 32, 35, 36, 37
See application file for complete search history.

(56) References Cited

U.S. PATENT DOCUMENTS

| | | | | |
|---|---|---|---|---|
| 3,944,801 | A | 3/1976 | Montana | |
| 3,946,217 | A | 3/1976 | Tsujikawa et al. | |
| 3,946,220 | A | 3/1976 | Brobeck et al. | |
| 3,963,910 | A | 6/1976 | Enomoto et al. | |
| 5,772,251 | A | 6/1998 | Fleck | |
| 5,799,283 | A | 8/1998 | Francisco et al. | |
| 5,875,433 | A | 2/1999 | Francisco et al. | |
| H1830 | H | 1/2000 | Petrimoulx et al. | |
| 6,078,899 | A | 6/2000 | Francisco et al. | |
| 2004/0002906 | A1 * | 1/2004 | Von Drehnen et al. | 705/31 |
| 2005/0209939 | A1 * | 9/2005 | Joseph et al. | 705/31 |
| 2005/0251733 | A1 * | 11/2005 | Elkady | 715/503 |
| 2006/0111990 | A1 * | 5/2006 | Cohen et al. | 705/32 |

OTHER PUBLICATIONS

WoltersKluwer Company, Home Page, Oct. 2005, Chicago, Illinois www.SalesTax.com.
Aptax, Home Page, Oct. 2005, www.ziptax.com.
eFileSolutions, Inc. , Home Page, Oct. 2005. www.trustfile.com.
First Data, Home Page, Oct. 2005, www.taxware.com.

* cited by examiner

*Primary Examiner* — Shay S Glass
(74) *Attorney, Agent, or Firm* — McCracken & Gillen LLC

(57) ABSTRACT

A system for calculating and preparing state and local sales and use tax returns suitable for filing with state and local municipal taxing authorities is disclosed. The system in accordance with the present invention provides a total solution for sales and use taxes and is configured to not only determine and prepare state and use tax returns but also calculates and prepares returns of all local taxing authorities where the taxpayer conducts business. Thus, the system in accordance with the present invention is able to provide a total solution for determining and preparing state and local sales and use tax returns. The system is also able to easily and effortlessly prepare local municipal sales and use tax returns that are cumbersome.

22 Claims, 118 Drawing Sheets

Company

Name
Ibt
Fein
Address
City
State
Zip
Contact
ContactLast
Telephone
ContactSSN
ContactTitle
Locations
EntityType
KOB
TaxDue
Returns
DBATradeName
AddressSuiteNumber
ERO
EFIN
PIN
PhoneExtension
FaxNumber
EmailAddress

CompanyCredit

Name
Ibt
State
Month
Year
Return
CreditType
CreditAmount

CompanyMonthlyPayments

Name
Ibt
Return
Month
Year
NetTaxableSales
TaxDue
TaxPayment

Location

Name
Ibt
Address
City
State
Zip
County
SiteName
MPEA
LakeMichigan
North
West
South
East
SupportedCountyGas
SupportedCityGas
SupportedCityFood
RGeneralHigh
RFoodHigh
RGeneralLow
RFoodLow
PGeneralHigh
PFoodHigh
PGeneralLow
PFoodLow
SAutoHigh
SAutoLow
SAutoMedFeePercent
SAutoMaxMedFee
StartDate
EndDate

Location

Name
Ibt
Month
Year
StateTaxDue
Returns
LiabilityRequirement
Preparer
MonthNo
Status

UnsupportedLocalRates

State
County
City
Return
Item
Rate

UnsupportedLocalRates

Name
Ibt
Address
City
State
Month
Year
LiabilityRequirement
OnTime
AlocoholPurchases
OtherPurchasesRate
OtherPurcahasesCost
GenMerchandiseOutOfState
FoodOutofState

Preparers

PreparerID
Username
Password
CompanyName
CompanyAddress
CompanyAddress2
CompanyCity
CompanyState
CompanyZip
PreparerFirstName
PreparerLastName
Telephone
Fax
SSN
Email
SendEmail
GetRates

FIG. 2A

Deductions

Name
Ibt
Address
City
State
Month
Year
LiabilityRequirement
OnTime
ResaleExemptioSales
InterstateCommerce
CashRedundsReturns
Newpapermagazines
RepairsLaborCost
RescrptnExessCost
OtherDeliveryInstall
OtherDescription
OtherDescriptionCost
OtherDescription2
OtherDescriptionCost2
OtherDescription3
OtherDescriptionCost3
OtherDescription4
OtherDescriptionCost4
ExemptOrgSales
FoodStamps
BuildingMaterials
ManufacMachinery
FarmMachinery
GraphicArtsMachinery
OtherDescription5
OtherDescriptionCost5
OtherDescription6
OtherDescriptionCost6
OtherDescription7
OtherDescriptionCost7
OtherDescription8
OtherDescriptionCost8

Receipts

Name
Ibt
Address
City
State
Month
Year
LiabilityRequirement
OnTime
FoodImmedConsumpiton
NonAlcoholicBev
SoftDrinks
FountainSoftDrinks
GasAndOtherFuels
GasoholGallons
GasoholRcpts
DieselGallons
DieselRcpts
DieselholGallons
DieselholRcpts
OtherSpecialFuelsGallons
OtherSpecialFulesRcpts
Biodiesel90Gallons
Biodiesel90Rcpts
Biodiesel01Gallons
Biodiesel01Rcpts
Biodiesel100Gasslons
Biodiesel100Rcpts
MajorBlendEthanolGallons
MajorBlendEthanolRcpts
TangibleProducts
Services
OtherSales
CarWash
Tabacco
Lottery
NonFood
Newspapers
Delivery
Misc
GenMerchandise
FoodDrugsMedical
GenMerchandiseOutOfState
FoodOutOfState
ReceiptsAtOtherRatesRate
ReciptsAtOtherRates
TotalAllLocations
Preparer
SiteName

FIG. 2B

Table: Company Page: 1

Columns

| Name | Type | Size |
|---|---|---|
| Name | Text | 50 |
| Ibt | Text | 50 |
| Fein | Text | 50 |
| Address | Text | 50 |
| City | Text | 50 |
| State | Text | 2 |
| Zip | Text | 5 |
| Contact | Text | 50 |
| ContactLast | Text | 50 |
| Telephone | Text | 30 |
| ContactSSN | Text | 50 |
| ContactTitle | Text | 50 |
| Locations | Integer | 2 |
| EntityType | Text | 50 |
| KOB | Text | 50 |
| TaxDue | Text | 50 |
| Returns | Text | 200 |
| DBATradeName | Text | 50 |
| AddressSuiteNumber | Text | 20 |
| ERO | Text | 50 |
| EFIN | Text | 50 |
| PIN | Text | 50 |
| PhoneExtension | Text | 20 |
| FaxNumber | Text | 20 |
| EmailAddress | Text | 80 |

FIG. 2C

Table: CompanyCredits

Columns

| Name | Type | Size |
|---|---|---|
| Name | Text | 50 |
| Ibt | Text | 50 |
| State | Text | 2 |
| Month | Text | 50 |
| Year | Text | 50 |
| Return | Text | 50 |
| CreditType | Text | 50 |
| CreditAmount | Single | 4 |

FIG. 2D

Table: CompanyMonthlyPayments

Columns

| Name | Type | Size |
|---|---|---|
| Name | Text | 50 |
| Ibt | Text | 50 |
| Return | Text | 50 |
| Month | Text | 50 |
| Year | Text | 50 |
| NetTaxableSales | Single | 4 |
| TaxDue | Single | 4 |
| TaxPayment | Single | 4 |

FIG. 2E

Table: CompanyTaxDue

Columns

| Name | Type | Size |
|---|---|---|
| Name | Text | 50 |
| Ibt | Text | 50 |
| Month | Text | 50 |
| Year | Text | 50 |
| StateTaxDue | Long Integer | 4 |
| Returns | Text | 200 |
| LiabiltyRequirement | Text | 50 |
| Preparer | Text | 50 |
| MonthNo | Integer | 2 |
| Status | Text | 50 |

FIG. 2F

Table: Deductions

Columns

| Name | Type | Size |
|---|---|---|
| Name | Text | 50 |
| Ibt | Text | 50 |
| Address | Text | 50 |
| City | Text | 50 |
| State | Text | 2 |
| Month | Text | 50 |
| Year | Text | 50 |
| LiabiltyRequirement | Text | 50 |
| OnTime | Yes/No | 1 |
| ResaleExemptSales | Long Integer | 4 |
| InterstateCommerce | Long Integer | 4 |
| CashRefundsReturns | Long Integer | 4 |
| NewspaperMagazines | Long Integer | 4 |
| RepairsLaborCost | Long Integer | 4 |
| PrescrptnExcessCost | Long Integer | 4 |
| OtherDeliveryInstall | Long Integer | 4 |
| OtherDescription | Text | 100 |
| OtherDescriptionCost | Long Integer | 4 |
| OtherDescription2 | Text | 100 |
| OtherDescriptionCost2 | Long Integer | 4 |
| OtherDescription3 | Text | 100 |
| OtherDescriptionCost3 | Long Integer | 4 |
| OtherDescription4 | Text | 100 |
| OtherDescriptionCost4 | Long Integer | 4 |
| ExemptOrgSales | Long Integer | 4 |
| FoodStamps | Long Integer | 4 |
| BuildingMaterials | Long Integer | 4 |
| ManufacMachinery | Long Integer | 4 |
| FarmMachinery | Long Integer | 4 |

FIG. 2G

Table: Deductions

Columns

| | | |
|---|---|---|
| GraphicArtsMachinery | Long Integer | 4 |
| OtherDescription5 | Text | 100 |
| OtherDescriptionCost5 | Long Integer | 4 |
| OtherDescription6 | Text | 100 |
| OtherDescriptionCost6 | Long Integer | 4 |
| OtherDescription7 | Text | 100 |
| OtherDescriptionCost7 | Long Integer | 4 |
| OtherDescription8 | Text | 100 |
| OtherDescriptionCost8 | Long Integer | 4 |

FIG. 2H

Table: Location

Columns

| Name | Type | Size |
|---|---|---|
| Name | Text | 50 |
| Ibt | Text | 50 |
| Address | Text | 50 |
| City | Text | 50 |
| State | Text | 2 |
| Zip | Text | 5 |
| County | Text | 50 |
| SiteName | Text | 100 |
| MPEA | Text | 1 |
| LakeMichigan | Text | 1 |
| North | Text | 1 |
| West | Text | 1 |
| South | Text | 1 |
| East | Text | 1 |
| SupportedCountyGas | Yes/No | 1 |
| SupportedCityGas | Yes/No | 1 |
| SupportedCityFood | Yes/No | 1 |
| RGeneralHigh | Single | 4 |
| RFoodHigh | Single | 4 |
| RGeneralLow | Single | 4 |
| RFoodLow | Single | 4 |
| PGeneralHigh | Single | 4 |
| PFoodHigh | Single | 4 |
| PGeneralLow | Single | 4 |
| PFoodLow | Single | 4 |
| SAutoHigh | Single | 4 |
| SAutoLow | Single | 4 |
| SAutoMedFeePercent | Single | 4 |
| SAutoMaxMedFee | Single | 4 |
| StartDate | Date/Time | 8 |
| EndDate | Date/Time | 8 |

FIG. 2I

Table: Preparers

Columns

| Name | Type | Size |
|---|---|---|
| PreparerID | Long Integer | 4 |
| UserName | Text | 50 |
| Password | Text | 50 |
| CompanyName | Text | 50 |
| CompanyAddress | Text | 50 |
| CompanyAddress2 | Text | 50 |
| CompanyCity | Text | 50 |
| CompanyState | Text | 50 |
| CompanyZip | Text | 50 |
| PreparerFirstName | Text | 50 |
| PreparerLastName | Text | 50 |
| Telephone | Text | 50 |
| Fax | Text | 50 |
| SSN | Text | 50 |
| Email | Text | 100 |
| SendEmail | Yes/No | 1 |
| GetRates | Yes/No | 1 |

FIG. 2J

Table: Purchases

Columns

| Name | Type | Size |
|---|---|---|
| Name | Text | 50 |
| Ibt | Text | 50 |
| Address | Text | 50 |
| City | Text | 50 |
| State | Text | 2 |
| Month | Text | 50 |
| Year | Text | 50 |
| LiabiltyRequirement | Text | 50 |
| OnTime | Yes/No | 1 |
| AlocoholPurchases | Long Integer | 4 |
| OtherPurchasesRate | Single | 4 |
| OtherPurchasesCost | Long Integer | 4 |
| GenMerchandiseOutOfState | Long Integer | 4 |
| FoodOutOfState | Long Integer | 4 |

FIG. 2K

Table: Receipts

Columns

| Name | Type | Size |
|---|---|---|
| Name | Text | 50 |
| Ibt | Text | 50 |
| Address | Text | 50 |
| City | Text | 50 |
| State | Text | 2 |
| Month | Text | 50 |
| Year | Text | 50 |
| LiabiltyRequirement | Text | 50 |
| OnTime | Yes/No | 1 |
| FoodImmedConsumption | Long Integer | 4 |
| NonAlcoholicBev | Long Integer | 4 |
| AlcoholicBev | Long Integer | 4 |
| SoftDrinks | Long Integer | 4 |
| FountainSoftDrink | Long Integer | 4 |
| GasAndOtherFuels | Long Integer | 4 |
| GasoholGallons | Long Integer | 4 |
| GasoholRcpts | Long Integer | 4 |
| DieselGallons | Long Integer | 4 |
| DieselRcpts | Long Integer | 4 |
| DieselholGallons | Long Integer | 4 |
| DieselholRcpts | Long Integer | 4 |
| OtherSpecialFuelsGallons | Long Integer | 4 |
| OtherSpecialFuelsRcpts | Long Integer | 4 |
| Biodiesel90Gallons | Long Integer | 4 |
| Biodiesel90Rcpts | Long Integer | 4 |
| Biodiesel01Gallons | Long Integer | 4 |
| Biodiesel01Rcpts | Long Integer | 4 |
| Biodiesel100Gallons | Long Integer | 4 |
| Biodiesel100Rcpts | Long Integer | 4 |
| MajorBlendEthanolGallons | Long Integer | 4 |
| MajorBlendEthanolRcpts | Long Integer | 4 |
| TangibleProducts | Long Integer | 4 |

FIG. 2L

Table: Receipts

Columns

| | | |
|---|---|---|
| Services | Long Integer | 4 |
| OtherSales | Long Integer | 4 |
| CarWash | Long Integer | 4 |
| Tabacco | Long Integer | 4 |
| Lottery | Long Integer | 4 |
| NonFood | Long Integer | 4 |
| Newspapers | Long Integer | 4 |
| Delivery | Long Integer | 4 |
| Misc | Long Integer | 4 |
| GenMerchadise | Long Integer | 4 |
| FoodDrugsMedical | Long Integer | 4 |
| GenMerchadiseOutOfState | Long Integer | 4 |
| FoodOutOfState | Long Integer | 4 |
| ReceiptsAtOtherRatesRate | Single | 4 |
| ReceiptsAtOtherRates | Long Integer | 4 |
| TotalAllLocations | Long Integer | 4 |
| SiteName | Text | 100 |

FIG. 2M

Table: UnsupportedLocalRates

Columns

| Name | Type | Size |
|---|---|---|
| State | Text | 2 |
| County | Text | 50 |
| City | Text | 50 |
| Return | Text | 50 |
| Item | Text | 50 |
| Rate | Single | 4 |

FIG. 2N

Table: Address

Columns

| Name | Type | Size |
|---|---|---|
| ID | Long Integer | 4 |
| AddrLine1 | Text | 50 |
| AddrLine2 | Text | 50 |
| AddrLine3 | Text | 50 |
| AddrLine4 | Text | 50 |
| AddrCity | Text | 50 |
| AddrState | Text | 2 |
| Zip | Text | 5 |
| Zip4 | Text | 4 |

FIG. 3B

Table: Holidays

Columns

| Name | Type | Size |
|---|---|---|
| Date | Date/Time | 8 |
| Holiday | Text | 25 |
| Type | Text | 3 |

FIG. 3C

Table: LocalRates

Columns

| Name | Type | Size |
|---|---|---|
| State | Text | 2 |
| County | Text | 50 |
| City | Text | 50 |
| Return | Text | 50 |
| Item | Text | 50 |
| Rate | Single | 4 |
| RateYear | Integer | 2 |
| Month | Byte | 1 |
| DueDay | Byte | 1 |
| DueMonth | Byte | 1 |
| LatePayRate | Single | 4 |
| LatePayPeriod | Text | 10 |
| LateFileRateLow | Single | 4 |
| LateFileRateHigh | Single | 4 |
| LateFileAmount | Integer | 2 |
| LateFilePeriod | Text | 10 |
| InterestRate | Double | 8 |
| InterestPeriod | Text | 10 |
| CommisionRate | Single | 4 |
| CommisionAmount | Integer | 2 |

FIG. 3D

Table: OtherRates

Columns

| Name | Type | Size |
|---|---|---|
| Zip | Text | 5 |
| RateType | Text | 50 |
| Rate | Single | 4 |

FIG. 3E

Table: ReturnCredits

Columns

| Name | Type | Size |
|---|---|---|
| Return | Text | 50 |
| CreditType | Text | 50 |

FIG. 3F

Table: ReturnMail

Columns

| Name | Type | Size |
|---|---|---|
| State | Text | 2 |
| County | Text | 25 |
| City | Text | 25 |
| Form | Text | 50 |
| Address_ID | Long Integer | 4 |

FIG. 3G

Table: ReturnsAnnual

Columns

| Name | Type | Size |
|---|---|---|
| Return | Text | 50 |

FIG. 3H

Table: StateOtherRates

Columns

| Name | Type | Size |
|---|---|---|
| State | Text | 20 |
| County | Text | 20 |
| RateYear | Integer | 2 |
| RateMonth | Byte | 1 |
| Form | Text | 50 |
| RateName | Text | 25 |
| RateValue | Single | 4 |

FIG. 3I

Table: StateSalesRates

Columns

| Name | Type | Size |
|---|---|---|
| LocCode | Text | 50 |
| City | Text | 50 |
| County | Text | 50 |
| EffectiveDate | Text | 50 |
| RGeneralHigh | Single | 4 |
| RFoodHigh | Single | 4 |
| RGeneralLow | Single | 4 |
| RFoodLow | Single | 4 |
| ROverride | Text | 1 |
| PGeneralHigh | Single | 4 |
| PFoodHigh | Single | 4 |
| PGeneralLow | Single | 4 |
| PFoodLow | Single | 4 |
| POverride | Text | 1 |
| SAutoHigh | Single | 4 |
| SAutoLow | Single | 4 |
| SAutoMedFeePercent | Single | 4 |
| SAutoMaxMedFee | Single | 4 |
| SAutoOverride | Text | 1 |
| State | Text | 20 |
| RateYear | Integer | 2 |
| SemiAnnual | Byte | 1 |

FIG. 3J

Table: TaxFormList

Columns

| Name | Type | Size |
|---|---|---|
| FormID | Long Integer | 4 |
| State | Text | 2 |
| County | Text | 50 |
| City | Text | 50 |
| TaxFormName | Text | 50 |
| TaxFormPDFFile | Text | 50 |
| FormDescription | Text | 200 |
| ActiveDialogName | Text | 50 |
| AddressID | Long Integer | 4 |
| StartPoint | Long Integer | 4 |
| FileSize | Long Integer | 4 |

FIG. 3K

Table: Zip

Columns

| Name | Type | Size |
|---|---|---|
| ZipCode | Long Integer | 4 |
| State | Text | 2 |
| City | Text | 28 |
| CountyFips | Text | 5 |
| AreaCode | Text | 3 |

FIG. 3L

Table: Zipcodes

Columns

| Name | Type | Size |
|---|---|---|
| ZipCode | Long Integer | 4 |
| City | Text | 255 |
| State | Text | 255 |

FIG. 3M

File: stp_server_schema-v10.jpg Date: 1/14/07

File: stp_server_schema-v10.jpg Date: 1/14/07

PAVLOU SalesTaxPRO™ Main Window (cont.)

User Flow Chart

Enter Client Wizard

User Flow Chart

User Flow Chart

Client Wizard: Client Setup

Completing Client Wizard

User Flow Chart

Tax Preparation Wizard: Receipts (cont.)

User Flow Chart

User Flow Chart

Tax Preparation Wizard: Purchases

Tax Preparation Wizard: Purchases (part 1, cont.) User Flow Chart

Tax Preparation Wizard: Purchases (part 2 cont.)

User Flow Chart

Tax Preparation Wizard: Deductions (cont.)

User Flow Chart

Tax Preparation Wizard: Credits

User Flow Chart

Tax Preparation Wizard: Monthly Payments

User Flow Chart

Tax Preparation Wizard: Monthly Payments (cont.) User Flow Chart

View/Print Tax Returns

User Flow Chart

1. Open Transaction

2. Activate/Register

3. E-File

4. Get Started

This is a stand-alone task that waits for a message in the RETURN queue. The message triggers this task to find the corresponding Efile request, format the data and forward it to IDOR.

There are several ways that The System can interface with a Point of Sale (POS) equipment. In all cases the end result would be the same: Completely automate data collection and tax reporting.

BATCH METHOD

The diagram below illustrates a multi-level sales and use tax system.
The System can support all the tax levels shown below.
Furthermore it can adapt to support forms and requirements of any tax authority.

STEP 1.1

When the user starts The System and this screen is displayed.

The System is now ready to accept data.

STEP 2.2

User enters all required data for the client, clicks the Save button and then clicks the Next button to setup one or more business locations.

STEP 2.2

User enters all required data for the client, clicks the Save button and then clicks the Next button to setup one or more business locations.

STEP 2.3

User enters all required data for the business location and then clicks the Save button. User may either click the New Location button to enter a new location or the Next button to continue.

STEP 2.4

User has completed the client and location setup. User may now select to either begin preparing a tax return or exit the Client Wizard.

STEP 3.1

User selected to prepare a tax return which launches the Tax Wizard.

First the user is prompted to enter tax liability period. Then the user click the Next button to continue.

STEP 3.2

The Tax Wizard first collect Receipt data. The user may scroll down to enter different types of receipts. Please notice the DES PLAINES tab. If this client had multiple locations, each location would have it's own tab.
Depending on the data entered, various forms may be triggered. In the case below the Des Plaines Food and Beverage Tax and the Des Plaines Motor Fuel Tax forms are triggered. Additionally, because Des Plaines is in Cook County the Cook Count Motor Fuel Tax form is triggered as well.

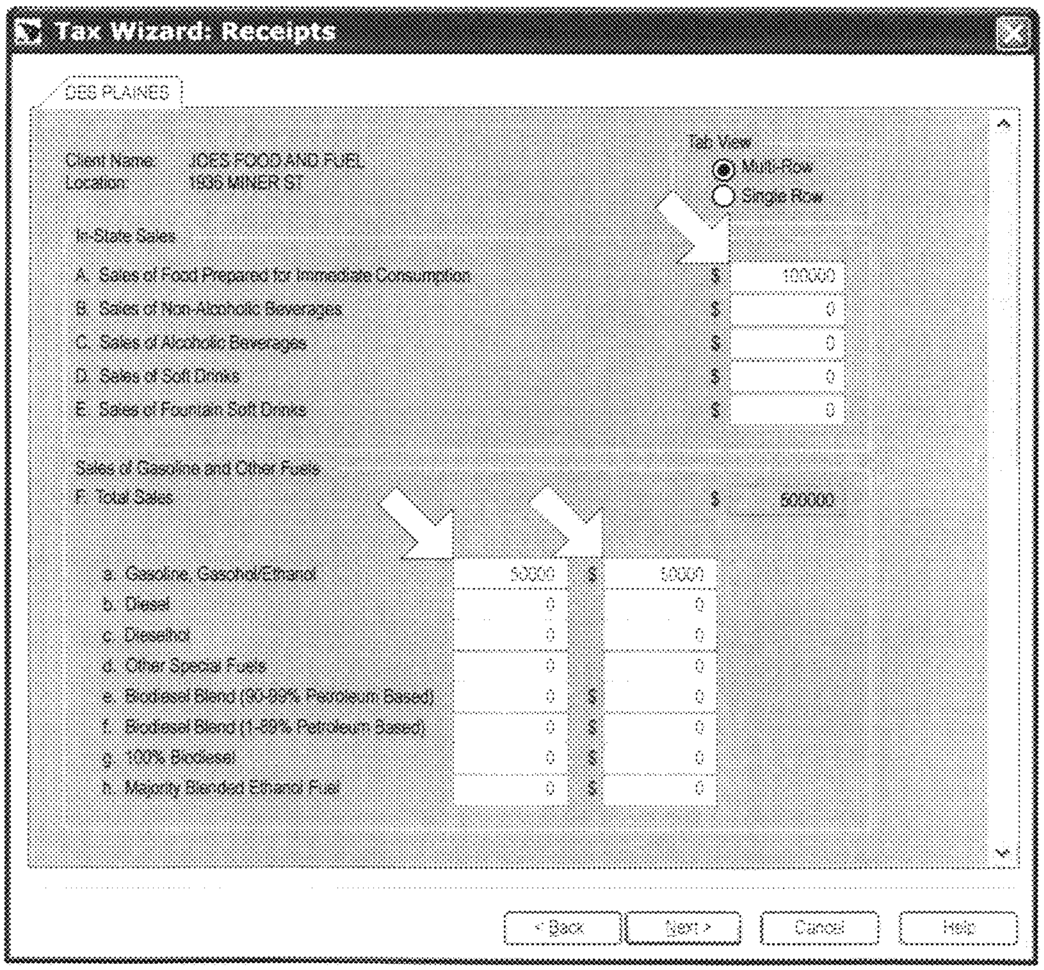

FIG. 51

STEP 3.3

User may enter purchases.

STEP 3.4

User may enter deductions and scroll down for more categories.

STEP 3.5

User may enter credits for each of the required tax return forms.
Each form has a tab along the top of the window.

STEP 3.6

Tax Wizard is now complete.
User may select to either View/Print the tax returns or exit the Tax Wizard.

STEP 4.1

The user selected the View/Print Tax Returns option.
The forms are created in Adobe PDF (Portable Document Format) and displayed in a PDF viewer
The PDF viewer has two tabs:
1. Tax Returns – forms to be filed
2. Location Schedules – forms to kept by the user Shown below is the Illinois Department of Revenue ST-1 Sales and Use Tax Return form.

STEP 4.2

Shown below is the Illinois Department of Revenue ST-1 Worksheet form.

STEP 4.3

Shown below is the Cook County Department of Revenue Gasoline Tax Return form.

STEP 4.4

Shown below is the City of Des Plaines Prepared Food and Beverage Sales Tax form.

STEP 4.5

Shown below is the City of Des Plaines Monthly Motor Fuel Tax Return form.

STEP 5.1

Shown below is the Illinois Department of Revenue ST-1 Sales and Use Tax Return schedule.

STEP 5.2

Shown below is the Illinois Department of Revenue ST-1 Worksheet schedule.

STEP 5.3

Shown below is the City of Des Plaines Prepared Food and Beverage Sales Tax schedule.

STEP 5.4

Shown below is the City of Des Plaines Monthly Motor Fuel Tax Return schedule.

STEP 6.1

User has completed preparing, viewing and printing the tax return for this client for a specific tax liability period.

User may now select to electronically file (E-File) the tax return with tax authorities that can accept electronic filing. In this case Illinois Department of Revenue (IDOR)

The user begins the E-File process by clicking the EFile Return(s) item on the task panel.

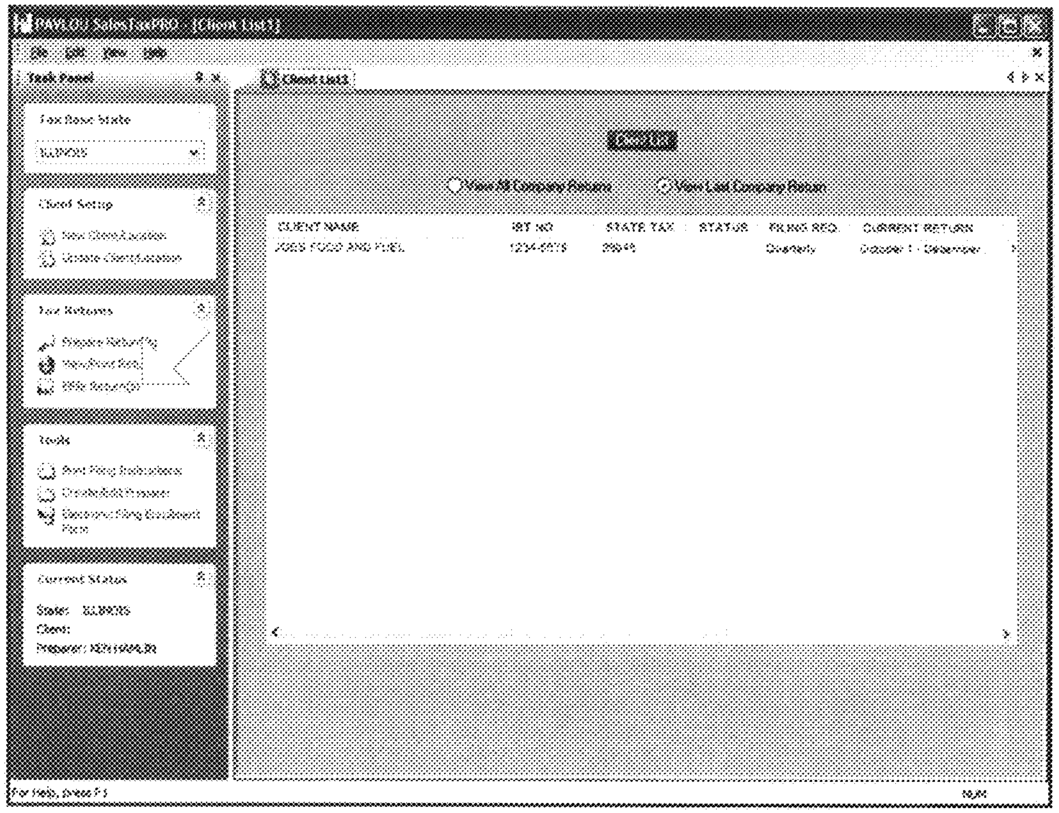

FIG. 65

STEP 7.1

When the user clicks the EFile Return(s) item on the task panel, the credit card information windows will display.

The user enters the credit card information for the E-File charges and clicks the OK button.

The System will transmit the tax return data to The System E-File Server, which in turn will process the tax return data and forward it to IDOR.

STEP 8.1

The user is then returned to the main window.

At this point the user may continue working or exit The System.

Illinois Department of Revenue

ST-1 Sales and Use Tax Return

ID: 9999

IBT no. 1234-5678 This form is for October 1 - December 31 2006

REV 03 FORM 002
E S ___/___/___
NS ED CA RC ET
HR

You must round your figures to whole dollars. (See instructions.)

016-0015-1 SL

Step 1: Alcoholic Liquor Purchases

(See instructions.)
If you are not required to report your purchases, go to Step 2.

Note: Distributors will also report your total purchases to us.

A Total dollar amount of alcoholic liquor purchased (invoiced and delivered) ______|____

Step 2: Taxable Receipts

1 Total receipts (Include tax.) 1 ______600000 |____

2 Deductions - include tax collected (Use the worksheet on the back.) 2 ______145835 |____

3 Taxable receipts (Subtract Line 2 from Line 1.) 3 ______454165 |____

Step 3: Tax on Receipts

Sales from locations within Illinois

General merchandise

4a ______454166 |____ x 0.0875 =4b ______39740 |____

Food, drugs, and medical appliances

5a ______|____ x 0.0200 =5b ______|____

Sales from locations outside Illinois

General merchandise

6a ______|____ x 0.0625 =6b ______|____

Food, drugs, and medical appliances

Step 5: Tax on Purchases

General merchandise

12a______|____ x 0.0625 =12b______|____

Food, drugs, and medical appliances

13a______|____ x 0.0100 =13b______|____

Purchases at other rates

14a______|____ 14b______|____

15 Tax due on purchases (Add Lines 12b, 13b, and 14b.) 15 ______|____

Step 6: Net Tax Due

16 Tax due from receipts and purchases (Add Lines 11 and 15.) 16 ______39045 |____

16a Manufacturer's Purchase Credit (See instructions.) 16a______|____

17 Prepaid sales tax (Attach PST-2, Copy A.) 17 ______|____

18 Quarter-monthly payments (Paid on Form RR-3 or by EFT) 18 ______|____

19 Prior overpayment 19 ______|____

20 Total prepayments (Add Lines 16a, 17, 18, and 19.) 20 ______|____

21 Net tax due

FIG. 68A

Sales at prior rates

Receipts taxed at other rates

8a ______ 8b ______

9 Tax due on receipts
(Add Lines 4b, 5b, 6b, 7b, and 8b.) 9 39740

Step 4: Retailer's Discount and Net Tax on Receipts

10 If you filed and paid by January 20, 2006
multiply Line 9 by 0.0175 10 695

11 Net tax due on receipts
(Subtract Line 10 from Line 9.) 11 39045

Step 7: Payment Due

22 Excess tax collected
(See instructions.) 22

23 Total tax due
(Add Lines 21 and 22.) ➔ 23 39045

24 Credit memorandum
(See instructions.) 24

25 Payment due
(Subtract Line 24 from Line 23.) ➔ 25 39045

Step 8: Sign Below

Under penalties of perjury, I state that I have examined this return and, to the best of my knowledge, it is true, correct and complete. The information in this return is taken from the records of the business for which it is filed.

Taxpayer ______ Phone ______ Date __/__/__

Preparer ______ Phone ______ Date __/__/__

Do not detach

ST-1 (R-7/04) ID: 9999

This form is for October 1 - December 31 2006

This form is due January 20, 2006

IBT no.: 1234-5678

JOES FOOD AND FUEL
1936 MINER ST
DES PLAINES, IL 60016

Write the amount you are paying.

$ 39045

Write your remittance and send your payment to

ILLINOIS DEPARTMENT OF REVENUE
RETAILER'S OCCUPATION TAX
SPRINGFIELD, IL 62776-0001

Just a reminder . . . ➔

IBT No.: 1234-5678
Location: 016-0015-1
KOB:
APE: 1206

ST-1 Worksheet for Line 2

| | | | | | | | | |
|---|---|---|---|---|---|---|---|---|
| **1** | Taxes collected from the following: | | | | | | | |
| | **a** General merchandise retail sales | | | | | **1a** | 39740 | |
| | **b** General merchandise service sales | | | | | **1b** | | |
| | **c** Food, drugs, and medical appliances retail sales | | | | | **1c** | | |
| | **d** Food, drugs, and medical appliances service sales | | | | | **1d** | | |
| **2** | Add Items 1a through 1d. **This is the total amount of taxes you collected.** | | | | | | **2** | 39740 |
| **3** | Resale | | | | | **3** | | |
| **4** | Interstate commerce | | | | | **4** | | |
| **5** | Cash refunds | | | | | **5** | | |
| **6** | Newspapers and magazines | | | | | **6** | | |
| **7** | State motor fuel tax | | Number of gallons | | Rate | | | |
| | Gasoline | **7a** | | x | 19¢ | = **7b** | | |
| | Gasohol and majority blended ethanol fuel | **7c** | 50000 | x | 19¢ | = **7d** | 9500 | |
| | Diesel (including biodiesel and biodiesel blends) | **7e** | | x | 21.5¢ | = **7f** | | |
| | Dieselhol | **7g** | | x | 21.5¢ | = **7h** | | |
| | Other special fuels | **7i** | | x | 19¢ | = **7j** | | |
| **8** | Specific fuels sales tax exemption | | | | | | | |
| | **Note: Subtract all motor fuel taxes before entering amounts on Lines 8a through 8i.** | | Receipts | | Rate | | | |
| | Gasohol | **8a** | 458422 | x | 0.20 | = **8b** | 91684 | |
| | Biodiesel blend (90 - 99 percent petroleum-based product) | **8c** | | x | 0.20 | = **8d** | | |
| | Biodiesel blend (1- 89 percent petroleum-based product) | **8e** | | x | 1.00 | = **8f** | | |
| | 100 percent biodiesel | **8g** | | x | 1.00 | = **8h** | | |
| | Majority blended ethanol fuel | **8i** | | x | 1.00 | = **8j** | | |

FIG. 68C

9 Sales of service. List the non-taxable portion from sales of the following:
a Repairs
b Prescriptions
c Other (identify) ______
10 Exempt organizations
11 Food stamps
12 Enterprise zone building materials and consumables or high impact business building materials
13 Manufacturing machinery and equipment (including photoprocessing)

14 Farm machinery and equipment
15 Graphic arts machinery and equipment
16 Other Home Rule Tax
Local Motor Fuel Tax

17 Add Items 3 through 16d. This is the total of your deductions.
18 Add Items 2 and 17 and write this amount on Line 2 on Form ST-1.

| | |
|---|---|
| 9a | |
| 9b | |
| 9c | |
| 10 | |
| 11 | |
| 12 | |
| 13 | |
| 14 | |
| 15 | |
| 16a | 911 |
| 16b | 4000 |
| 16c | |
| 16d | |
| 17 | 106095 |
| 18 | 145835 |

JOES FOOD AND FUEL
1936 MINER ST
DES PLAINES, IL 60016

Do not detach.

This form is authorized by the Illinois Retailers' Occupation and Related Tax Acts. Disclosure of this information is REQUIRED. Failure to provide it could result in a penalty. This form has been approved by the Forms Management Center. IL 492-0030

ST-1 back (R-7/04)

FIG. 68D

Mail to:

Cook County Department of Revenue
Gasoline Tax
P.O. Box 642177
Chicago, IL 60664-2177

Make check payable to:

Cook County Collector

Cook County
Department of Revenue

GASOLINE TAX RETURN

I.B.T.# ____________________

Illinois License # ____________

Read instructions on the reverse side before preparing this return.

GALLONAGE TO BE ACCOUNTED FOR:

| | | |
|---|---|---|
| 1. Actual (stick) inventory at the beginning of the month | 1. | |
| 2. Gasoline produced, acquired or received during the month | 2. | |
| 3. Total of inventory and receipts (Add Lines 1 and 2) | 3. | |
| 4. Actual (stick) inventory at the end of the month | 4. | |
| 5. Net gallons to be accounted for (Subtract Line 4 from Line 3) | 5. | |
| 6. **DEDUCTIONS:** | | |
| a. Sales to the Federal Government | 6a. | |
| b. Sales to the State of Illinois | b. | |
| c. Sales delivered outside of Illinois | c. | |
| d. Illinois sales outside Cook County **(Schedule A)** | d. | |

FIG. 69A

| | | |
|---|---|---|
| e. Sales and distributions to other registered distributors | e. | |
| f. Specific losses on account of fire, leakage, spillage, etc. | f. | |
| g. Losses or (gains) claimed due to temperature variation and evaporation | g. | |
| 7. Total deductions (Add Lines 6a through 6g) | 7. | |
| 8. Net gallonage subject to tax (Subtract Line 7 from Line 5) | 8. | |
| 9. Total tax (Line 8 multiplied by 6 cents (.06)) | 9. | |
| 10. Credit for collection of 0.5% if paid on time (Multiply Line 9 by .005) | 10. | |
| 11. Total tax due (Subtract Line 10 from Line 9) | 11. | |
| 12. Penalty for late payment (10% of Line 9, see instructions) | 12. | |
| 13. Interest for late payment (See instructions) | 13. | |
| 14. Credit for overpayment (Dept. of Revenue Credit No. _______________) | 14. | |
| 15. Total Tax, Penalty and Interest due (Add Lines 11, 12 and 13; then subtract Line 14) | 15. | |

CERTIFICATIONS:
Under penalties as provided by law, which include a fine or imprisonment, or both, the undersigned certifies that the information set forth in this return is true and accurate to the best of his or her knowledge and belief, and is taken from the books and records of the business for which this return is filed. This return must be signed by he owner, an officer of the company or designated agent of he taxpayer.

SIGNATURE: ______________________________

DATE: ______________________________ TITLE: ______________________________

(H:\USERS\DL\TAX-RET\GASOLINE\GRET0700.DOC)

FIG. 69B

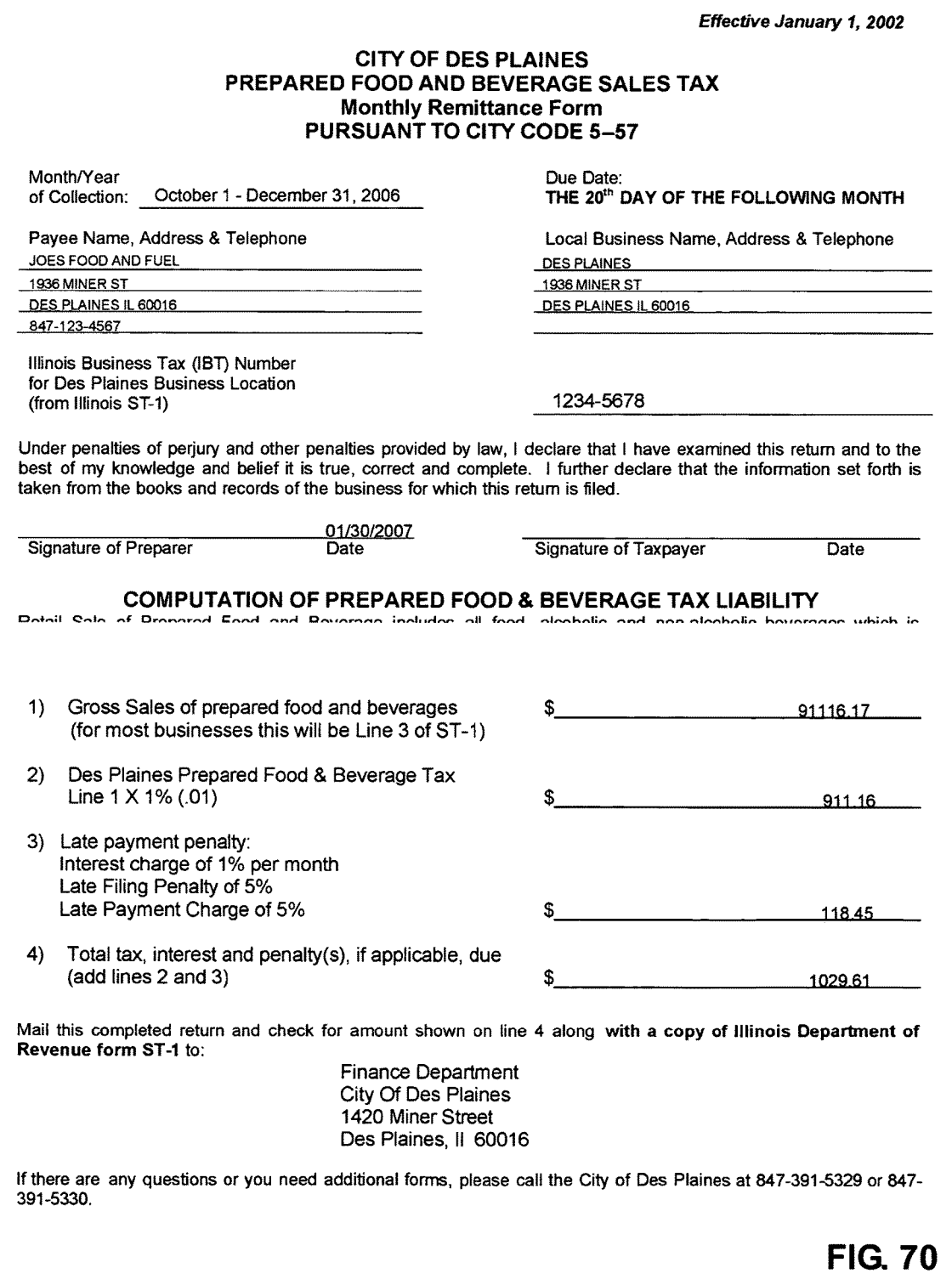

*Effective January 1, 2002*

CITY OF DES PLAINES
PREPARED FOOD AND BEVERAGE SALES TAX
Monthly Remittance Form
PURSUANT TO CITY CODE 5–57

Month/Year of Collection: October 1 - December 31, 2006

Due Date: THE 20th DAY OF THE FOLLOWING MONTH

Payee Name, Address & Telephone
JOES FOOD AND FUEL
1936 MINER ST
DES PLAINES IL 60016
847-123-4567

Local Business Name, Address & Telephone
DES PLAINES
1936 MINER ST
DES PLAINES IL 60016

Illinois Business Tax (IBT) Number for Des Plaines Business Location (from Illinois ST-1) 1234-5678

Under penalties of perjury and other penalties provided by law, I declare that I have examined this return and to the best of my knowledge and belief it is true, correct and complete. I further declare that the information set forth is taken from the books and records of the business for which this return is filed.

| Signature of Preparer | Date | Signature of Taxpayer | Date |
|---|---|---|---|
| | 01/30/2007 | | |

COMPUTATION OF PREPARED FOOD & BEVERAGE TAX LIABILITY

Retail Sale of Prepared Food and Beverage includes all food, alcoholic and non-alcoholic beverages which is 1) Gross Sales of prepared food and beverages (for most businesses this will be Line 3 of ST-1) $ 91116.17

2) Des Plaines Prepared Food & Beverage Tax Line 1 X 1% (.01) $ 911.16

3) Late payment penalty:
Interest charge of 1% per month
Late Filing Penalty of 5%
Late Payment Charge of 5% $ 118.45

4) Total tax, interest and penalty(s), if applicable, due (add lines 2 and 3) $ 1029.61

Mail this completed return and check for amount shown on line 4 along with a copy of Illinois Department of Revenue form ST-1 to:

Finance Department
City Of Des Plaines
1420 Miner Street
Des Plaines, Il 60016

If there are any questions or you need additional forms, please call the City of Des Plaines at 847-391-5329 or 847-391-5330.

FIG. 70

CITY OF DES PLAINES
MONTHLY MOTOR FUEL TAX RETURN
Effective October 1, 2003

Month/Year
of Collection: October 1 - December 31, 2006

Due Date:
The 20th day of the following Month

Payee Name, Address & Telephone

JOES FOOD AND FUEL
1936 MINER ST
DES PLAINES IL 60016
847-123-4567

Local Business Name, Address & Telephone

DES PLAINES
1936 MINER ST
DES PLAINES IL 60016

Illinois Business Tax (IBT) Number for
Des Plaines Business Location (from ST-1) 1234-5678

COMPUTATION OF TAX LIABILITY

| | |
|---|---|
| 1) Gallons of motor fuel sold (Worksheet ST-1 (Back) – Total of Line #7) | 50000.00 |
| 2) Des Plaines Motor Fuel Tax (Line 1 X $0.02) | $ 1000.00 |
| Interest charge of 1% per month<br>Late Filing Penalty of 5%<br>Late Payment Charge of 5% | $<br><br>130.00 |
| 4) Total tax and penalty due (add lines 2 and 3) | $ 1130.00 |

Under penalties of perjury and other penalties provided by law, I declare that I have examined this return and to the best of my knowledge and belief it is true, correct and complete. I further declare that the information set forth is taken from the books and records of the business for which this return is filed.

01/30/2007
Signature of Preparer Date Signature of Taxpayer Date

Mail this completed return and check for amount shown on line 4 along *with copy of Illinois Department of Revenue form ST-1 (not the attachment to form ST-1)* to:

Director Of Finance & Administrative Services
City Of Des Plaines
1420 Miner Street
Des Plaines, Il 60016

Should you have any questions or if you need an additional form you may call the City of Des Plaines at 847-391-5324.

FIG. 71

DES PLAINES

Illinois Department of Revenue

ST-1 Sales and Use Tax Return

ID: 9999

IBT no. 1234-5678

This form is for October 1 - December 31 2006

REV 03 FORM 002
E S ___/___/___
NS ED CA RC ET
HR

You must round your figures to whole dollars. (See instructions.)

016-0015-1 SL

Step 1: Alcoholic Liquor Purchases

(See instructions.)
If you are not required to report your purchases, go to Step 2.

Note: Distributors will also report your total purchases to us.

A Total dollar amount of alcoholic liquor purchased (invoiced and delivered) 0

Step 2: Taxable Receipts

1 Total receipts (Include tax.) 1 600000

2 Deductions - include tax collected (Use the worksheet on the back.) 2 145835

3 Taxable receipts (Subtract Line 2 from Line 1.) 3 454165

Step 3: Tax on Receipts

Sales from locations within Illinois

General merchandise 4a 454166 x 0.0875 =4b 39740

Food, drugs, and medical appliances 5a 0 x 0.0200 =5b 0

Sales from locations outside Illinois

General merchandise 6a 0 x 0.0625 =6b 0

Food, drugs, and medical appliances

Step 5: Tax on Purchases

General merchandise 12a 0 x 0.0625 =12b 0

Food, drugs, and medical appliances 13a 0 x 0.0100 =13b 0

Purchases at other rates 14a 0 14b 0

15 Tax due on purchases (Add Lines 12b, 13b, and 14b.) 15 0

Step 6: Net Tax Due

16 Tax due from receipts and purchases (Add Lines 11 and 15.) 16 39045

16a Manufacturer's Purchase Credit (See instructions.) 16a

17 Prepaid sales tax (Attach PST-2, Copy A.) 17

18 Quarter-monthly payments (Paid on Form RR-3 or by EFT) 18

19 Prior overpayment 19

20 Total prepayments (Add Lines 16a, 17, 18, and 19.) 20

21 Net tax due

FIG. 72A

SCHEDULE - DO NOT FILE

Sales at prior rates

Receipts taxed at other rates 8a 0 8b 0

9 Tax due on receipts
(Add Lines 4b, 5b, 6b, 7b, and 8b.) 9 39740

Step 4: Retailer's Discount and Net Tax on Receipts

10 If you filed and paid by January 20, 2006
multiply Line 9 by 0.0175 10 695

11 Net tax due on receipts
(Subtract Line 10 from Line 9.) 11 39045

Step 7: Payment Due

22 Excess tax collected
(See instructions.) 22

23 Total tax due
(Add Lines 21 and 22.) → 23

24 Credit memorandum
(See instructions.) 24

25 Payment due
(Subtract Line 24 from Line 23.) → 25

Step 8: Sign Below

Under penalties of perjury, I state that I have examined this return and, to the best of my knowledge, it is true, correct and complete. The information in this return is taken from the records of the business for which it is filed.

Taxpayer Phone Date __/__/__

Preparer Phone Date __/__/__

Do not detach

ST-1 (R-7/04) ID: 9999

This form is for October 1 - December 31 2006

This form is due January 20, 2006

IBT no.: 1234-5678

JOES FOOD AND FUEL
1936 MINER ST
DES PLAINES, IL 60016

Write the amount you are paying.

$

Write your remittance and send your payment to

ILLINOIS DEPARTMENT OF REVENUE
RETAILER'S OCCUPATION TAX
SPRINGFIELD, IL 62776-0001

Just a reminder . . . →

IBT No.: 1234-5678
Location: 016-0015-1
KOB:
APE: 1206

ST-1 Worksheet for Line 2

| | | | | | | | | |
|---|---|---|---|---|---|---|---|---|
| **1** | Taxes collected from the following: | | | | | | | |
| | **a** General merchandise retail sales | | | | | **1a** | 39740 | |
| | **b** General merchandise service sales | | | | | **1b** | 0 | |
| | **c** Food, drugs, and medical appliances retail sales | | | | | **1c** | 0 | |
| | **d** Food, drugs, and medical appliances service sales | | | | | **1d** | 0 | |
| **2** | Add Items 1a through 1d. **This is the total amount of taxes you collected.** | | | | | **2** | | 39740 |
| **3** | Resale | | | | | **3** | 0 | |
| **4** | Interstate commerce | | | | | **4** | 0 | |
| **5** | Cash refunds | | | | | **5** | 0 | |
| **6** | Newspapers and magazines | | | | | **6** | 0 | |
| **7** | State motor fuel tax | | Number of gallons | | Rate | | | |
| | Gasoline | **7a** | 0 | x | 19¢ | = **7b** | 0 | |
| | Gasohol and majority blended ethanol fuel | **7c** | 50000 | x | 19¢ | = **7d** | 9500 | |
| | Diesel (including biodiesel and biodiesel blends) | **7e** | 0 | x | 21.5¢ | = **7f** | 0 | |
| | Dieselhol | **7g** | 0 | x | 21.5¢ | = **7h** | 0 | |
| | Other special fuels | **7i** | 0 | x | 19¢ | = **7j** | 0 | |
| **8** | Specific fuels sales tax exemption | | | | | | | |
| | **Note: Subtract all motor fuel taxes before entering amounts on Lines 8a through 8i.** | | Receipts | | Rate | | | |
| | Gasohol | **8a** | 458422 | x | 0.20 | = **8b** | 91684 | |
| | Biodiesel blend (90 - 99 percent petroleum-based product) | **8c** | 0 | x | 0.20 | = **8d** | 0 | |
| | Biodiesel blend (1- 89 percent petroleum-based product) | **8e** | 0 | x | 1.00 | = **8f** | 0 | |
| | 100 percent biodiesel | **8g** | 0 | x | 1.00 | = **8h** | 0 | |
| | Majority blended ethanol fuel | **8i** | 0 | x | 1.00 | = **8j** | 0 | |

FIG. 72C

| | | |
|---|---|---|
| **9** | Sales of service. List the non-taxable portion from sales of the following: | |
| | **a** Repairs | **9a** 0 |
| | **b** Prescriptions | **9b** 0 |
| | **c** Other (identify) | **9c** 0 |
| **10** | Exempt organizations | **10** 0 |
| **11** | Food stamps | **11** 0 |
| **12** | Enterprise zone building materials and consumables or high impact business building materials | **12** 0 |
| **13** | Manufacturing machinery and equipment (including photoprocessing) | **13** 0 |
| **14** | Farm machinery and equipment | **14** 0 |
| **15** | Graphic arts machinery and equipment | **15** 0 |
| **16** | Other Home Rule | **16a** 911 |
| | Local MFTs | **16b** 4000 |
| | | **16c** 0 |
| | | **16d** 0 |
| **17** | Add Items 3 through 16d. This is the total of your deductions. | **17** 106095 |
| **18** | Add Items 2 and 17 and write this amount on Line 2 on Form ST-1. | **18** 145835 |

This form is authorized by the Illinois Retailers' Occupation and Related Tax Acts. Disclosure of this information is REQUIRED. Failure to provide it could result in a penalty. This form has been approved by the Forms Management Center. IL 492-0030

JOES FOOD AND FUEL
1936 MINER ST
DES PLAINES, IL 60016

Do not detach.

ST-1 back (R-7/04)

FIG. 72D

SYSTEM AND METHOD FOR PREPARING MULTI-LEVEL TAX RETURNS

CROSS REFERENCE TO RELATED APPLICATIONS

This application claims priority to and the benefit of U.S. Provisional Patent Application No. 60/764,717, filed on Feb. 2, 2006.

COMPUTER APPENDIX

This application includes a Computer Listing Appendix on compact disc, hereby incorporated by reference.

BACKGROUND OF THE INVENTION

1. TECHNICAL FIELD

The present invention relates to a system and method for preparing multi-level tax returns and more particularly for a system for calculating and preparing all state and local sales and use tax returns that are applicable for the locations where the taxpayer does business which greatly facilitates preparation minimizes the loss of tax deductions that are known to be overlooked because of the cumbersome and time-consuming nature of determining such deductions.

2. DESCRIPTION OF THE PRIOR ART

Various systems are known that purport to facilitate preparation of state tax returns. Examples of these systems are disclosed in U.S. Pat. Nos. 3,946,217; 3,946,220; 3,963, 910; 5,799,283; 5,875,433; and 6,078,899; as well as U.S. statutory invention registration no. H1,830. Also known are a number of canned software programs that can be used to facilitate sales tax calculations. Examples of these canned programs are Sales Tax Assistant, (www.SalesTax.com); ZipTax (www.ZipTax.com); TrustFile (www.TrustFile.com); and TaxWare (www.TaxWare.com).

Of all of the systems disclosed above, only U.S. statutory invention registration H1,830 and the TaxWare system relate to use tax preparation. Although these systems facilitate sale and use tax preparation, they do not extend down to the level of local municipal taxing authorities. As such, the systems described above do not provide a complete solution for a business entity operating within a location subject to one or more local taxing authorities. As such, accountants and business owners, in addition to the systems provided above, must determine and calculate returns for such local taxing authorities. Moreover, any deductions provided as a result of paying local use and sales taxes in such local municipal taxing authorities are often not included in other tax returns because of the cumbersome nature and thus expense of determining such deductions. Thus, there is a need for a system for calculating state and use taxes which also supports preparation of tax returns for local taxing authorities that are applicable to the locations where the taxpayer conducts business and takes into account tax deductions for such local use taxes.

SUMMARY OF THE INVENTION

The present invention relates to a system for calculating and preparing state and local sales and use tax returns suitable for filing with state and local municipal taxing authorities. The system in accordance with the present invention provides a total solution for sales and use taxes and is configured to not only determine and prepare state and use tax returns but also calculates and prepares returns of all local taxing authorities where the taxpayer conducts business, such as state and local sales and use tax returns. The system is also configured to facilitate preparation of local municipal sales and use tax returns which are normally cumbersome and time consuming to prepare.

DESCRIPTION OF THE DRAWINGS

These and other advantages of the present invention will be readily understood with reference to the following specification and attached drawing wherein:

FIGS. 2A-2N represent database schema for a client side user database in accordance with the present invention.

FIGS. 3A-3M represent database schema for a client side system database in accordance with the present invention.

FIGS. 45-67 illustrate an example of the preparation of tax returns for a business subject to various taxing authorities utilizing the system in accordance with the present invention.

FIGS. 68A-68D illustrate an exemplary a filled in Illinois Form ST-1.

FIG. 69 illustrates a Cook County Gasoline Tax Return Form.

FIG. 70 illustrates a filled in City of Des Plaines Prepared Food and Beverage Tax Return Form.

FIG. 71 illustrates a filled in City of Des Plaines Monthly Motor Fuel Tax Return Form.

FIGS. 72A-72D illustrate a Sales and Use Tax Return Schedule.

DETAILED DESCRIPTION

Figure 1A:
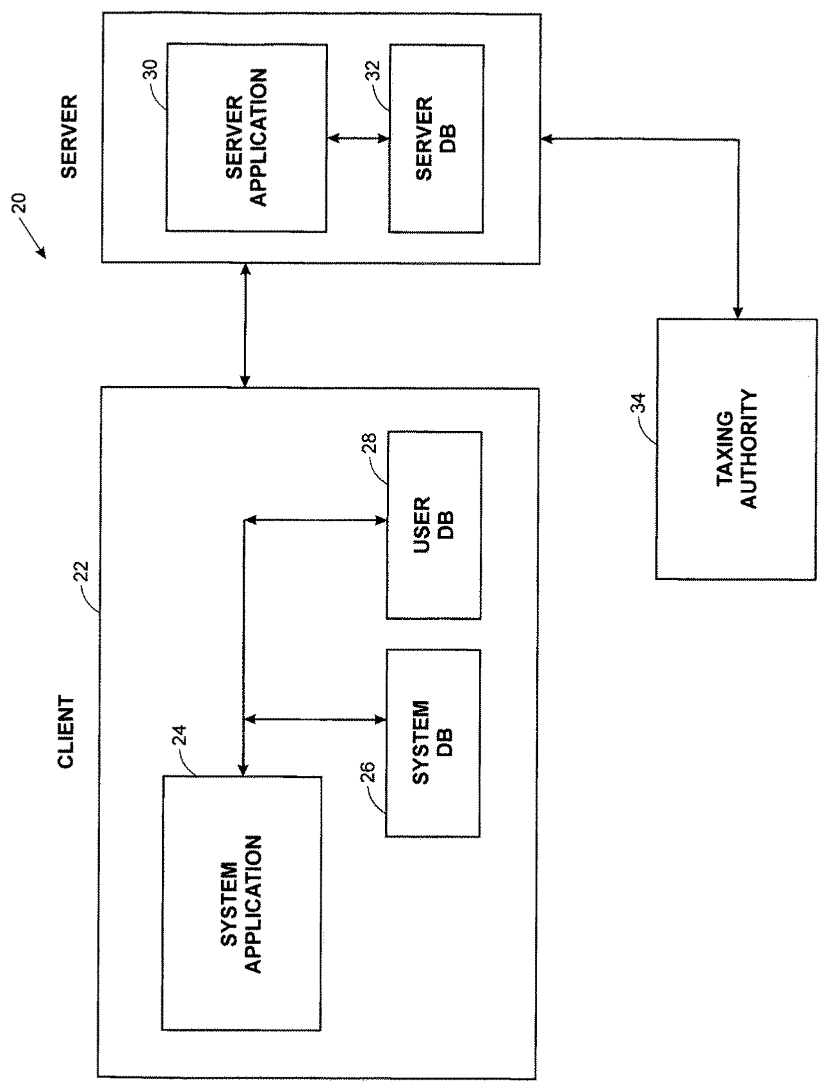
FIG. 1A is a block diagram of an exemplary architecture for a client server application of the system in accordance with the present invention.

The present invention relates to a comprehensive system for receiving sales and client data and calculating and preparing various state and local sales and use taxes and returns. The system allows the user to view and print any of the returns supported by the system and optionally file the return with the proper taxing authority. In accordance with the present invention, the system is a complete solution for state and local sales and use taxes including those by municipal and local taxing authorities.

For simplicity, the system in accordance with the present invention is described and illustrated in terms of exemplary Illinois state and local sales and use tax returns. However, the principles of the present invention are applicable to virtually anywhere where there are multiple levels of taxing authorities, thus requiring the filing of multiple levels sales and use tax returns or other types of tax returns. As will be appreciated by those of ordinary skill in the art, the principles of the present invention are applicable to other states within the United States as well as other countries in which a locale is subject to multiple levels of taxation.

INTERNATIONAL APPLICATIONS

Various countries, such as, Canada, Japan, and Australia currently impose sales and consumption taxes at their primary country levels and simultaneously extend their tax systems down to include Harmonized Sales Tax, Provincial Sales Tax, and Local Consumption Tax for their local taxing self-governed authorities. The taxes paid at the local levels are deductible at the federal and sovereign levels. The present invention can easily facilitate, support and satisfy the tax law requirements of these countries and their local taxing authorities. Furthermore, it can provide a complete solution for any business entity operating within these countries and their local taxing authorities, as well as any country in the world that currently uses similar tax systems.

Canada

Sales Taxes in Canada

In Canada there are three types of Sales Taxes: (1) the Federal Goods and Services Tax (GST), (2) the Harmonized Sales Tax (HST), and (3) the Provincial Sales Taxes (PST).

Goods and Services Tax (GST)

The federal sales tax, also known as the country's Goods and Services Tax (GST) has become a crucial source of federal revenue for Canada. The rate is 6% (reduced from 7% Jul. 1, 2006) and it is applied to a wide variety of items, many of which are exempt from provincial taxes. In Quebec and Prince Edward Island, the PST is also applied on top of the GST.

Harmonized Sales Tax (HST)

The high rate GST (called HST) of 14% applies in Nova Scotia, New Brunswick and Newfoundland. Every province except Alberta implements a Provincial Sales Tax or the Harmonized Sales Tax. The Yukon Territory, Northwest Territories and Nunavut do not have any type of regional sales tax.

Provincial Sales Taxes (PST)

The amount of this tax varies from province to province:

- British Columbia 7% (Reduced from 7.5% October 2004)
- Saskatchewan 5% (Reduced from 7% as of Oct. 28, 2006) nominally, but is also applied to the federal 6% GST (reduced from 7% Jul. 1, 2006); therefore actually 5.30%.
  - The Saskatchewan side of the city of Lloydminster, which is bisected by the Alberta-Saskatchewan border, is exempt from PST by provincial law. This allows businesses on the Saskatchewan side to compete on a more equal footing with those on the Alberta side of the city.
- Manitoba 7%
- Ontario 8%
- Quebec 7.5% nominally, but is also applied to the federal 6% GST (reduced from 7% Jul. 1, 2006); therefore actually 7.95%.
- Prince Edward Island 10% nominally, but is also applied to the federal 6% GST (reduced from 7% Jul. 1, 2006); therefore actually 10.6%.

Which items the tax is applied to also varies widely by province.

Japan

Consumption Tax in Japan

Consumption tax is an indirect tax fairly and widely imposed on general consumption. In domestic transactions, the taxpayers are business enterprises offering asset transfers, loans and services for consumption and those who receive foreign goods from bonded areas. Consumption tax is added on to the price of goods and services offered by enterprises and ultimately borne by consumers. Since this tax is assessed on transactions by enterprises at each manufacturing, wholesale, and retail stage, it contains a scheme for avoiding tax accumulation by way of deducting taxes on purchases, thus making it neutral to industry and the economy in general.

Japan, which is considered a single sovereign state, uses a consumption tax system at a flat tax rate of 4% (together with the 1% local consumption tax, a local tax, the rate reaches 5%). The rate applies to all sales transactions subject to consumption tax (excluding consumption and local consumption taxes, certain returns, discounts or rebates) and the amount of tax-exempt sales such as those relating to export transactions.

Local Consumption Tax

Japan is not a federated state and it has a long tradition of local autonomy. Local Self-Governments consist of:

1) Primary Local Organizations, which are municipalities (cities, towns, and villages). There are 777 cities and 1044 towns and villages.
2) Secondary Local Organizations, which are basic local organizations and prefectures. There are forty-seven prefectures which are divided into four categories:
   - To (Metropolis) Tokyo
   - Do (Circuit) Hokkaido
   - Fu (Prefecture) Osaka and Kyoto
   - Ken (Prefecture)

The Local Tax law provides for taxes to be levied by these local public entities and prescribes the basis of tax calculation and collection for each tax. It also provides standard tax rates to be used by local public entities. These local public entities can establish new tax items in addition to those specified as local tax items, and they may exceed the tax rate limits promulgated by the Local Tax Law.

The amount of the Local Consumption Tax is 25% of the Consumption Tax (equivalent to a consumption tax rate of 1%).

Australia

Sales Tax in Australia

The Australian Government uses the Goods and Services Tax (GST), which is a broad-based tax of 10% on most goods, services and other items sold or consumed in Australia.

Goods and Services Tax (GST)

The Australian GST system works as follows:

Generally, registered businesses include the GST tax in the price of sales to their customers and claim credits for the GST tax included in the price of their business purchases.

While the GST tax is paid at each step in the supply chain, the businesses don't actually bear the economic cost of the tax. This is because they include the GST tax in the price of the goods and services they sell and can claim credits for most GST taxes included in the price of goods and services they buy. The cost of the GST tax is borne by the final consumer, who can't claim any GST tax credits.

State & Territory Taxes

Australia is divided into eight states and territories. They are as follows:

New South Wales
Office of State Revenue NSW Treasury
South Australia
RevenueSA
Queensland
Office of State Revenue
Northern Territory
Territory Revenue Management
Australian Capital Territory
ACT Revenue Office
Tasmania
State Revenue Office
Victoria
State Revenue Office Victoria
Western Australia
Office of State Revenue Each State has its own laws and rates for stamp duty, pay-roll tax, land tax, FID and Debits tax. These taxes are administered by the States and Territories and governed by their local revenue offices.

Tax Structures of Various Other Countries

Exemplary tax structures for various countries around the world are as follows.

| Country | Standard Rate | Indirect Tax System | Notes |
|---|---|---|---|
| Albania | 20% | VAT | |
| Algeria | 17% | VAT | |
| American Samoa | 15% | VAT | With effect from 1 Oct. 2006 |
| Andorra | 4% | ISI | With effect from 1 Jan. 2006 a new Indirect services tax "Impuesto Indirecto sobre la Prestacion de Servicios" applies. |
| Antigua and Barbuda | N/A | N/A | The new Antigua and Barbuda Sales Tax (ABST) will take effect from 29 Jan. 2007 at 15%. |
| Argentina | 21% | VAT | Reduced to 18% from 20% on 1 Jan. 2004. |
| Armenia | 20% | VAT | |
| Australia | 10% | GST | |
| Austria | 20% | VAT | |
| Azerbaijan | 18% | VAT | |
| Belarus | 18% | VAT | |
| Belgium | 21% | VAT | |
| Belize | 10% | Sales Tax | A new GST has been introduced under the General Sales Tax (No. 49 of 2005) with effect from 1 Jul. 2006. |
| Benin | 18% | VAT | |
| Bolivia | 13% | VAT | |
| Bosnia Herzegovina | 17% | VAT | With effect from 1 Jan. 2006 VAT was introduced at a flat rate of 17%. |
| Botswana | 10% | VAT | |
| Brazil | 17% (standard rate) | VAT | Multiple-rate system with tax levied at State and Federal levels. Brazilian State VAT (ICMS) levied at rates ranging from 7% to 25%, with average rate of 17% (e.g. rate in Sao Paulo is 18%). National VAT (IPI) also levied with average rate of 20%. |
| Brunei | N/A | N/A | |
| Bulgaria | 20% | VAT | |
| Cambodia | 10% | VAT | |
| Cameroon | 19.25% | VAT | |
| Canada | 6-14% | GST | High rate GST (called HST) of 14% applies in Nova Scotia, New Brunswick and Newfoundland. The remaining states (Alberta, British Columbia, Saskatchewan, Manitoba, Ontario, Quebec and Prince Edward Island) charge GST at 6%. The following states also levy provincial taxes as follows:<br>Quebec - 7.5%;<br>Ontario 8%;<br>Manitoba 7%;<br>Saskatchewan 5%;<br>British Columbia 7%; and<br>Prince Edward Island - 10%. |
| Chile | 19% | VAT | |
| | 17% | VAT | VAT is essentially applicable to supplies of goods |

-continued

| Country | Standard Rate | Indirect Tax System | Notes |
|---|---|---|---|
| China | 3-20% | Business Tax | together with a small number of services related to manufacturing processes. Business Tax applies to the supply of services. |
| Columbia | 16% | VAT | With effect from 1 Jan. 2007, the simplified VAT rates will entail standard VAT rate and 3 special rates of 10%, 20% and 25%. A sales tax has also been proposed at 2%. |
| Costa Rica | 13% | VAT | The reduced rate is 6%. |
| Croatia | 22% | VAT | |
| Cyprus | 15% | VAT | |
| Czech Republic | 19% | VAT | |
| Denmark | 25% | VAT | |
| Dominican Republic | 16% | VAT | |
| Ecuador | 12% | VAT | Certain items are taxed at 5-30% |
| Egypt | 10% | Sales Tax | |
| Estonia | 18% | VAT | |
| Finland | 22% | VAT | |
| France | 19.60% | VAT | |
| Germany | 19% | VAT | The rate will increase from 16% to 19% with effect from 1 Jan. 2007. |
| Ghana | 12.50% | VAT | |
| Gibraltar | N/A | N/A | |
| Greece | 19% | VAT | Prior to 1 Apr. 2005 rate was 18%. Different rates apply on some Greek islands. |
| Guam | 4% | Sales tax | |
| Guatemala | 12% | VAT | |
| Guernsey | N/A | N/A | |
| Guinea - Equitorial | 15% | Sales tax | A higher rate of 30% and reduced rate of 6% also apply to certain supplies. |
| Guyana | 16% | VAT | It will be implemented on 1 Jan. 2007 |
| Honduras | 12% | Sales Tax | There is a higher rate of 15%. |
| Hong Kong | N/A | N/A | Government considering introduction of GST in 2009. |
| Hungary | 20% | VAT | With effect from 1 Sep. 2006 the preferential rate has increased from 15% to 20%. The standard rate has remained as 20%. |
| Iceland | 24.50% | VAT | |
| India | 12.50% | VAT | VAT applies to goods and was introduced in 21 states on 1 Apr. 2005. Sales tax and other local taxes to be phased out. Service tax is a federal levy and applies to the sale of services. |
| Ireland | 21% | VAT | |
| Isle of Man | 17.50% | VAT | |
| Israel | 15.50% | VAT | Standard rate was reduced from 16.5% to 15.5% with effect from 1 Jul. 2006. |
| Italy | 20% | VAT | |
| Japan | 5% | Consumption Tax | |
| Jersey | N/A | N/A | Introduction of GST at 4% in 2008 currently under consideration. |
| Jordan | 16% | Sales Tax | |
| Kazakhstan | 15% | VAT | The VAT rates will be gradually lowered from the current level of 15% to:<br>14% as of 1 Jan. 2007<br>13% as of 1 Jan. 2008<br>12% as of 1 Jan. 2009 |
| Korea (Republic of North Korea) | 2-15% | Turnover Tax | |
| Korea Republic of South Korea) | 10% | VAT | |
| Kyrgyzstan | 20% | VAT | |
| Latvia | 18% | VAT | |
| Lebanon | 10% | VAT | Discussions have taken place about the possibility of a future increase to 15%. |
| Libya | N/A | N/A | Stamp duty is payable at 2% of the contract value (Libyan dinnars) plus 5 per thousand. |
| Lithuania | 18% | VAT | |
| Luxembourg | 15% | VAT | |
| Macau | N/A | N/A | |
| Macedonia | 18% | VAT | |
| Madeira | 15% | VAT | Standard rate increased from 13% to 15% with effect from 1st Jul. 2005. |
| Malaysia | 10% | Sales Tax | GST at 5% to be introduced in 2007 to replace current Sales Tax. |
| Maldives | N/A | N/A | |
| Malta | 18% | VAT | |
| Mauritius | 15% | VAT | |

-continued

| Country | Standard Rate | Indirect Tax System | Notes |
|---|---|---|---|
| Mexico | 15% | VAT | |
| Micronesia | Varies | Sales Tax | Each region levies its own sales tax varying between 4%-5%. |
| Monaco | 19.6% | VAT | Monaco is treated as a part of France for VAT purposes. |
| Montenegro | 18% | VAT | |
| Netherlands | 19% | VAT | |
| Netherlands Antilles | 3-5% | Turnover tax | Applicable at 5% in Curacao and Bonaire and 3% in St. Maarten. In Aruba no turnover tax currently applies. |
| New Zealand | 12.50% | GST | |
| Nigeria | 5% | VAT | Increase to 10% under consideration. |
| Niue | N/A | N/A | VAT due to be introduced at 5%. |
| Northern Mariana Islands | 5% | Sales Tax | |
| Norway | 25% | VAT | Increased to 25% from 24% with effect from 1 Jan. 2005. |
| Paraguay | 10% | VAT | |
| Peru | 19% | VAT | Proposals to reduce the VAT rate to 18% in 2006. |
| Philippines | 12% | VAT | The VAT rate changed with effect on 1 Feb. 2006 from 10% to 12%. |
| Poland | 22% | VAT | |
| Portugal | 21% | VAT | The standard rate increased from 19% to 21% with effect from 1st Jul. 2005. |
| Puerto Rico | 5.50% | Sales and Use Tax | With effect from 15 Nov. 2006, a 5.5% Sales and Use Tax will be imposed. Local Sales and Use Tax will also be allowed at 1.5%. |
| Romania | 19% | VAT | The reduced VAT rate has been cut-down from 9% to 7%. |
| Russia | 18% | VAT | There is a proposal to reduce the standard rate to 13% in 2007 but a final decision has yet to be made. |
| Serbia | 18% | VAT | |
| Singapore | 5% | GST | Proposals to increase GST rate from 5% to 7% will be announced in Feb. 2007 budget. |
| Slovakia | 19% | VAT | |
| Slovenia | 20% | VAT | The government is considering increasing VAT from 20% to 21%. |
| South Africa | 14% | VAT | |
| Spain | 16% | VAT | |
| Sweden | 25% | VAT | |
| Switzerland | 7.60% | VAT | |
| Syria | N/A | N/A | VAT will be introduced by 2008. The system will be based on the EU model. |
| Taiwan | 5% | VAT | The Ministry of Finance is proposing to increase the VAT rate to 6% and this may be effective from the first quarter of 2006. |
| Tajikistan | 20% | VAT | |
| Tanzania | 20% | VAT | |
| Thailand | 7% | VAT | Standard rate to be held at 7% until September 2007. |
| Turkey | 18% | VAT | |
| Turkmenistan | 20% | VAT | |
| Uganda | 18% | VAT | Rate increased from 17% to 18% with effect from 1st Jul. 2005. |
| Ukraine | 20% | VAT | The new government will reduce the VAT rate from 20% to 18% |
| United Arab Emirates | N/A | N/A | The Government is considering introducing VAT at 5-7%. |
| United Kingdom | 17.50% | VAT | |
| United States | Varies | Sales Tax | Most states, counties & cities levy sales taxes. These are cumulative & rates vary across the US. |
| Uruguay | 23% | VAT | There are proposals for a VAT rate reduction from 23% to 21% which is expected to become effective as of 1 Jan. 2007. |
| Uzbekistan | 20% | VAT | |
| Venezuela | 14% | VAT | VAT rate was reduced from 15% to 14% with effect from 1 Oct. 2005. |
| Yemen | N/A | N/A | |
| Yugoslavia | 20% | Sales Tax | |
| Zimbabwe | 15% | VAT | The standard rate changed with effect from 1 Jan. 2006. Previously the rate was 17.5%. |

System Architecture

The system can be configured as a stand-alone application or as a client server application. The stand-alone application can be further configured as a single-user application, for example, for use by an individual taxpayer or as a multi-user application for use by an accountant for multiple clients or a taxpayer with multiple business locations. The client-server application incorporates the stand-alone client application and also includes a server application which not only enables electronic filing of one or more tax returns with a taxing authority but also polls the taxing authority for confirmation of the electronically filed tax return and returns the confirmation to the client.

Referring to FIG. 1A, the overall architecture for the system in accordance with the present invention is illustrated and generally identified with the reference numeral 20. A client server embodiment of the invention is shown which includes a client 22 and a server 23. The client 22 includes a system application 24 which incorporates the principles of the present invention for the stand-alone operation and may include two integral databases; a system database 26 and a user database 28. The system database 26 and the user database 28 can also be located external to the client 22, for example, at the server 23 or another server (not shown) by way of a conventional wired or wireless communication link over a private or public communication channel, such as the Internet.

The server 23 hosts a server application 30 as well as a server database 32. The server 23 may be connected to the client 22 by way of a conventional wired or wireless communication link over a private or public communication channel, such as the Internet. The server 23 also hosts a server database 32. Alternatively, the server database 32 may be located remote from the server 23, for example, in a manner as discussed above.

The server 23 may be connected to one or more taxing authorities, for example, the Illinois Department of Revenue (IDOR), over a private or public communication network for electronic filing of the appropriate tax forms and verification. Alternatively, the client 22 can be connected to the taxing authority for the purpose of electronic filing and/or verification of the electronic filing of tax forms.

Figure 1B:
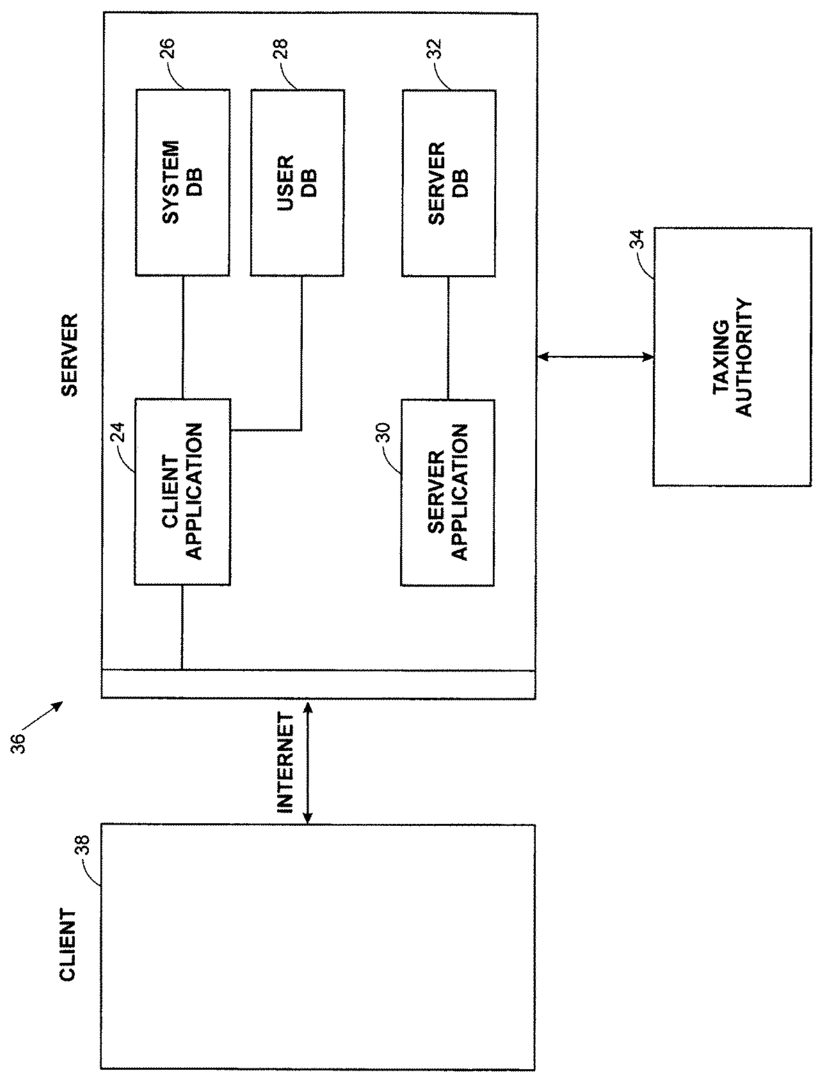
FIG. 1B is a block diagram of an alternative exemplary architecture of the system illustrated in FIG. 1A.
Figure 3A:
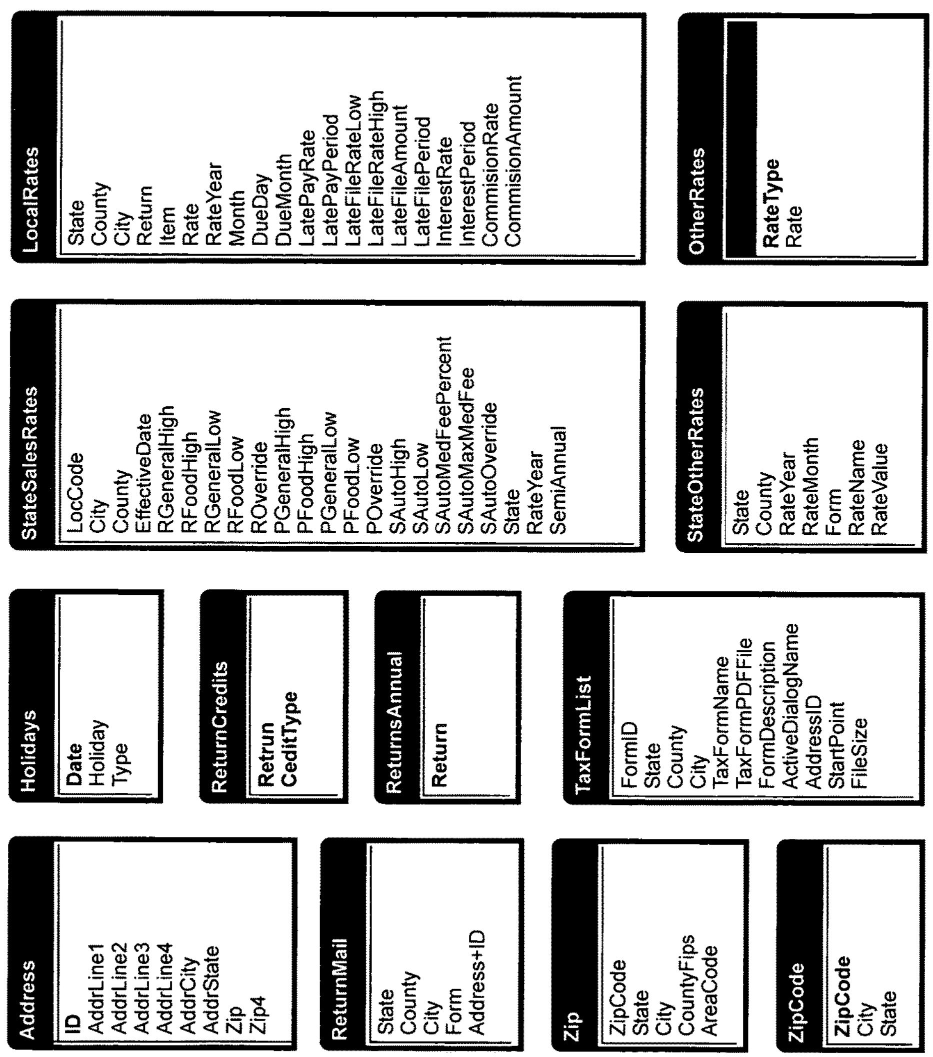

An alternate web-based architecture is illustrated in FIG. 1B and generally identified with the reference numeral 36. In this embodiment, the client 38 accesses the system 36 over a public communications network, such as the Internet. In this embodiment, the entire system is hosted on the remote server 36. More particularly, the system application 24, as well as the server application 30, are hosted by the remote server 36. One or more of the system database 26; user database 28 and the server database 32 may be hosted on the server 36 or one or more remote servers (not shown).

The databases 26, 28 and 32 are used by the client 24 and server 30 applications to perform the various functions of the system. In particular, the user database 28 is populated by the user and includes various data that is input by the user including but not limited to receipts, deductions and purchases as well as data regarding the business entity involved and the preparer.

Figure 4:
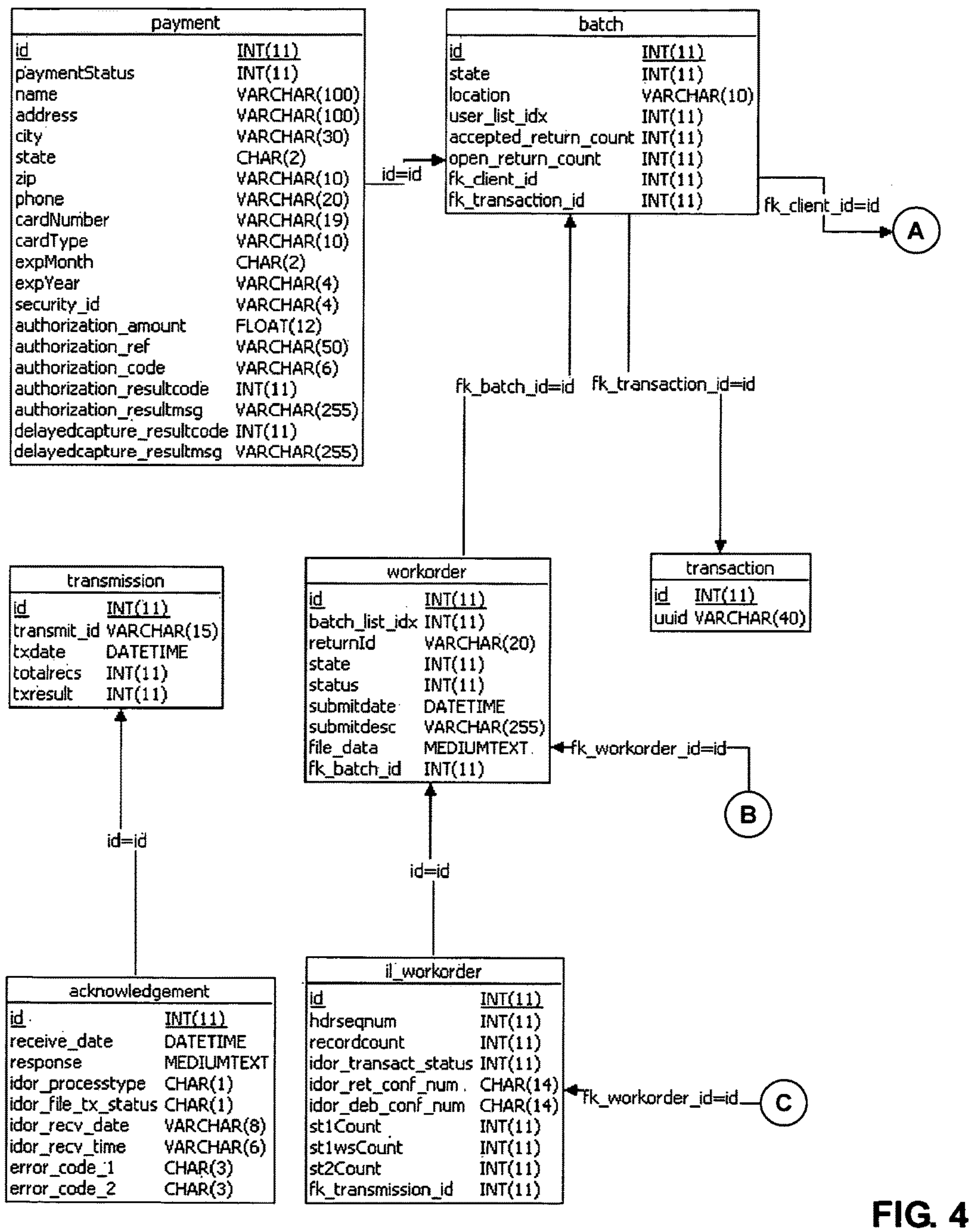
FIGS. 4 and 4A represents a database schema for a server side system database in accordance with the present invention.
Figure 4A:
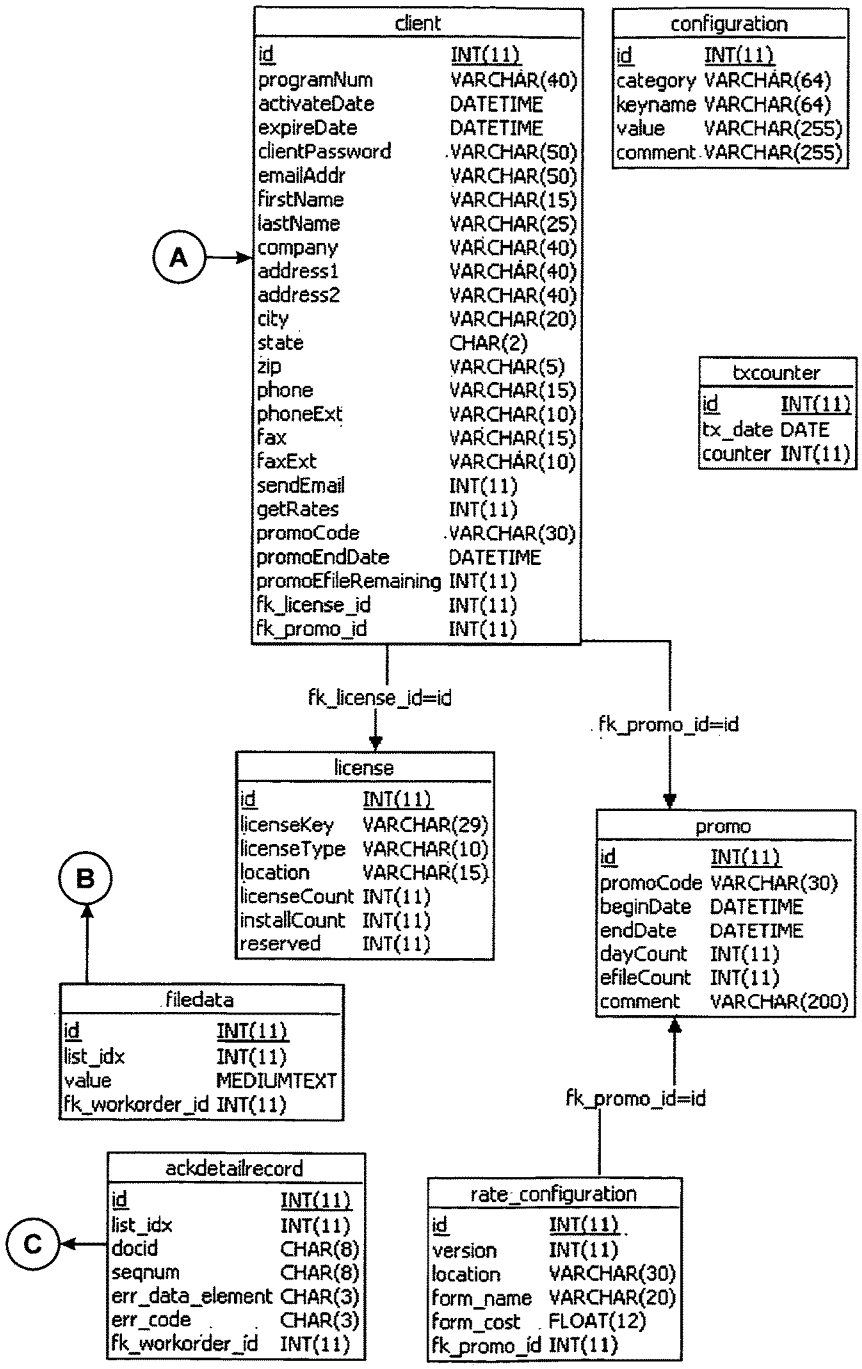

An exemplary database schema for the user database 28 is illustrated in FIGS. 2A-2N. The system database 26 includes various data including the appropriate tax forms and tax rates. An exemplary database schema for the system database 26 is illustrated in FIGS. 3A-3M. The server database 32 includes various information relating to registration and licensing of the system. An exemplary database schema for the server database is illustrated in FIGS. 4 and 4A.

Graphical User Interface

FIGS. 5A-5M represent an exemplary graphical user interface (GUI) which illustrates operation of the system. FIG. 6 is an exemplary GUI for creating a profile for a new tax preparer. In accordance with one aspect of the system, users input data directly into the GUI. The data input into the GUI is stored in the user database 28 (FIGS. 1A and 1B) and used by the system to generate completed state and local sales and use tax returns in a manner that is transparent to the user. In addition, the system is optionally able to file the completed tax returns directly with the state or local taxing authority and automatically obtain verification of filing and report the verification back to the user.

Figure 5A:
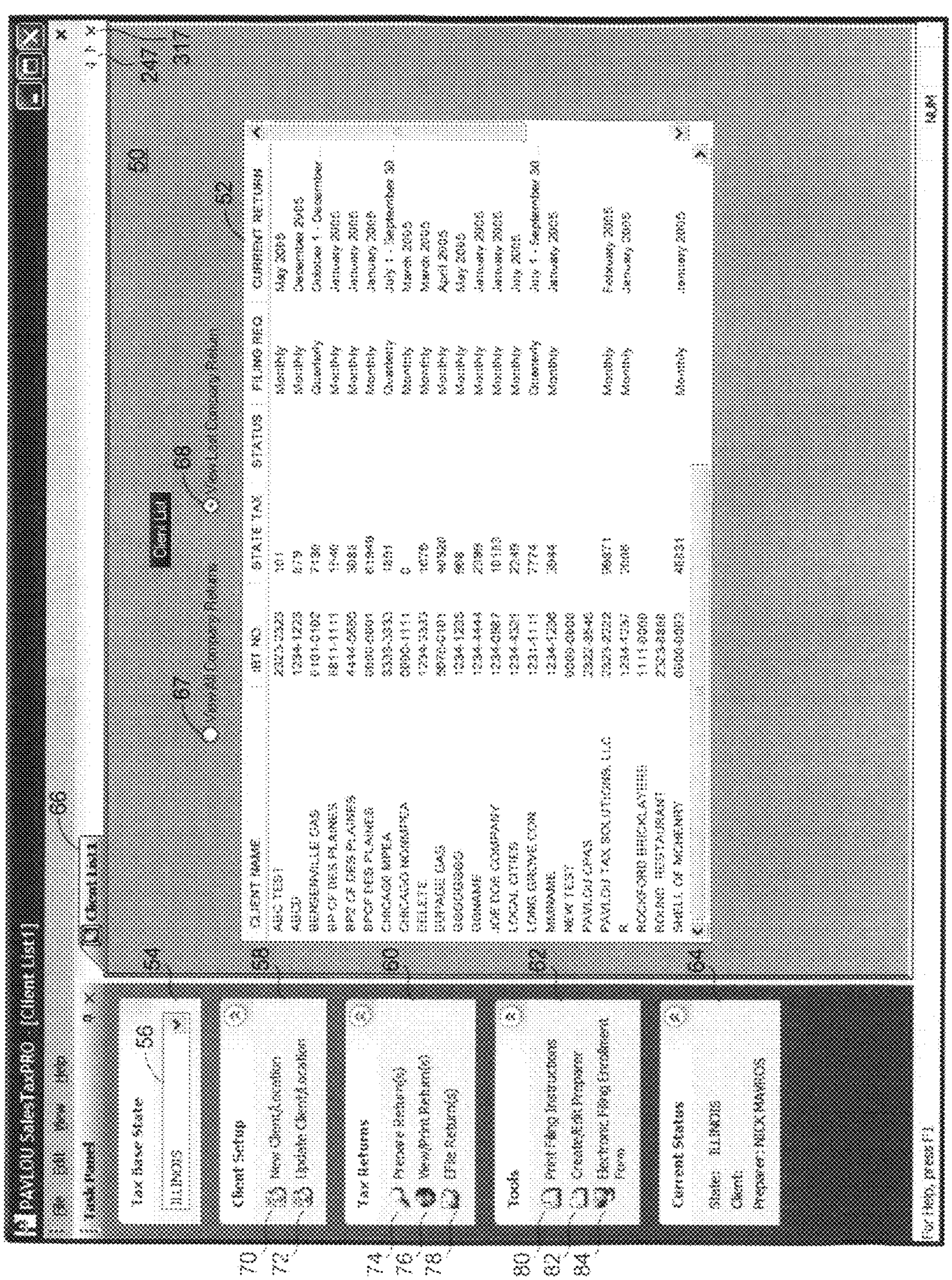
FIGS. 5A-5M illustrate an exemplary graphical user interface (GUI) for use with the present invention.
Figure 6:
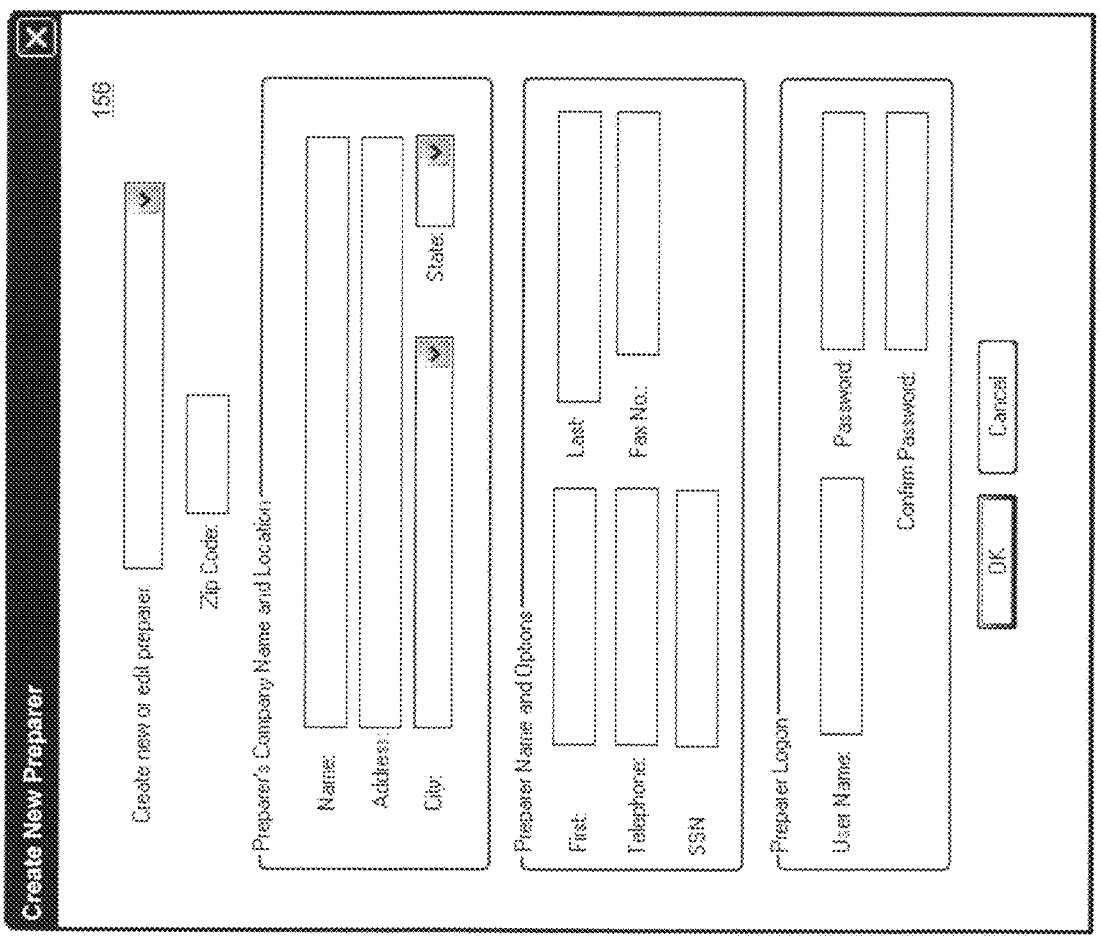
FIG. 6 is a view of one page of the GUI that is used for creating a new tax preparer.

Referring initially to FIG. 5A, a main page, generally identified with the reference numeral 50, is illustrated. The main page 50 includes a text box 52 that lists all of the clients that have been input into the system. The main page 50 includes multiple fields including: client name; company registration number or IBT No.; base state tax, status, filing frequency and an identification of the current return.

The system enables multiple client lists. As used herein, a client list is defined as a business operating in one or more locations. A particular client list may be selected by way of a tab 66. As will be discussed in more detail below, when a new client is added to the system, the client is automatically added to the client list alphabetically.

Various functions can be initiated from the main page 50. For example, the tax returns stored on the system can be viewed. In particular, two radio buttons 67, 68 may be provided. The button 66 enables all returns for a company highlighted on the client list to be viewed. The button 68 allows the only the last tax return to be viewed for the highlighted company.

The main page 50 also includes a Task Panel 54. The Task Panel 54 provides simplified navigation for various tasks related to preparation and electronic filing of tax returns. The desired client is simply highlighted in the client list 52 and the desired task from the task bar 54 is selected, which directs the user to next page of the process, as will be discussed in more detail below. The tasks on the task bar 54 may be broken down into various categories and selectable by the following navigation panels: tax base state 56; client setup 58; tax returns 60, tools 62 and current status 64. navigation panel 56 may be selected by a drop down. Illinois is shown as an example. The client setup navigation panel enables new clients to be added by way of a selectable icon 70, as well as existing client data to be updated by way of a selectable icon 72. The tax return navigation panel 60 may include the following navigation icons: prepare return icon 74; a view/print return icon 76 and an efile return icon 78. The task panel 54 may also include a tools navigation panel 62 which includes a various selectable icons, such as; print filing instructions icon 80; create/edit preparer icon 82 and an electronic filing enrollment icon 84. The task panel 54 may also include a current status navigation panel 64. This panel identifies the most current return and the preparer.

Figure 5B:
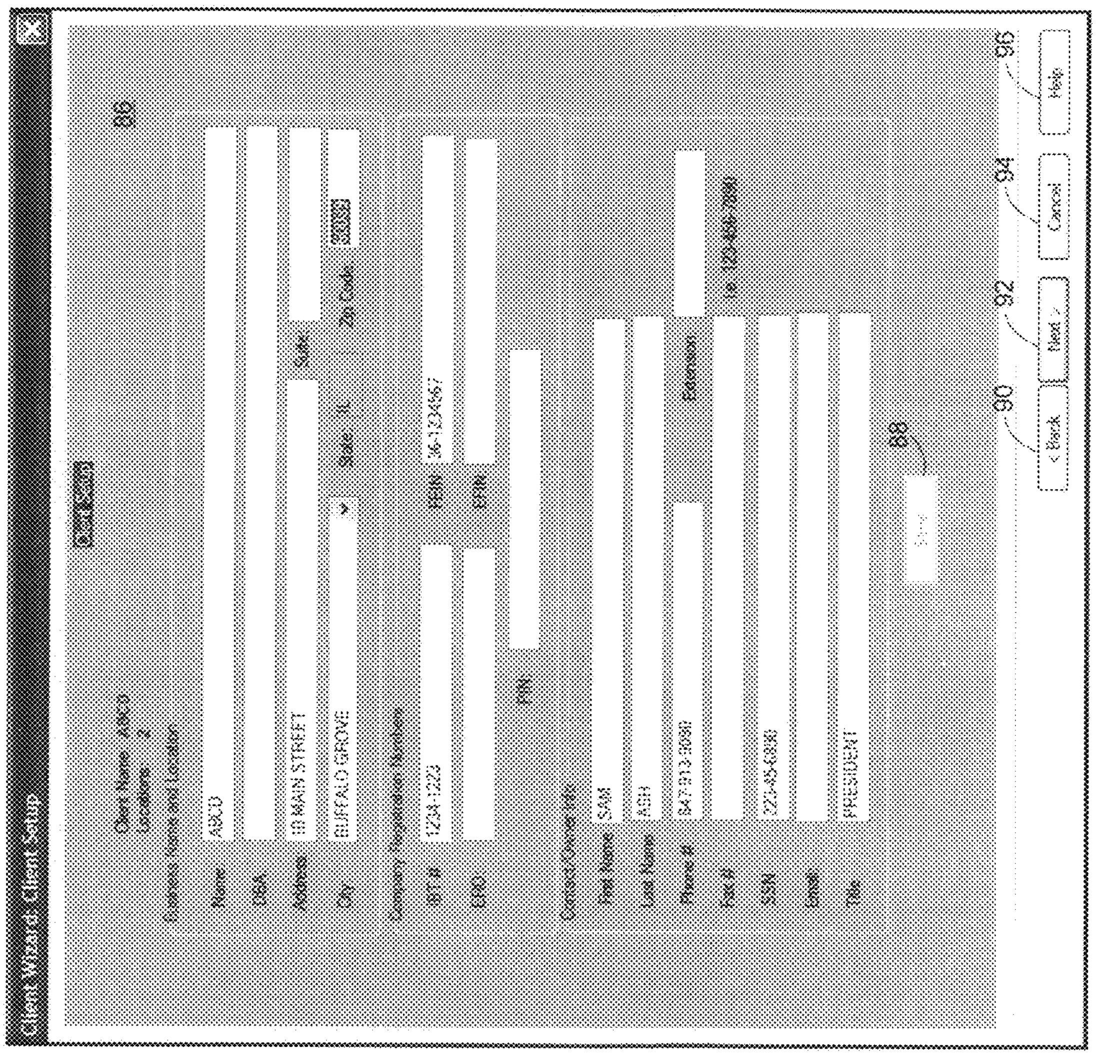

FIG. 5B illustrates a client setup page 86 which is displayed a user selects the new client icon 70 on the client setup navigation panel 58 (FIG. 5A) on the main page 50. For new clients, various data regarding the client and the associated business is entered into the various text boxes, as shown in FIG. 5B. As mentioned above, new clients can be added or existing client data can be modified depending on the selection of the icon 70 or 72 on the client list page 50. A save button 88 (FIG. 5B) is provided on the bottom of the page 86. Once the save button is selected, the client and business data is saved in the user database 28 (FIGS. 1A and 1B).

The client set up page 86 may also include various navigation type buttons, such as, a back button 90, a next button 92, a cancel button 94 and a help button 96. The back button returns the user to the main page 50 (FIG. 5A). The next button 92 advances the user to a welcome page 98 (FIG. 5D). The cancel button 94 deletes the data on the client setup page 86. The help button 96 displays instructions.

Figure 5C:
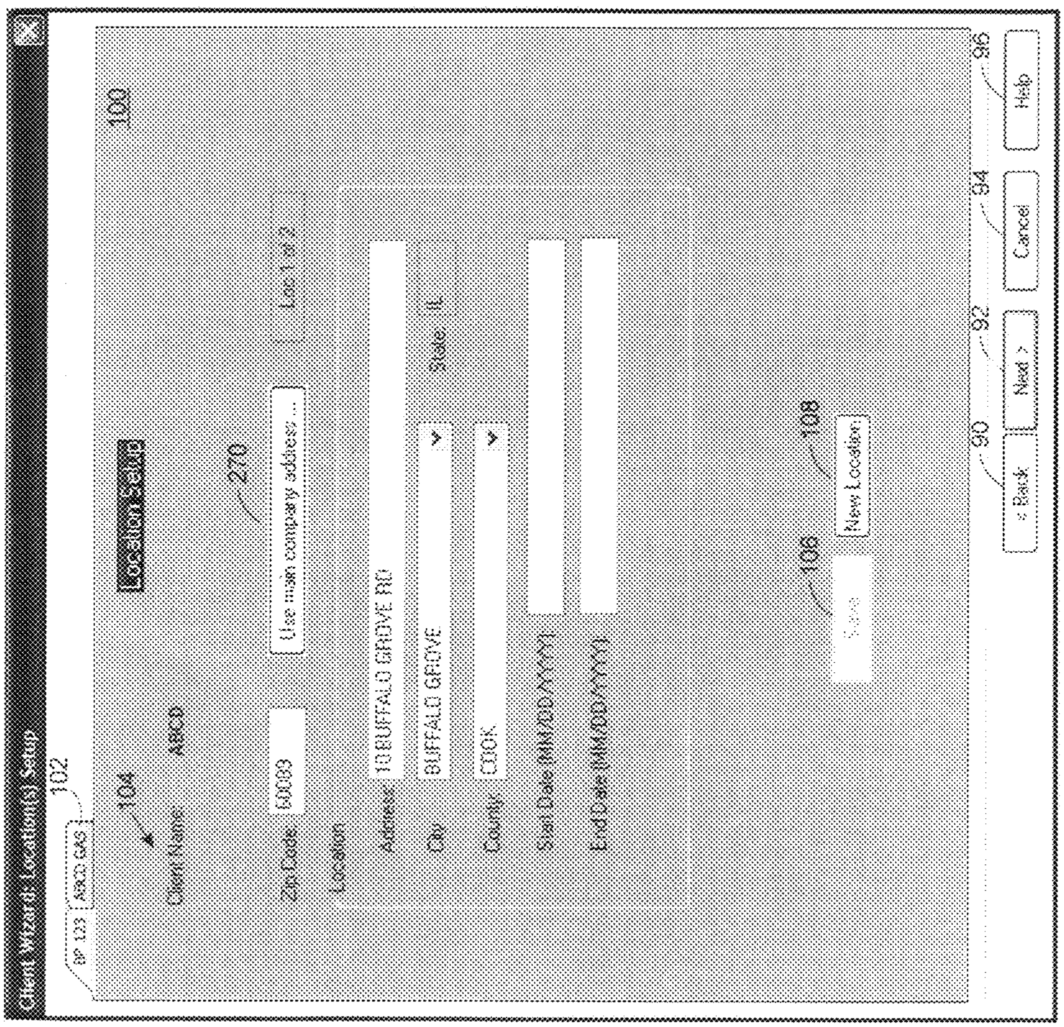
Figure 5D:
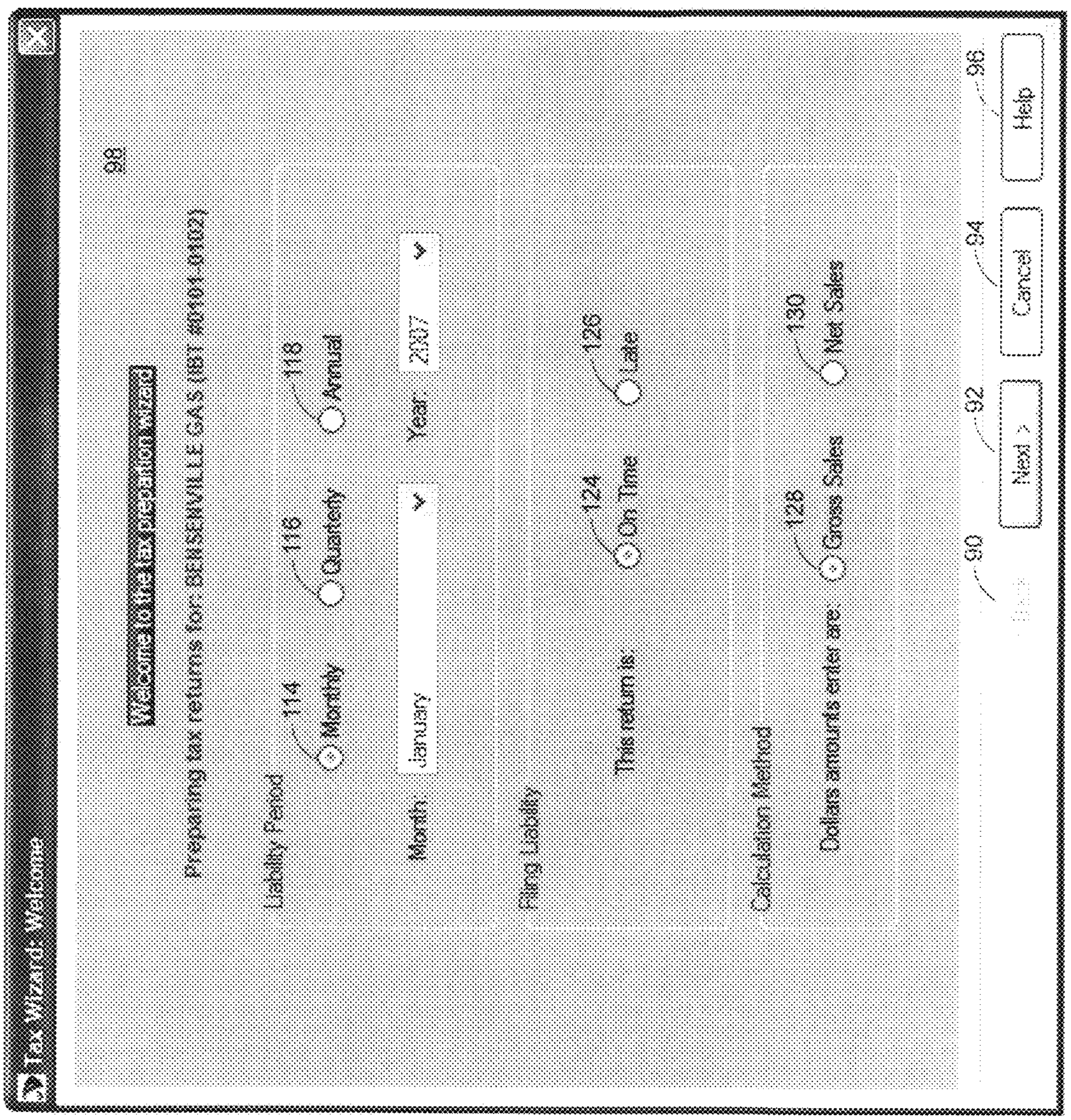

FIG. 5C illustrates a location setup page 100. The location setup page 100 is displayed when a user selects the update client location icon 72 on the main page 50 (FIG. 5A). The location setup page 100 allows a location for an existing client to be modified or a new location to be added. More particularly, the location setup page 100 includes a tab 102 for each location. In order to edit location data, the desired location tab 102 is selected. The selected location is displayed adjacent a client name field 104. As shown in FIG. 5C, the ABCD location tab has been selected. Once selected, the current location data is displayed. This data can be edited and saved by way of a save button 106. Whenever the new location button 108 is selected, a location setup page is displayed similar to the page 100. The new location is saved by way of the save button 106. Once saved, the new location is tabbed with a tab 102. The location setup page 100 includes the navigation buttons 90, 92, 94 and 96 which operate in the same manner as discussed above.

FIG. 5D illustrates a welcome page 98. The welcome page 98 is displayed in response to selection of the prepare return icon 74 (FIG. 5A) being selected on the main page 50 or alternatively in response to selection of the next button 92 on the client setup page 86 (FIG. 5B) or selection of the next button 92 on the location setup page 100 (FIG. 5C). Initially, a client is selected by highlighting the client on the client list 52 on the main page 50 (FIG. 5A). Assuming the prepare return icon 74 is selected, the welcome page 98 (FIG. 5D) is displayed. The welcome page 98 includes a liability period panel 110; a filing liability panel 112 and a calculation method panel 114. The liability period panel 110 allows a user to select a liability period; monthly, quarterly or annual by way three radio buttons 114, 116, or 118, respectively. Drop down menus 120 and 122 are used to select the month and year for the return to be prepared. The drop down menu 122 only identifies years supported by the system.

As mentioned above, the welcome page 98 also includes a filing liability panel 112. The filing liability panel 112 allows a user to select whether the return is on time or late, by way of two radio buttons 124 and 126, respectively. The calculation method panel 114 allows the user to select whether the calculation is based on gross sales or net sales by way of two radio buttons 128 and 130, respectively. The data entered on the welcome page 98 by the user is saved in the user database 28 (FIGS. 1A and 1B) when the user selects the next navigation button 94 (FIG. 5D) at the bottom of the welcome page 98.

In accordance with an important aspect of the invention, entry of data into the various text boxes triggers the various tax returns. For example, entry of data relating to gasoline or fuel sales triggers all state and local tax forms relating to such sales. Similarly, entry of sales data relating to prepared foods triggers all state and local forms relating to prepared foods, etc.

Figure 5E:
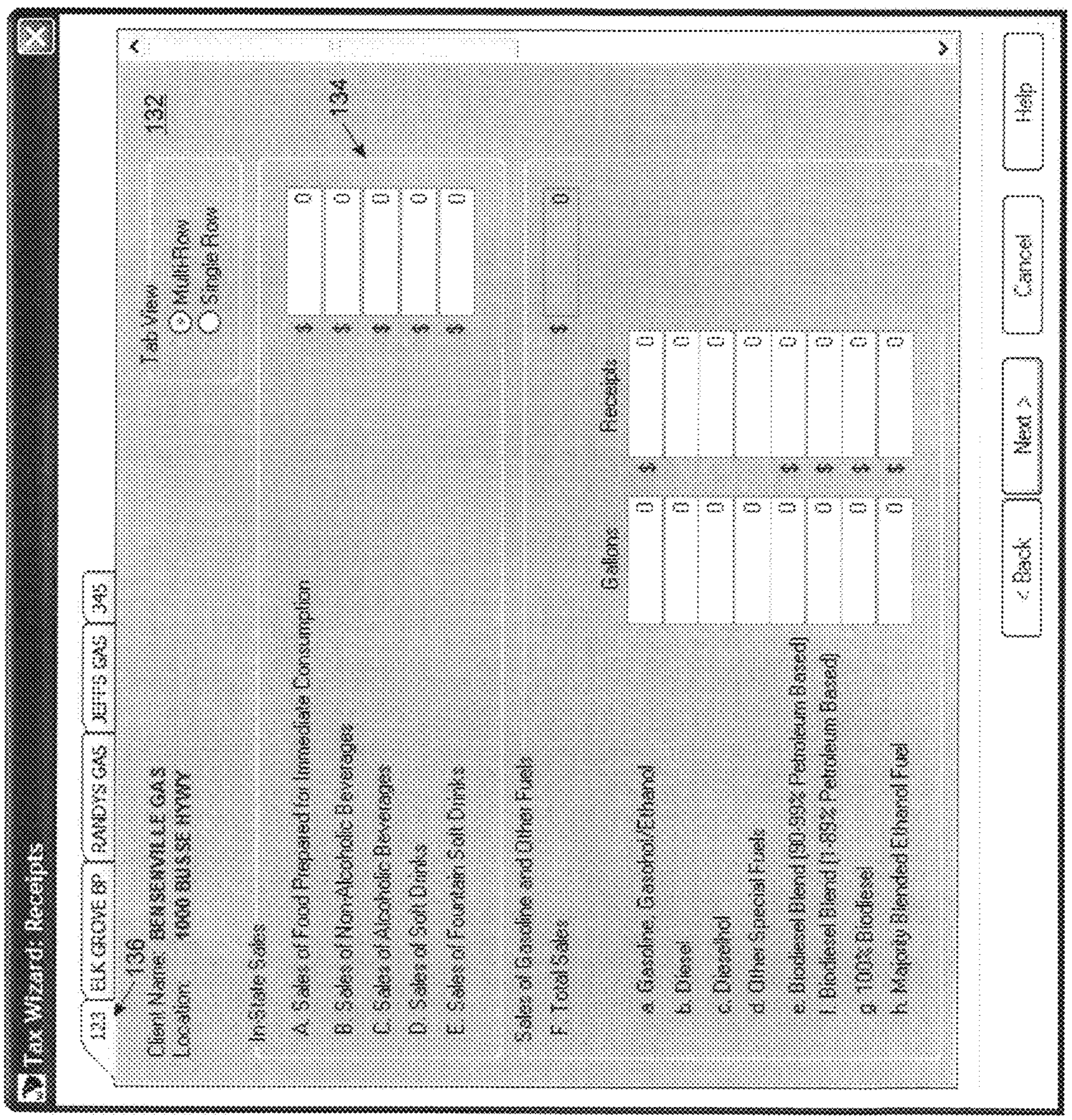
Figure 5F:
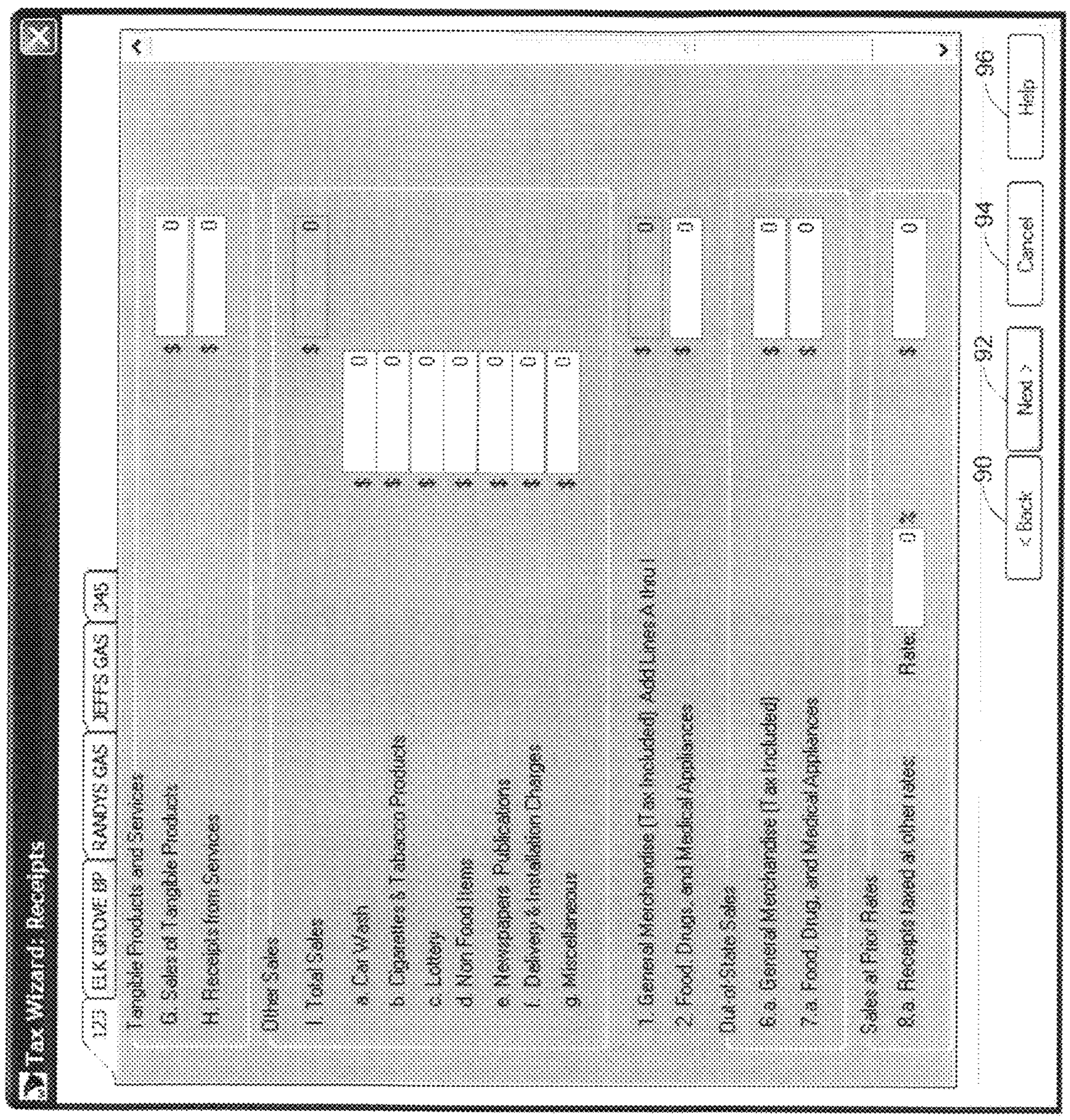
Figure 5G:
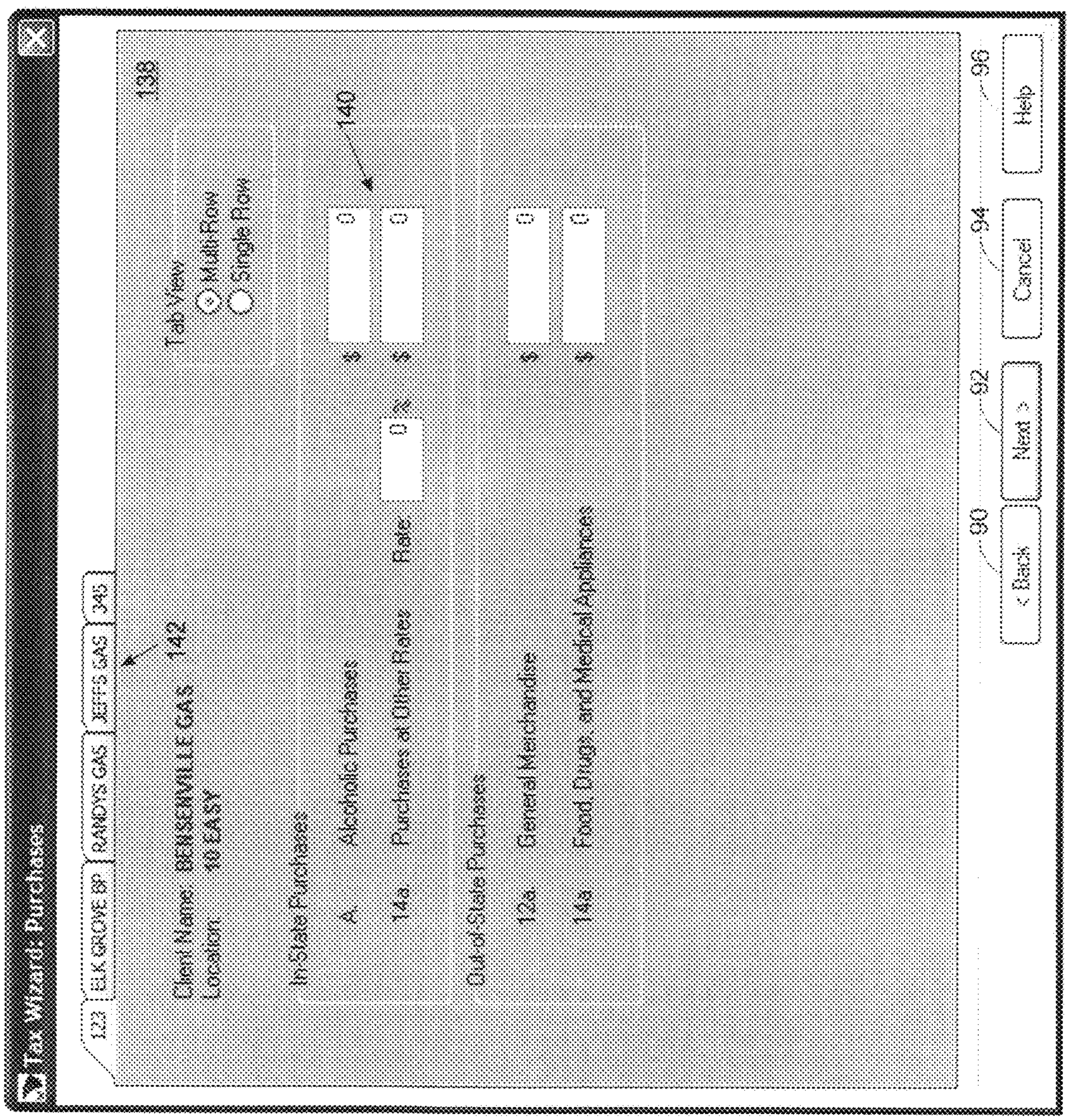
Figure 5H:
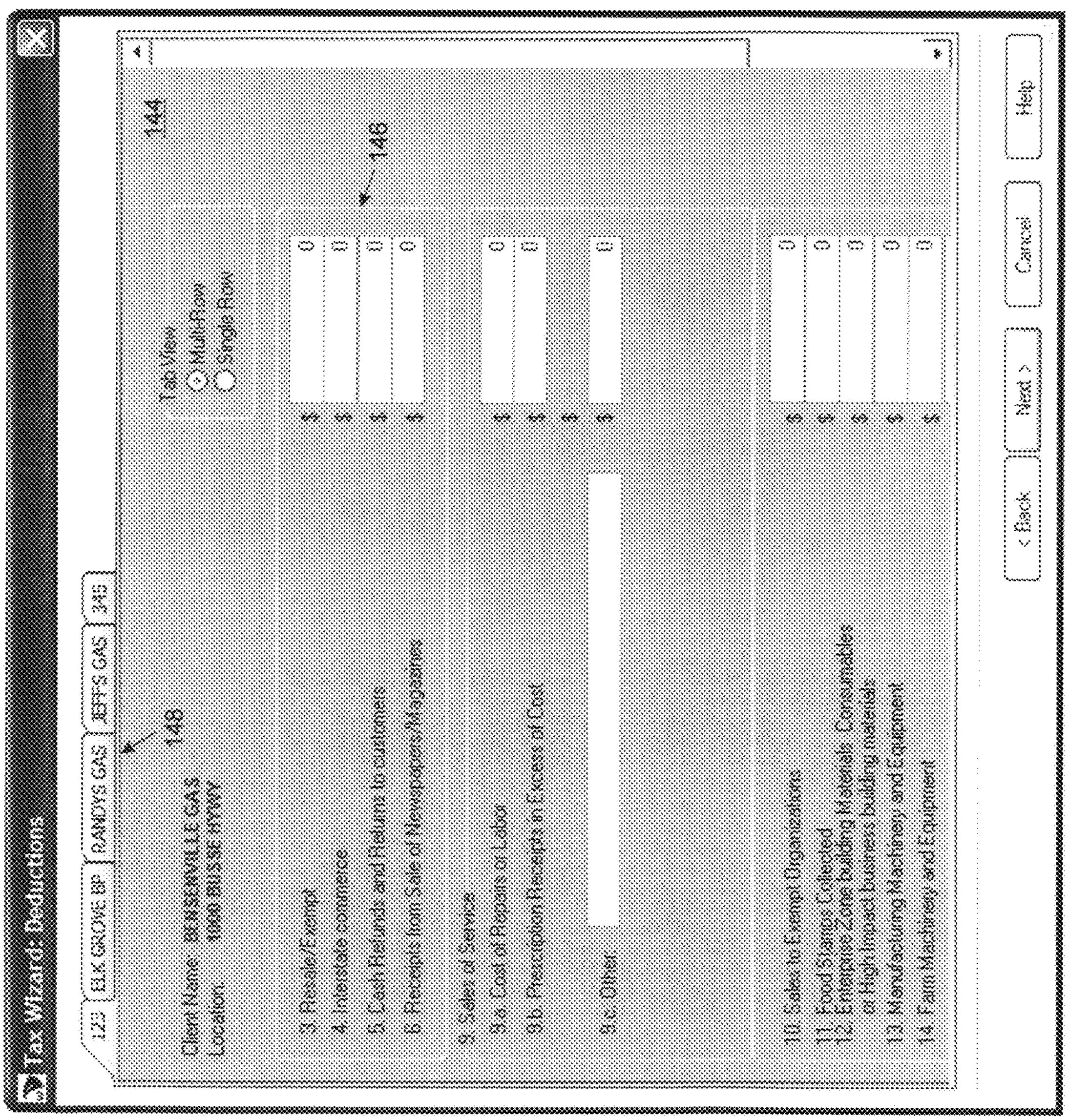
Figure 5I:
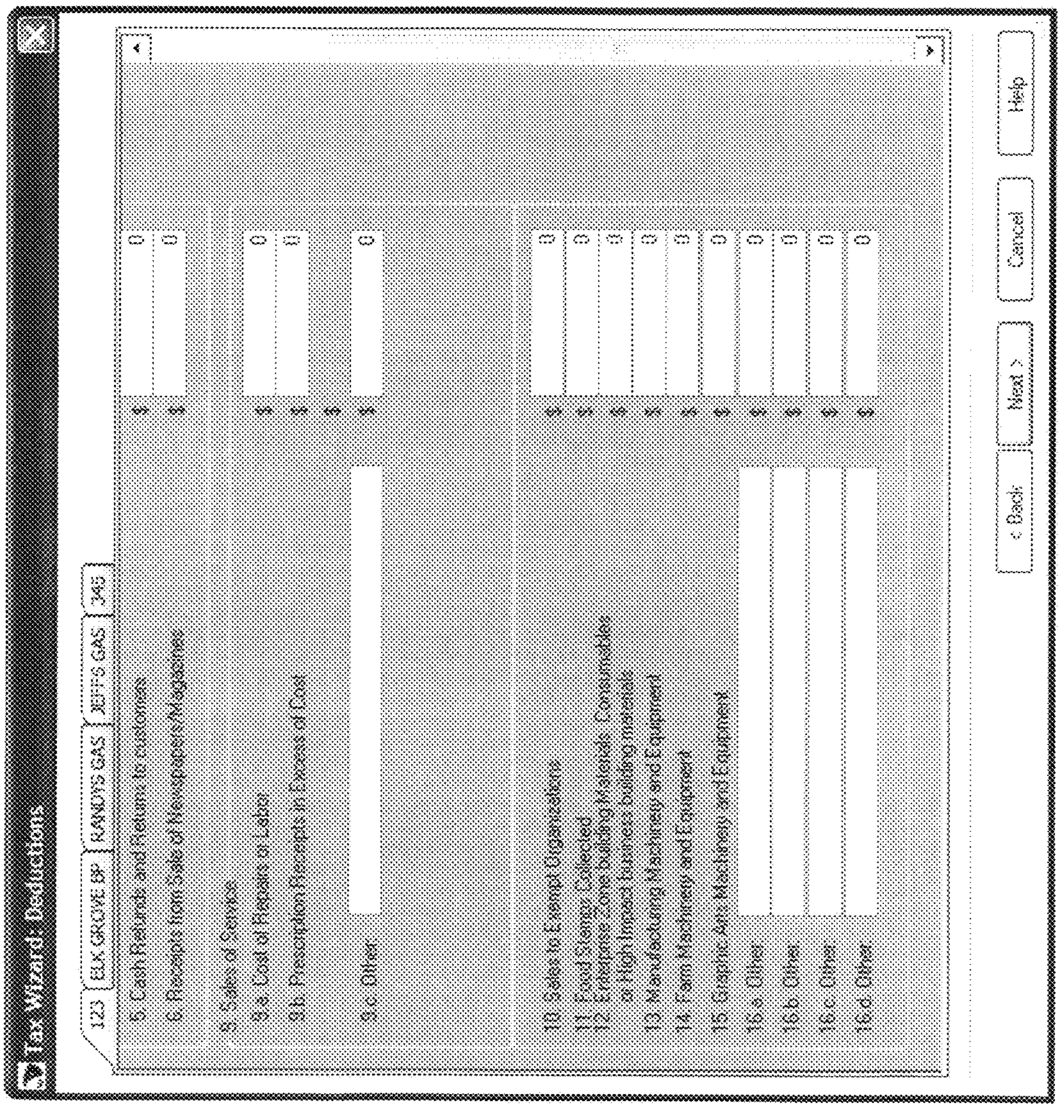
Figure 5J:
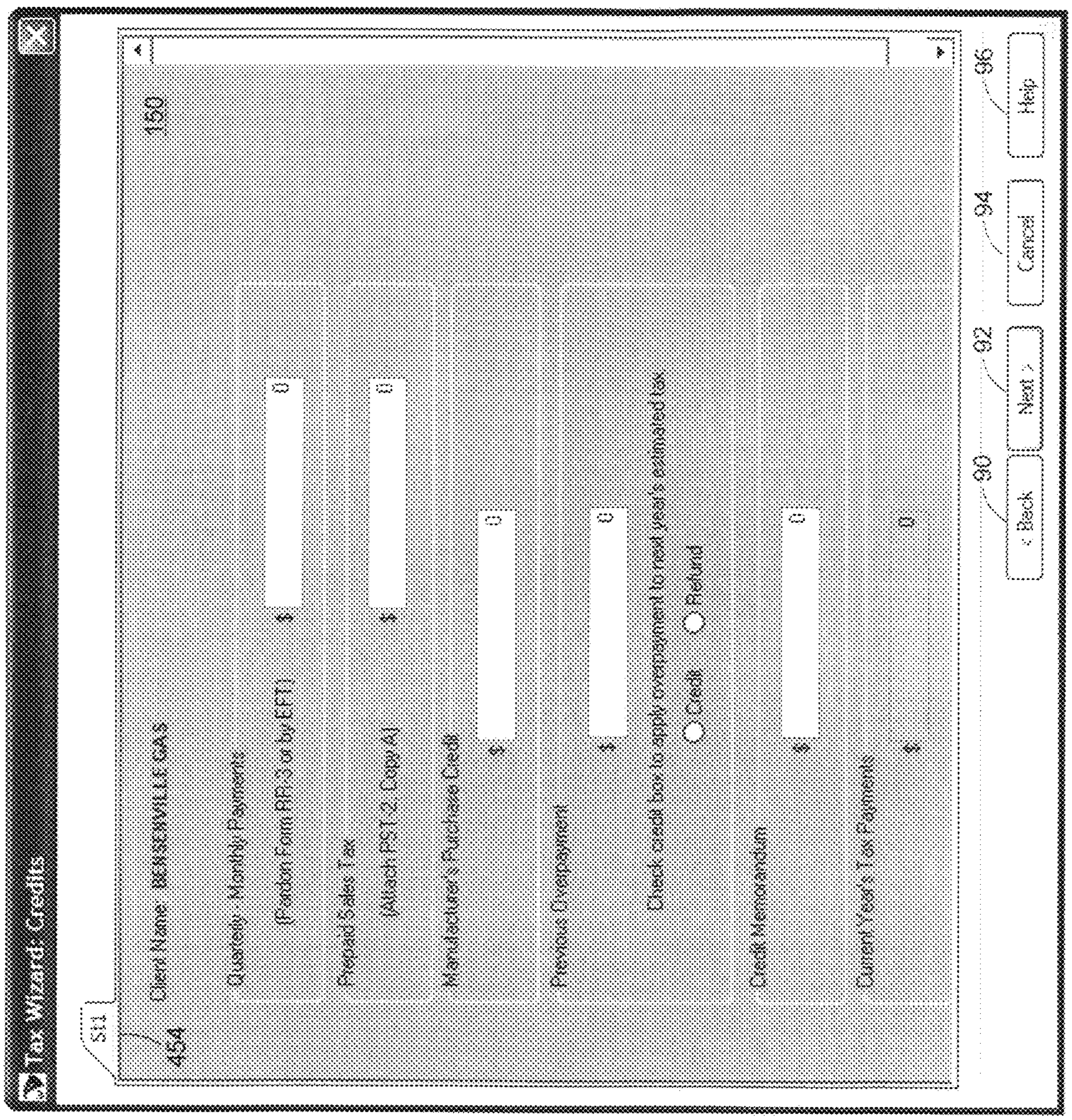
Figure 5K:
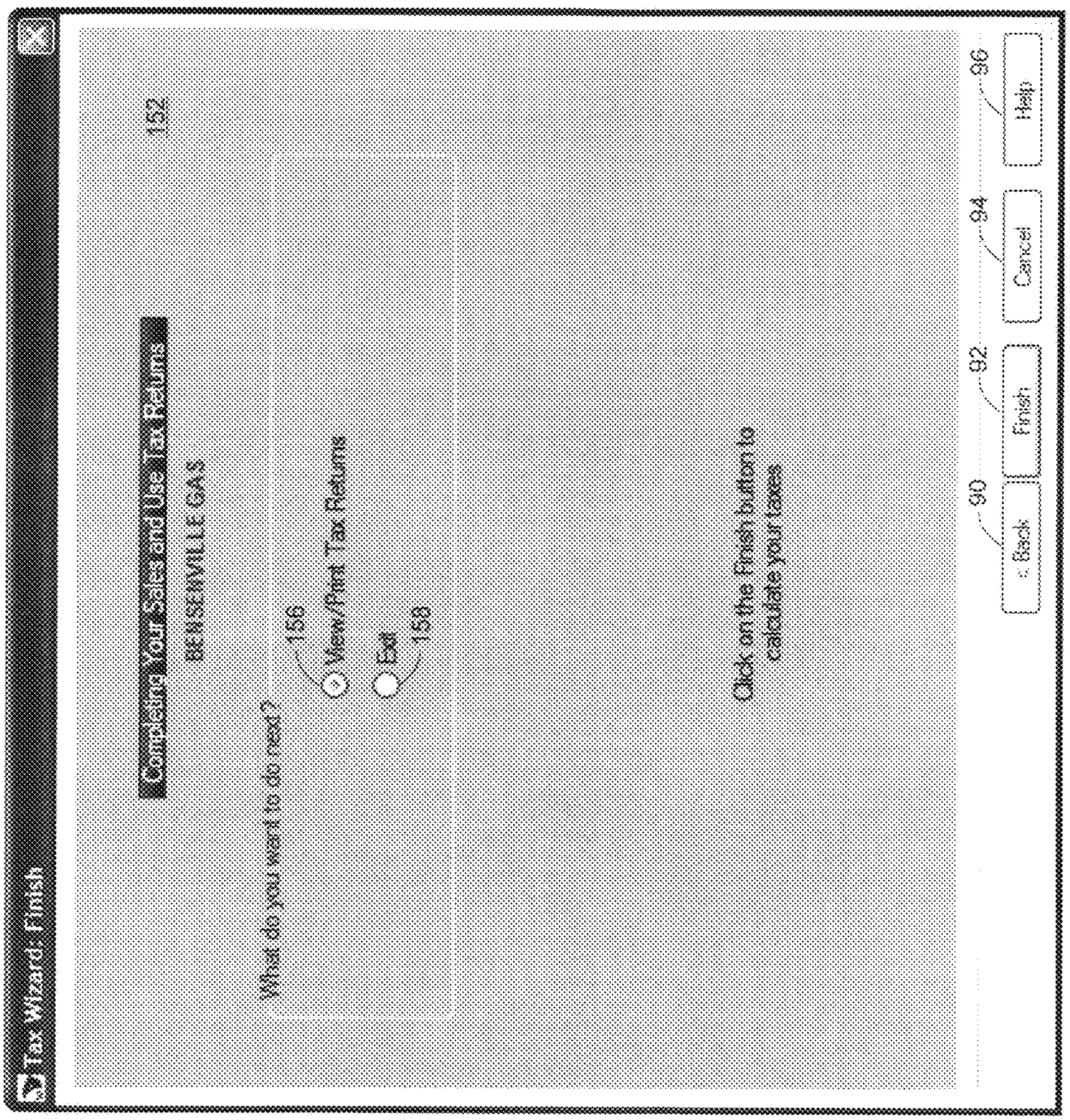

After the user selects the next button 92 on the welcome page 98 (FIG. 5D), the receipts page 132 is displayed as illustrated in FIGS. 5E and 5F. The receipts page 132 includes various text boxes, generally identified with the reference numeral 134, for entering data with respect to sales of various goods by category. These categories include: in state sales; gasoline and fuel sales; tangible products and services, other sales, such as car wash etc, out of state sales and sales at different tax rates.

The receipts page 132 may be provided with various tabs, generally identified with the reference numeral 136, for the various client locations. Receipts data for each location can be entered by selecting the tab for the desired location and inserting the data into the text boxes 134 for that location. The receipts data for all locations is entered by repeating the process until receipts data for all locations has been entered.

Once the sales or receipts data for all locations has been entered, selection of the next button 92 on the bottom of the receipts page 132 (FIGS. 5E and 5F) causes a purchases page 138 (FIG. 5G) to be displayed and the data to be saved in the user database 28 (FIGS. 1A and 1B). The purchases page 138 (FIG. 5G) includes various text boxes, generally identified with the reference numeral 140, for entering data with respect to in state and out of state purchases of various categories of goods, such as alcohol, food, drugs and medical appliances.

The purchases page 138 may be provided with various tabs, generally identified with the reference numeral 142, for the various client locations. Purchase data for each location can be entered by selecting the tab for the desired location and inserting the data into the text boxes 140 for that location. The purchases data for all locations is entered by repeating the process until purchase data for all locations has been entered.

Once the purchase data for all locations has been entered, selection of the next button 92 on the bottom of the purchase page 138 (FIG. 5G) causes a deductions page 144 (FIGS. 5H and 5I) to be displayed and the data to be saved in the user database 28 (FIGS. 1A and 1B). The deductions page 144 (FIGS. 5H and 5I) includes various text boxes, for various tax deductions.

The deductions page 144 may be provided with various tabs, generally identified with the reference numeral 148, for the various client locations. Deduction data for each location can be entered by selecting the tab for the desired location and inserting the data into the text boxes 146 for that location. The deduction data for all locations is entered by repeating the process until purchase data for all locations has been entered.

Once the deductions data for all locations has been entered, selection of the next button 92 on the bottom of the deductions page 138 (FIGS. 5H and 5I) causes a credits page 150 (FIG. 5J) to be displayed and the data to be saved in the user database 28 (FIGS. 1A and 1B). The credits page 150 includes various text boxes, for various tax credits.

Once the tax receipt data (FIG. 5F); purchases data (FIG. 5G); deduction data (FIGS. 5H and 5I) and the credit data (FIG. 5J) has been entered for all client locations, selection of the next button 92 on the bottom of the credits page 150 causes the data to be saved in the user database 28 (FIGS. 1A and 1B) and a finish page 152 (FIG. 5K) to be displayed. The finish page 152 includes several navigation buttons, such as a back button 90; a cancel button 94 and a help button 96. The finish page 152 also includes a finish button 154. Selection of the finish button 154 causes the taxes to be calculated and the tax returns and schedule page 153 (FIG. 5L) with the appropriate tax form(s), for example, an Illinois ST-1 Sales and Use Tax Return, as illustrated. The finish page 152 (FIG. 5K) may optionally include several radio buttons, such as a radio button 156, which allows the populated tax return to be viewed or printed and an exit radio button, which returns the user to the main page 50 (FIG. 5A).

Figure 5L:
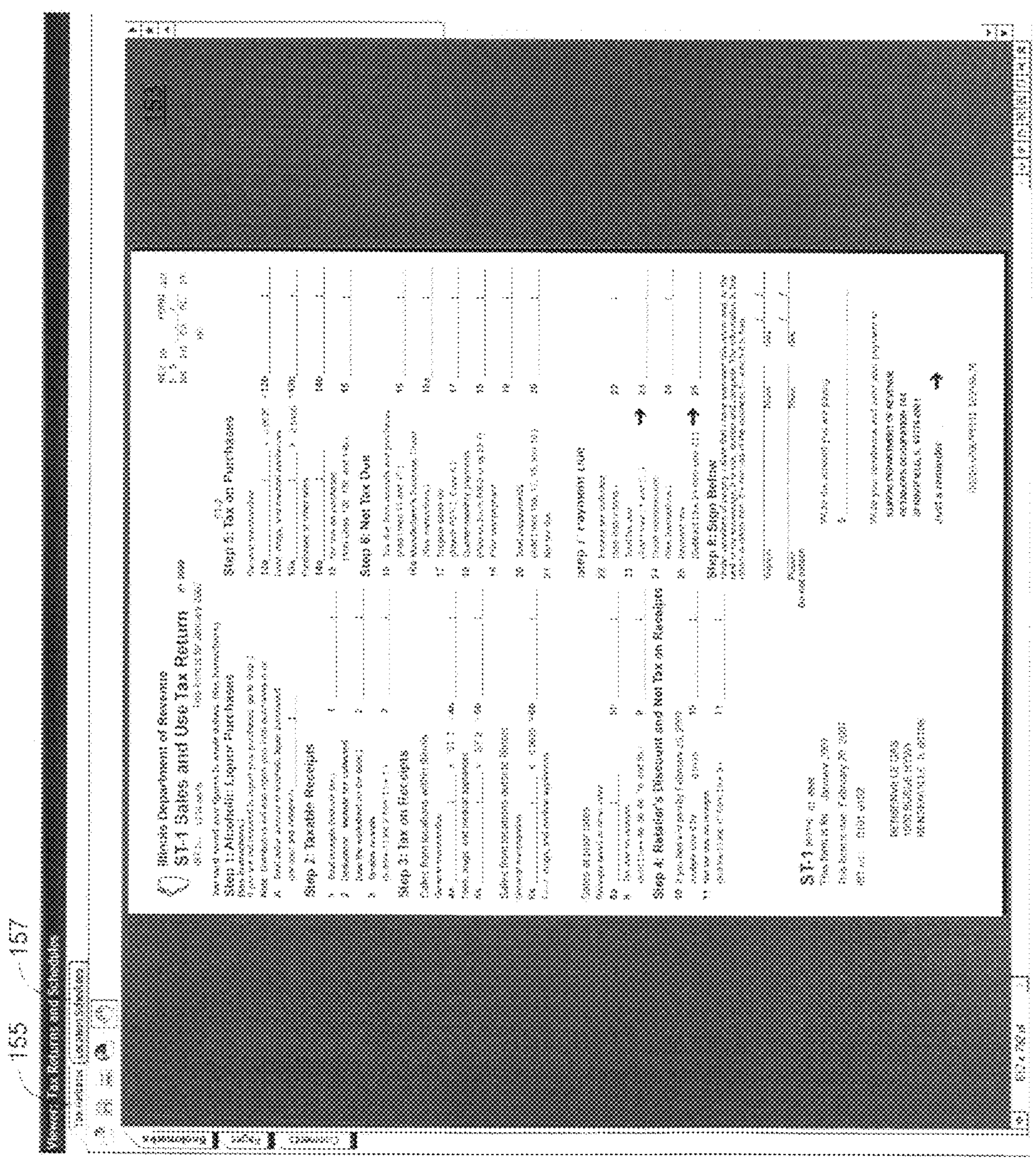
Figure 5M:
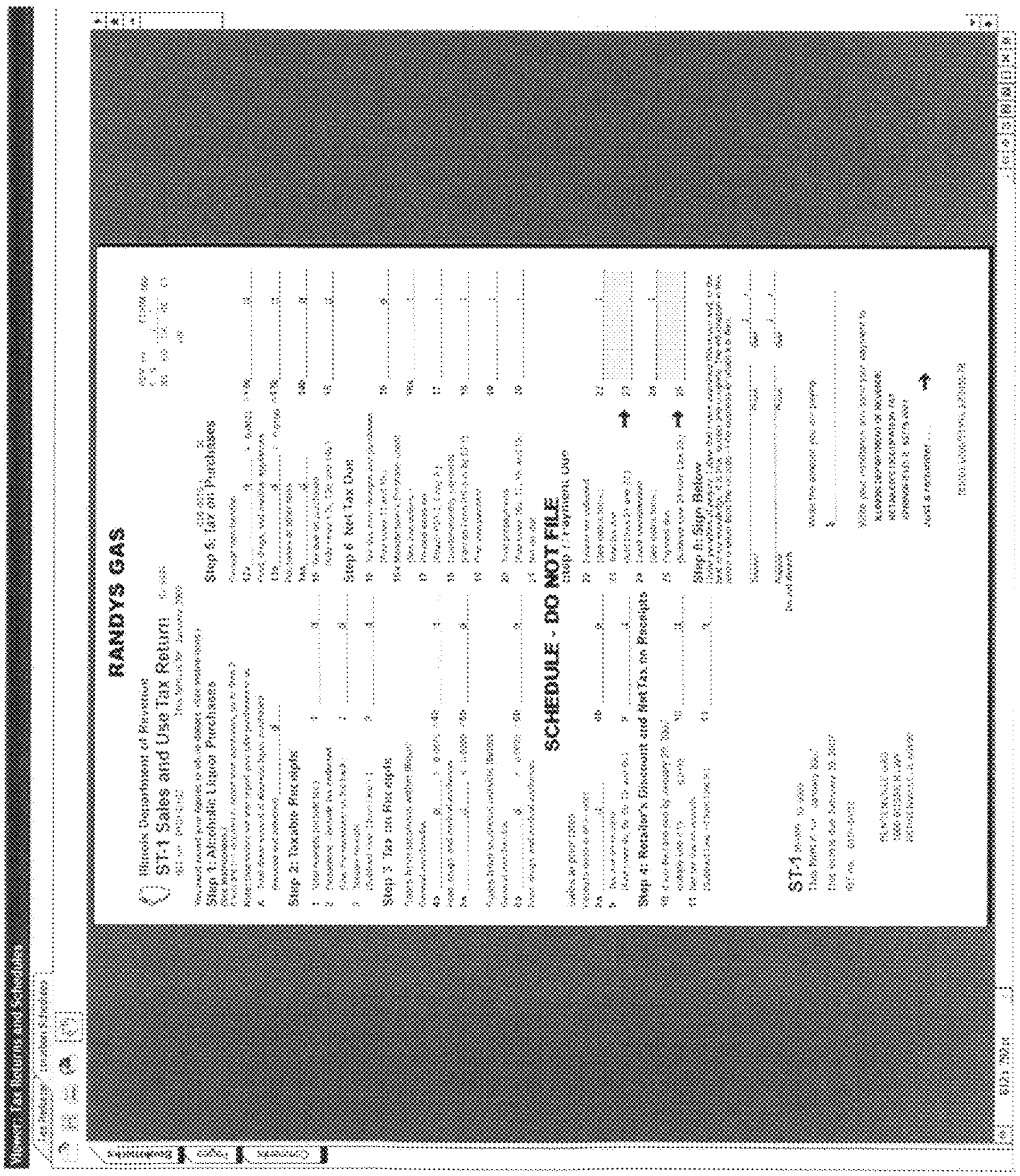

The tax returns and schedules page 153 (FIG. 5K) includes a tax return tab 155 and a location schedule tab 157. Selection of the tax return tab 155 displays a tax return form for all client locations, as shown in FIG. 5L. Similarly, selection of the location tab 157 displays a location schedule, as illustrated in FIG. 5M.

The tax return and schedule page 153 may includes a tab 160 for tax returns and a tab 162 for tax schedules. Various icons may also be provided for processing completed tax returns and schedules. These icons may include a save icon 164 which allows for local saving of the tax return or schedule displayed. A print icon 166 may also be provided which allows a tax return or schedule being displayed to be printed. A mail icon 168 may be provided which allows the tax return or schedule being displayed to be emailed, for example by way of an email application, such as Outlook. Finally, a folder icon 170 may be provided which allows tax returns and/or schedules to be stored in folders.

As mentioned above, the main page 50 (FIG. 5A) of the GUI includes an icon 82 which allows a user to create or edit a tax preparer when selected. FIG. 6 illustrates an exemplary page 156 that may be displayed when the icon 82 is selected.

Client Side Software Flow Charts

Figure 7:
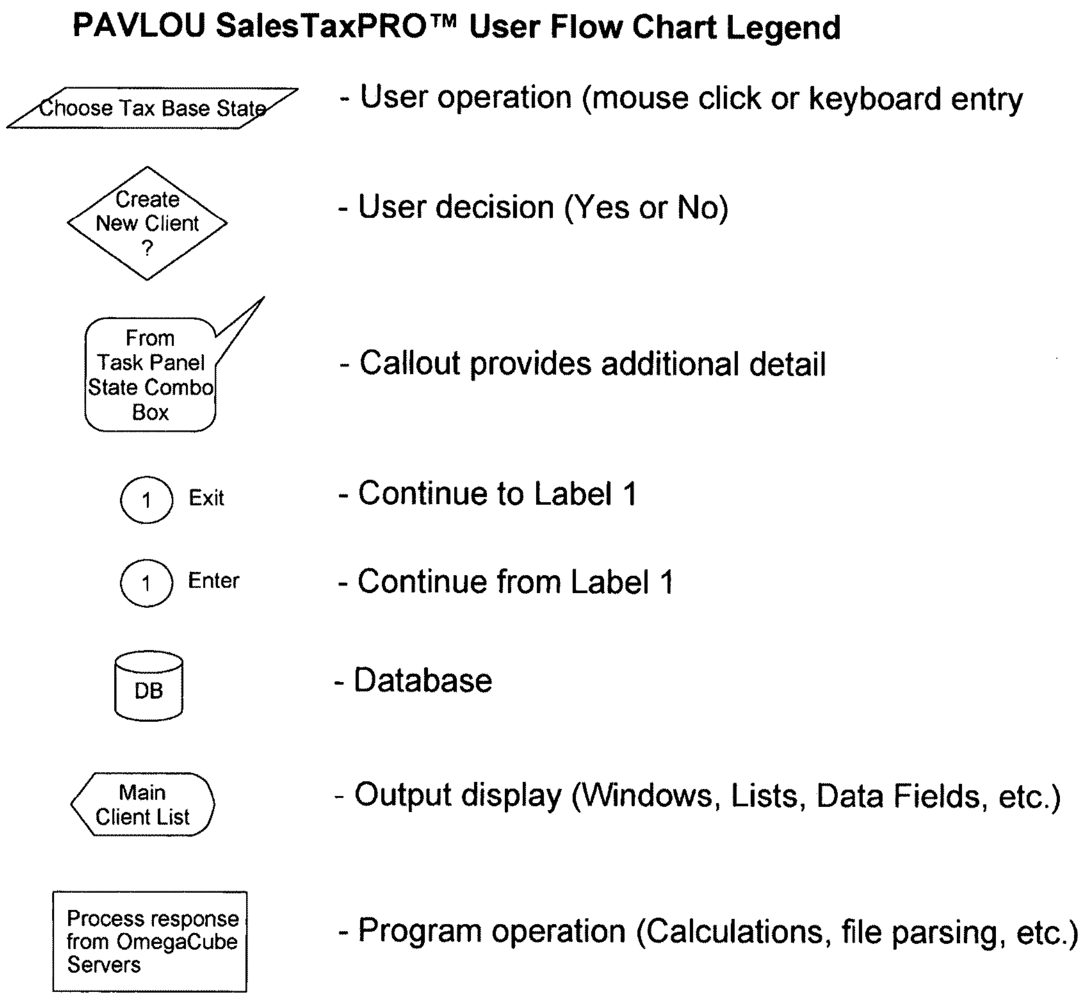
FIG. 7 is a flow chart legend for the flow chart for the client side flow chart illustrated in FIGS. 8-28.
Figure 28:
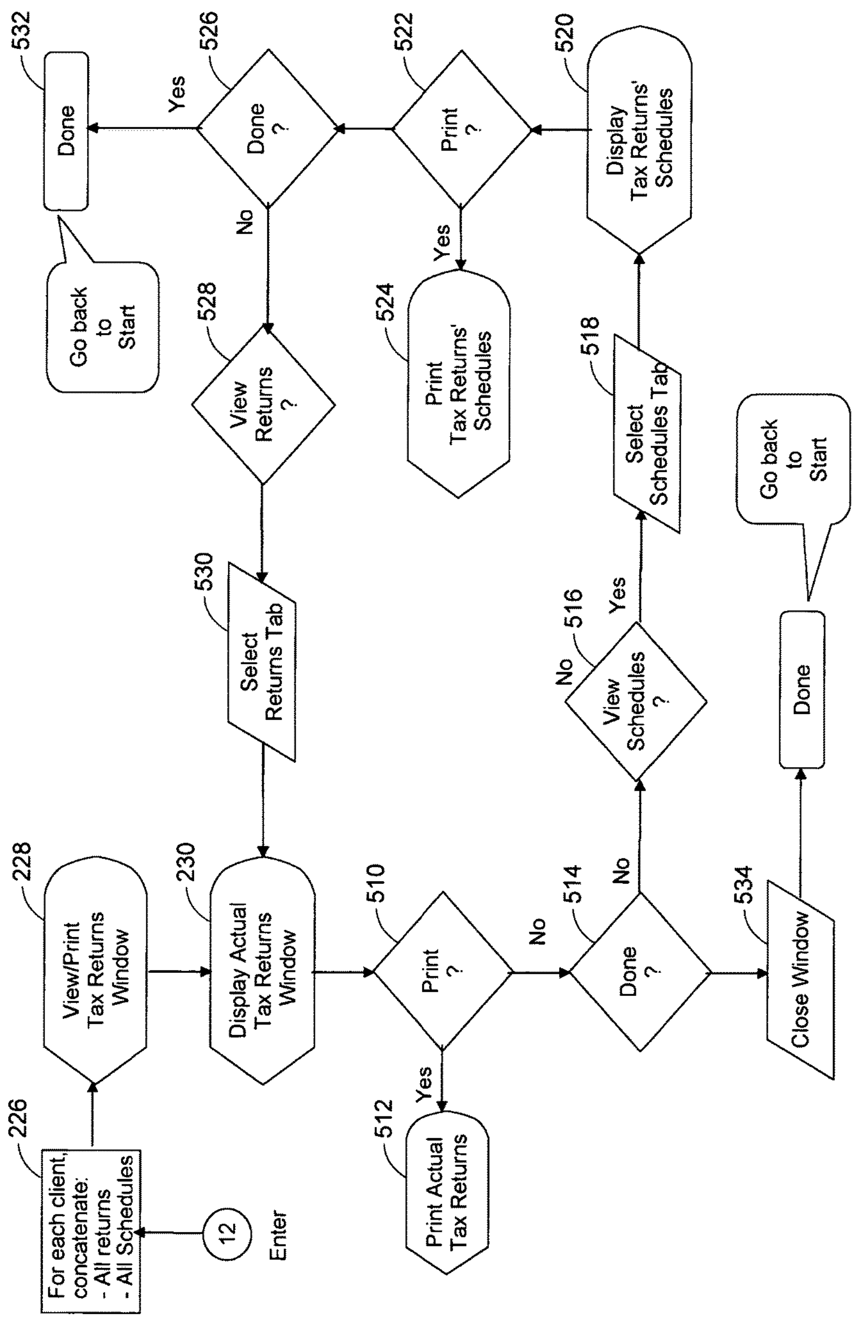
Figure 29:
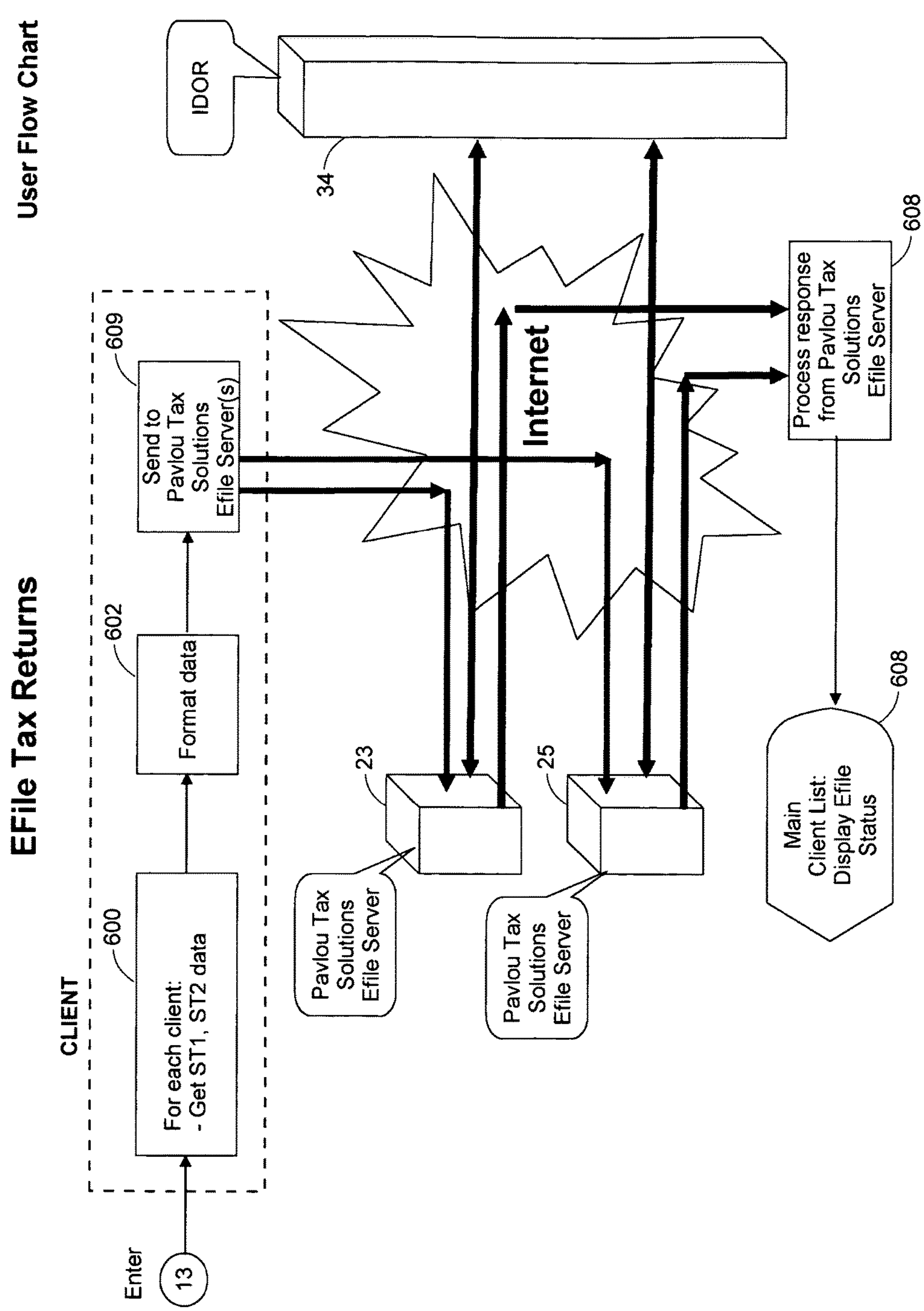
FIG. 29 is a diagram illustrating the data flow in an optional embodiment of the invention which includes electronic filing of tax returns.

FIGS. 8-29 illustrate the client side software flow charts for the system in accordance with the present invention. FIG. 7 is a flow chart legend for the flow charts illustrated in FIGS. 8-28. FIG. 29 is a flow chart for an optional feature for filing tax returns electronically.

Figure 8:
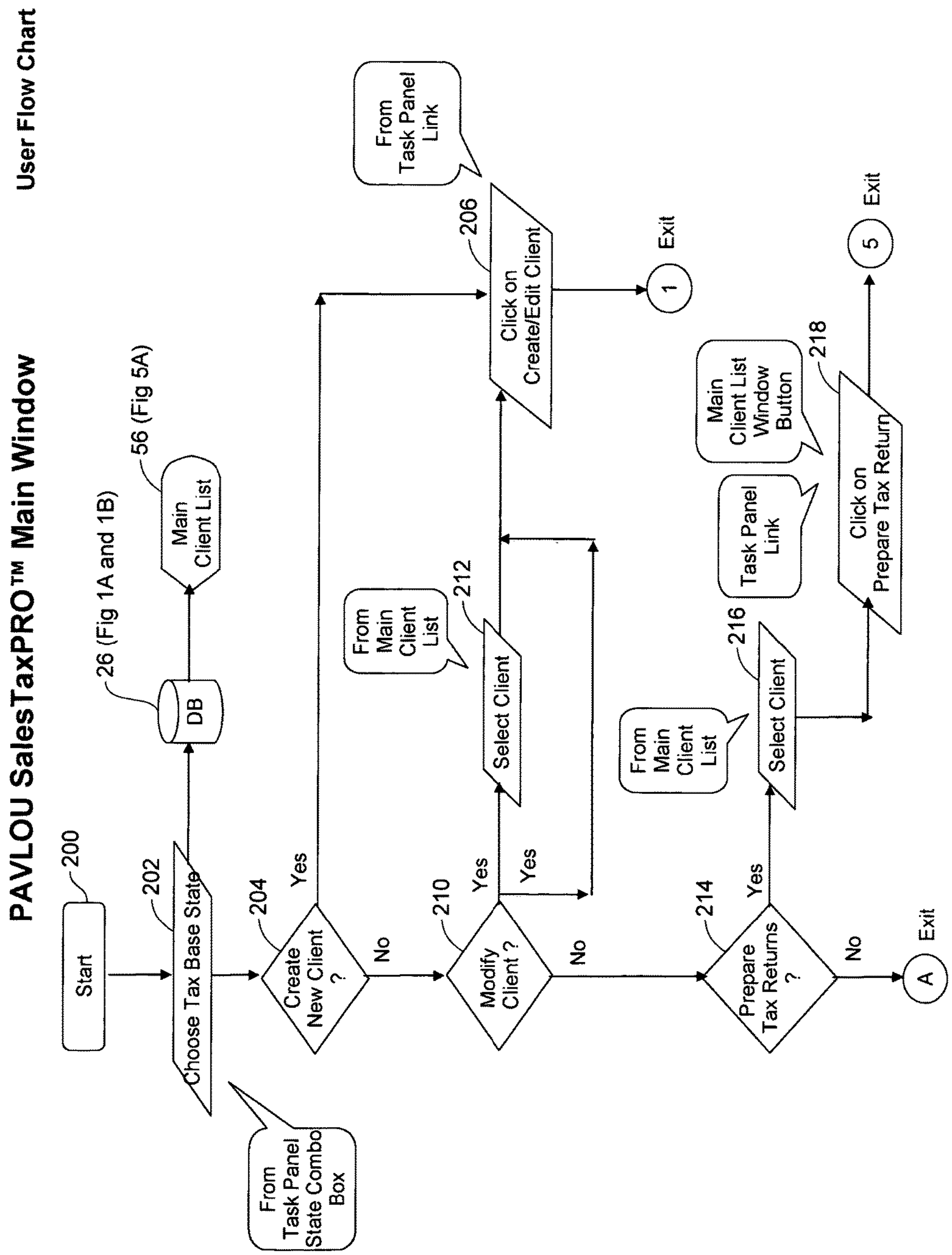
FIGS. 8-28 are exemplary client side flow charts for the present invention.
Figure 9:
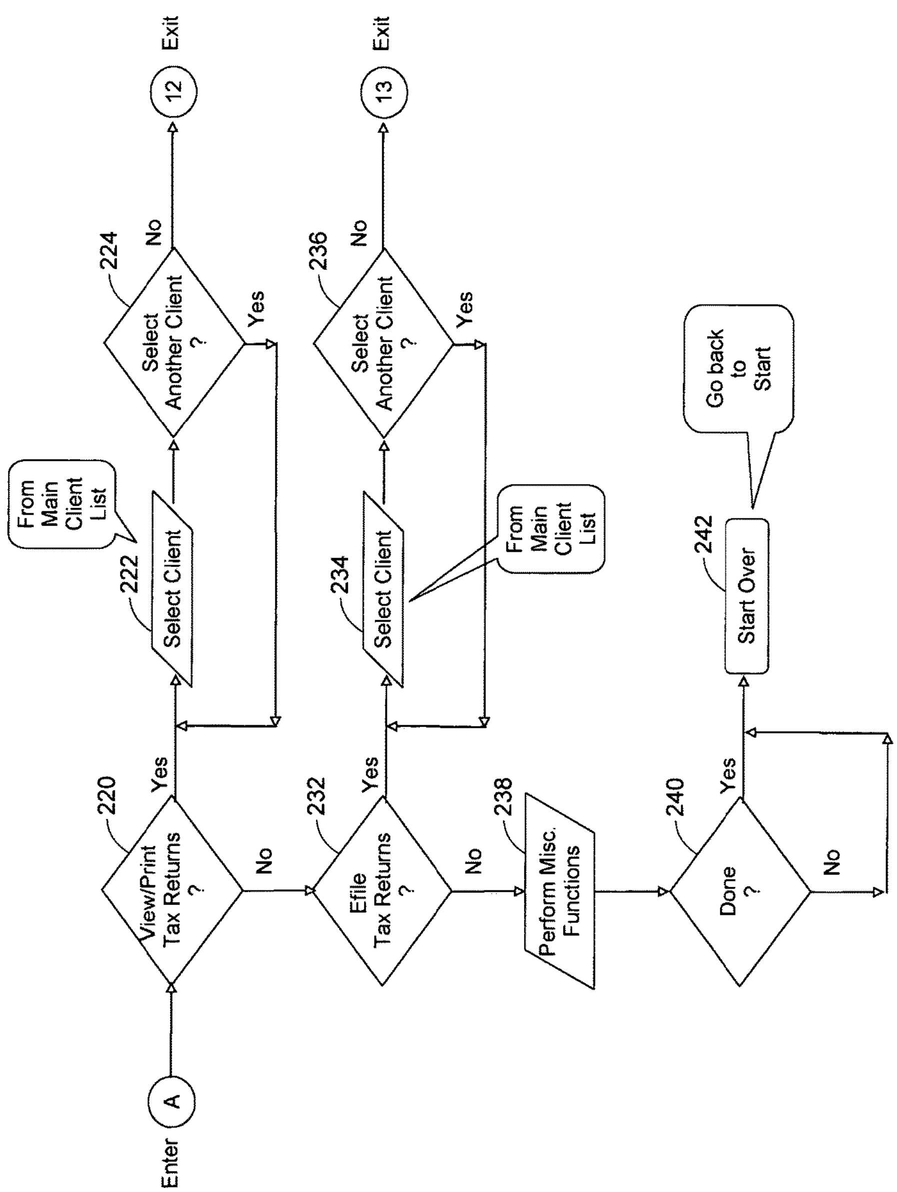
Figure 10:
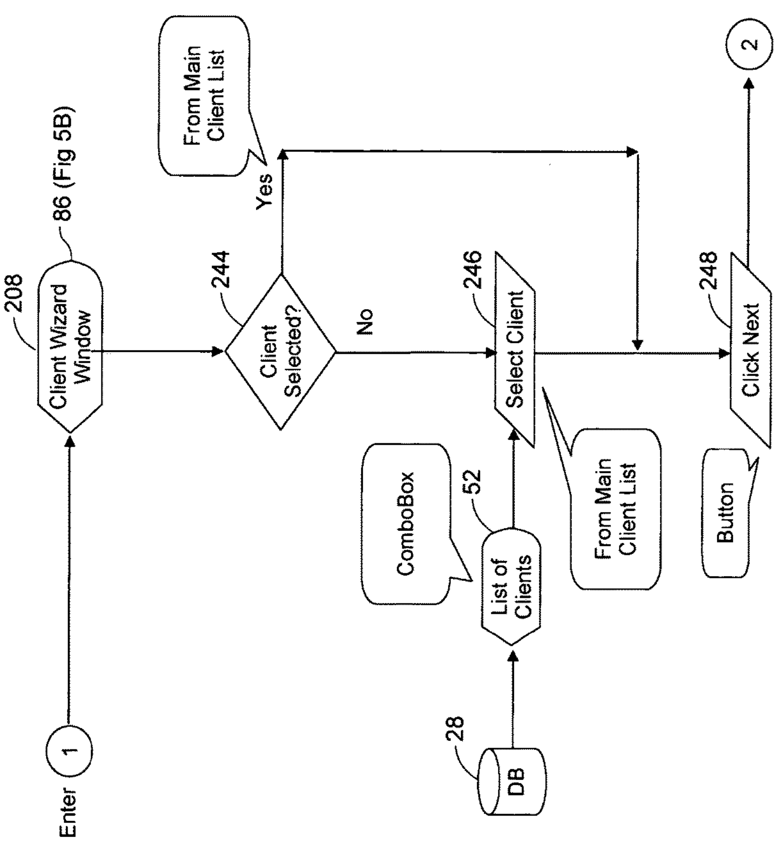

Referring first to FIGS. 8 and 9, the logic for the main window 50 (FIG. 5A) is illustrated. On start-up, identified with the block 200, the main page 50 is displayed. As mentioned above, the main page 50 includes a drop down menu 56 which allows a user to select a tax base state, as indicated by the box The drop down menu 56 is populated by the system database 26 (FIGS. 1A and 1B). After the tax base state is selected, the system checks in step 206 whether a new client is to be created. In particular, the system determines in step 206 whether the icon 70 (FIG. 5A) has been selected in step 206. If so, a client setup page 86 (FIG. 5B) is displayed in step 208 (FIG. 10). If not, the system checks in step 210 (FIG. 5B) whether a client is to be modified. The system determines whether a client is to be modified by checking whether a client from the client list in the text box 52 (FIG. 5A) has been selected, as indicated by the box 212, and/or whether the update client icon 72 has been selected in step 206. If so, the system displays the client setup page 86 in step 208 (FIG. 10).

Figure 15:
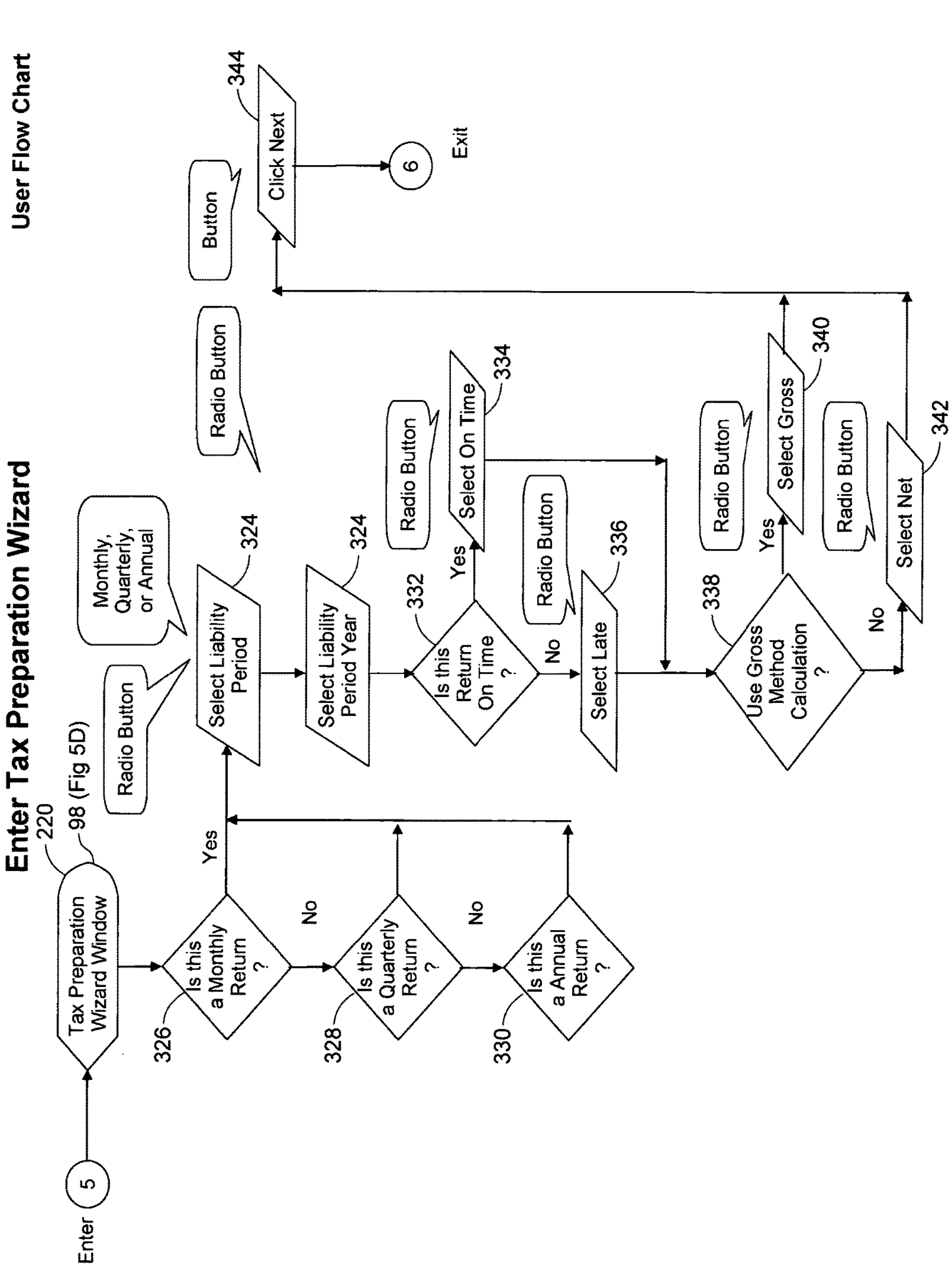

If the client setup has not been selected, the system checks in step 214 (FIG. 8) whether a tax return is to be prepared. The system determines whether a tax return is to be prepared by determining whether a client has been selected from the client list in the text box 52 (FIG. 5A), as indicated by the box 216, and/or whether prepare return icon 74 (FIG. 5A) has been selected on the main page 50 in step 218 (FIG. 8). If so, the system displays the welcome page 98 (FIG. 5D) in step 220 (FIG. 15).

Turning to FIG. 9, the system determines whether the user is interested in viewing or printing tax returns, as indicated by the box 220. The system determines whether the user is interested in viewing or printing tax returns by first determining whether a client from the client list 52 (FIG. 5A) on the main page 50 has been selected in step 222 (FIG. 9). In this mode, the user can select to view or print tax forms for multiple clients, as indicated by the box 224. After the client(s) have been selected, the tax returns and associated tax schedules are concatenated for each client in step 226 (FIG. 28). As discussed above, the tax return panel 60 (FIG. 5A) includes view/print icon 76. Selection of the view/print icon 76, as indicated in step 228, causes the tax return and schedule page 153 (FIG. 5L) to be displayed in step 230.

Turning back to FIG. 9, the system also determines whether the tax returns are to be electronically filed as indicated by the box 232. The system determines whether the tax returns are to be electronically filed by determining in steps 234 and 236 whether one or more clients have been selected from the client list 52 (FIG. 5A) on the main page 50. If so, electronic filing can be initiated from the tax return panel 60 by selecting the icon 78, as discussed in more detail below in connection with FIG. 29.

As mentioned above, various miscellaneous functions can be performed as indicated by the box 230. These functions can be initiated from the tools panel 62 (FIG. 5A). These functions may include: printing filing instructions; creating or editing preparer data; or enrolling for electronic filing.

As indicated by the box 240, the system continually checks whether any tasks from the task panel 54 (FIG. 5A) have been selected. If no tasks have been selected, the system loops back to start 200 (FIG. 5A) in step 242 and continues checking whether any tasks have been selected.

Figure 11:
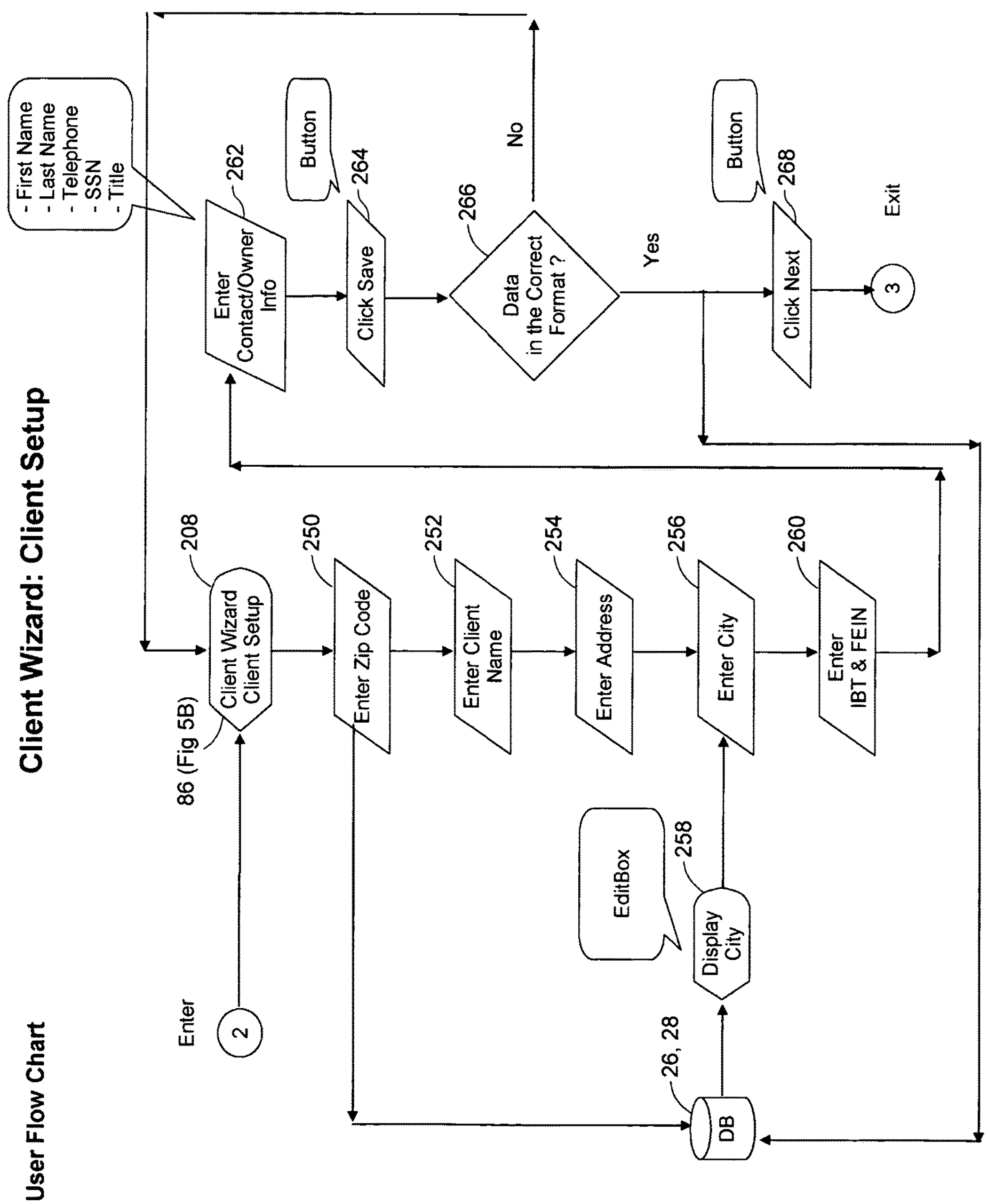

The flow charts for the client setup are illustrated in FIGS. 10-14. The system determines in step 244 whether the user selected a client from the client list 52 on the main page 50 (FIG. 5A). If not, the system waits for the user to select a client from the client list 52, as indicated by the box 246 (FIG. 10). The client list 52 (FIG. 5A) on the main page 50 is populated by the user database 28 (FIGS. 1A and 1B). Once a client from the client list 52 (FIG. 5A), the system waits for the user to select the next button, for example, a forward navigation arrow 247, located in the upper right corner of the main page 50, as indicated by the box 248 (FIG. 10). Once the forward navigation arrow 247 (FIG. 5A) is selected, the client setup page 86 (FIG. 5B) is displayed, as indicated by the box 208 (FIG. 11).

As discussed above, the client setup page 86 (FIG. 5B) includes a number of text boxes for entering client demographic data, such as the zip code, client name and street address, as indicated by the boxes 250, 252 and 254. The city in which the client resides may be selected by way of a drop down menu, as indicated by the box 256, that is supported by a look up table in the system database 26 (FIGS. 1A and 1B) that displays the city corresponding to the inputted zip code, as indicated by the box 258.

The system awaits user input relating to the company registration numbers and contact/owner information, as indicated by the boxes. Once the company registration number and contact/owner info has been entered into the appropriate text boxes, the system waits selection of the save button 88 (FIG. 5B), as indicated by the box 264. After the various client data has been entered and saved, the user can review the data to verify its correctness, as indicated by the box 266. Any incorrect data and can be edited and re-saved. If the user determines the data is correct, the data is stored in the user database 28 (FIGS. 1A and 1B).

Figure 12:
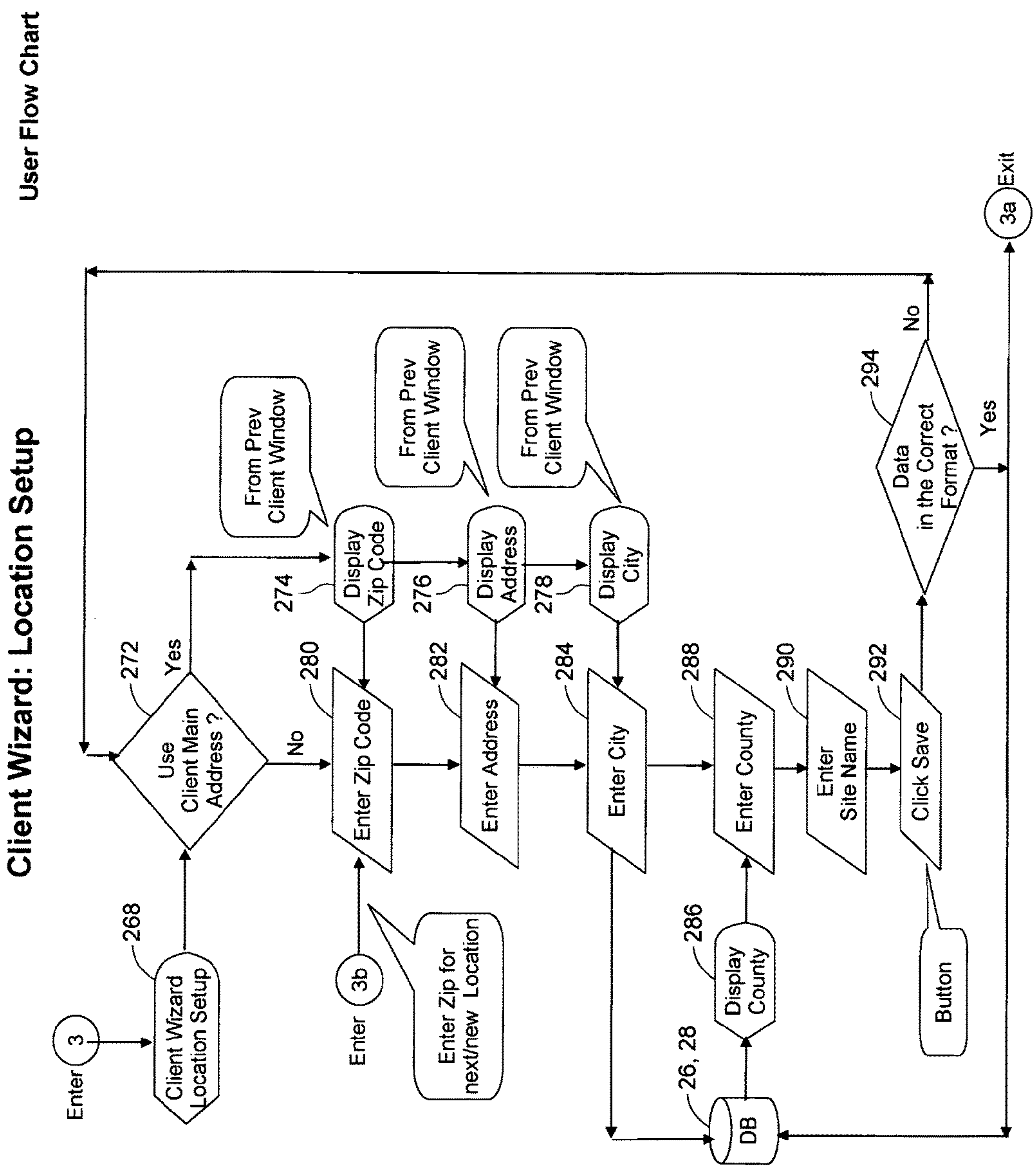

The user selects the next button 92 to complete the client setup, as indicated by the box 268, to proceed to the location setup page 100 (FIG. 5C) as indicated by the box 268. The location setup page 100 includes a number text boxes relating to the address of the business location. If the address of the business location is the same as the address of the main company, the user can select a box 270 (FIG. 5C) on the location setup page 100 to use main company address for the location address, as indicated by the box 272 (FIG. 12). Selection of the box 270 (FIG. 5C) causes the address, city and zip code of the main listed as the main company address to be populated in the corresponding text boxes for the location address, as indicated by the boxes 274, 276 and 278. Alternatively, the zip code; address; and city of the location is entered into the text boxes by the user, as indicated by the boxes 280, 282 and 284. Because of local county taxes, a text box is included for identifying the county of the business location. The county text box may be populated by the system database 26 (FIGS. 1A and 1B) which includes a look up table that displays the county in the county text box, as indicated by the boxes 286 (FIG. 12) and 288, based upon the city entered into the city text box. Finally, the name of the business location is entered into the field 104 (FIG. 5C), as indicated by the box 290 (FIG. 12).

Figure 13:
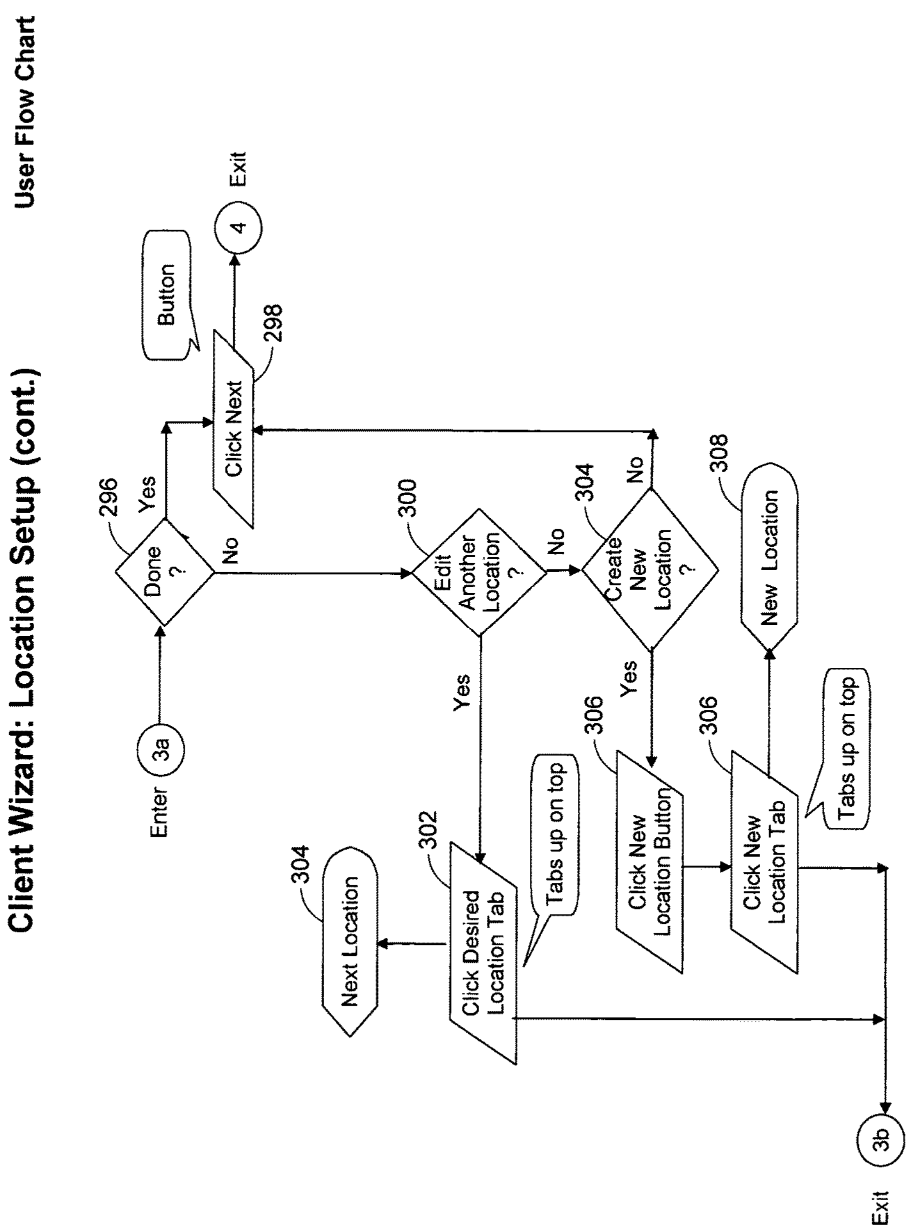
Figure 14:
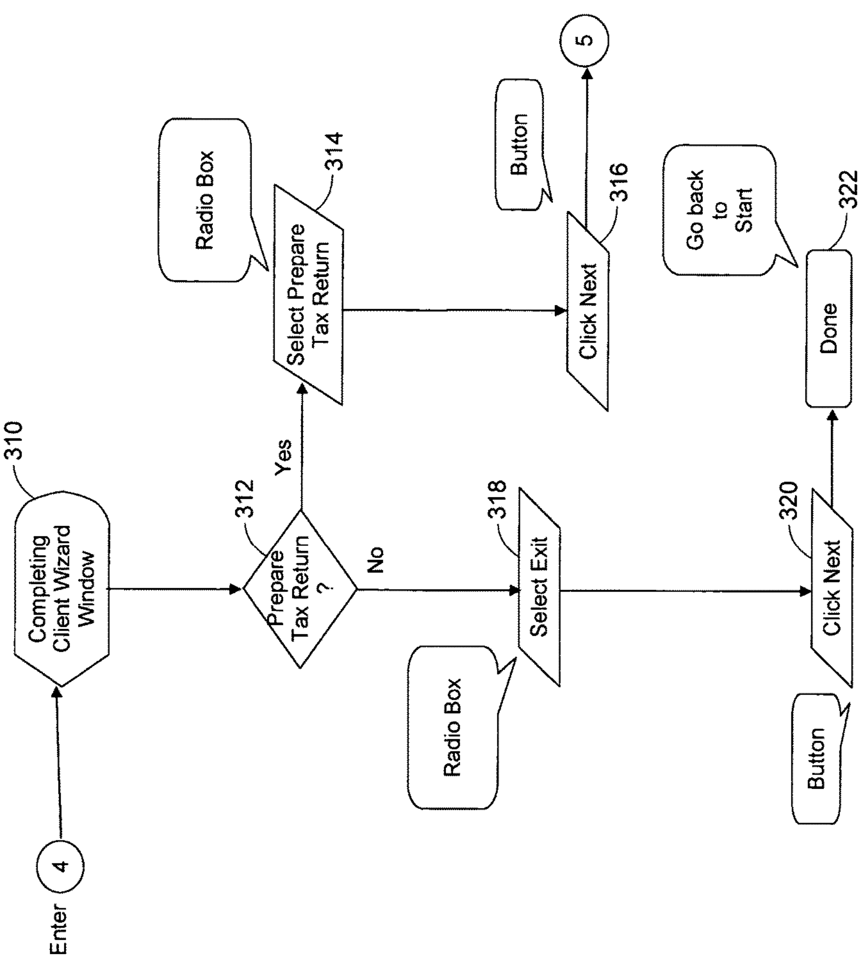

The data entered in the location setup page 100 (FIG. 5c) is saved in the user database 28 (FIGS. 1A and 1B) by selecting the save button 106 (FIG. 5C), as indicated by the box 292. The user will still have an opportunity to edit the data, prior to moving on, as indicated by the box 294. If any of the data needs correcting, the data is simply corrected and re-saved by way of the save button 106 (FIG. 5C). If only one location is involved, location setup is complete and the user can select the next button 92 (FIG. 5C) to move on to the next step of the process, as indicated by the boxes 296 and 298 (FIG. 13).

Alternatively, new locations can be added or other locations can be edited before moving on to the next step in the process. As mentioned above, the location setup data for each location is tabbed with a tab 102 (FIG. 5C). If the user decides to edit the location data of another location, as indicated by the box 300 (FIG. 13), the user simply selects the tab 102 (FIG. 5C) for the desired location, as indicated in step 302, which causes the location setup page 100 (FIG. 5C) for the selected location to be displayed, as indicated by the box 304. The data for the other location is then edited in the manner as discussed with FIG. 12.

If a new location is to be added, as indicated by the box 304, the system checks in step 306 whether the new location button 108 (FIG. 5C) has been selected and if so displays a location setup page 100 for the new location, as indicated by the box 308. The data is entered for the new location in the manner as discussed above. After, all the data for all of the locations have been entered, selection of the next button 92 (FIG. 5C) results in the completion of the client setup, as indicated by the box 310.

Once the client setup page 86 (FIG. 5B) is complete, the next step in the process is preparing the tax return. If preparation of the tax return is desired, as indicated by the box, the user can select the prepare return icon 74 (FIG. 5A) on the tax return task panel 60, as indicated by the box 314 (FIG. 14) and select the forward arrow 247 (FIG. 5A), as indicated by the step 316, to advance to the welcome window 98 (FIG. 5D). Alternatively, the user can exit by selecting the exit cross 317 (FIG. 5A), as indicated by the box 318 (FIG. 14) and subsequently selecting the advance arrow 247, as indicated by the box 320, in which case, the system awaits actions from the task panel 54 (FIG. 5A), as indicated by the box 322.

FIGS. 15-27 relate to tax preparation. Initially, the welcome page 98 (FIG. 5D) is displayed, as indicated by the box 220. The user must select the liability period, as indicated by the box 324, by way of one of the radio buttons 114, 116 or 118 to select whether the return is monthly, quarterly or annual, respectively, as indicated by the boxes 326, 328 and 330.

In addition to liability period, the filing liability and calculation method must be selected. With respect to the filing liability, the user can select whether the return is on time or late by way of the radio buttons 124 and 126 (FIG. 5D), as indicated by the boxes 332, 334 and 336 (FIG. 15), respectively. The calculation method can be selected by way of a gross sales radio button 128 (FIG. 5D) and a net sales radio button 130, as indicated by the boxes 338, 340 and 342 (FIG. 15).

Figure 16:
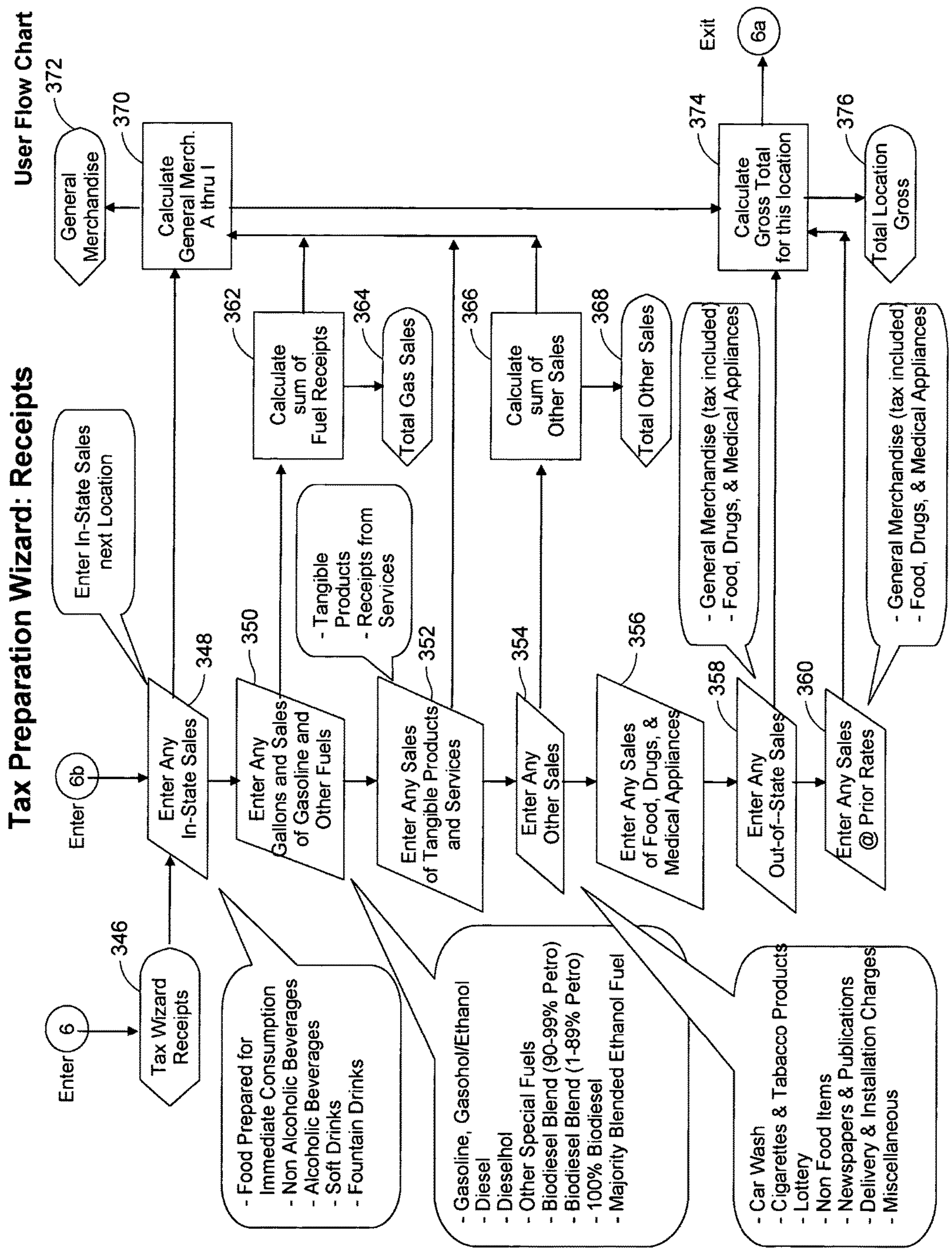
Figure 17:
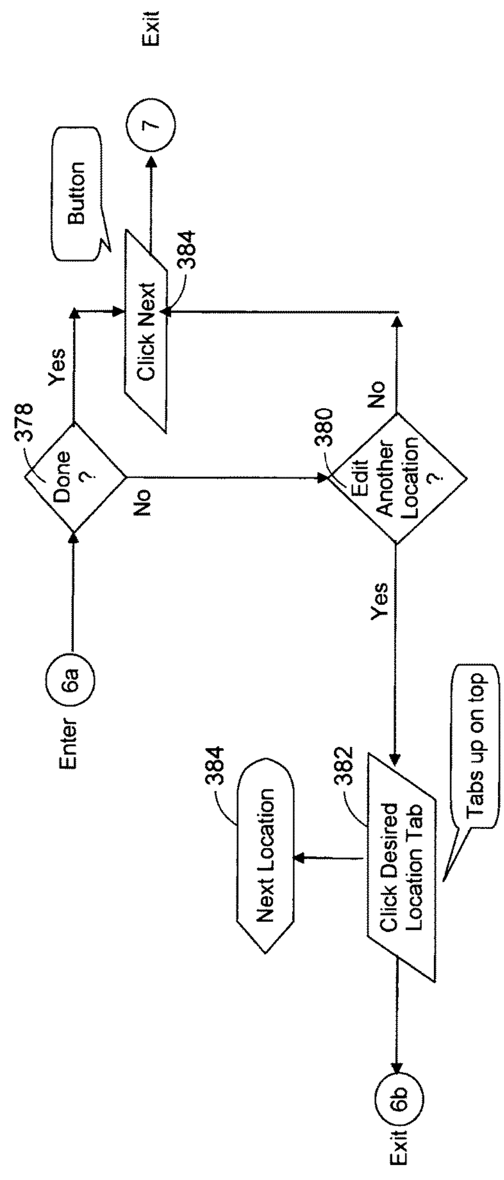

After the liability period, filing liability and the calculation method have been selected, selection of the next button 92 (FIG. 5D), as indicated by the box 344 (FIG. 15), causes the receipts page 132 (FIGS. 5E and 5F) to be displayed, as indicated by the box 346 (FIG. 16). As mentioned above, the receipts page 132 includes a number of text boxes for entry of various sales data including: in state sales; gasoline and fuel sales; sales of tangible products and services; other sales, food, drugs and medical appliances; out of state sales and sales at other rates, as indicated by the boxes 348-360.

All of the fuel sales are summed in step 362 in order to determine the total gas sales, as indicated by the box 364. Similarly, all of the other sales are summed, as indicated by the box 366 in order to determine the total of other sales, as indicated by the box 368. The total gas sales 364; total other sales 368 are summed with the in state sales; sales of tangible products and services in order to determine the total sales on general merchandise (i.e. taxable merchandise), as indicated by the boxes. The total sales of general merchandise 370 is summed with the out of state sales and the sales at prior rates in order to determine the total gross sales for the location, as indicated by the 374 and 376.

Figure 18:
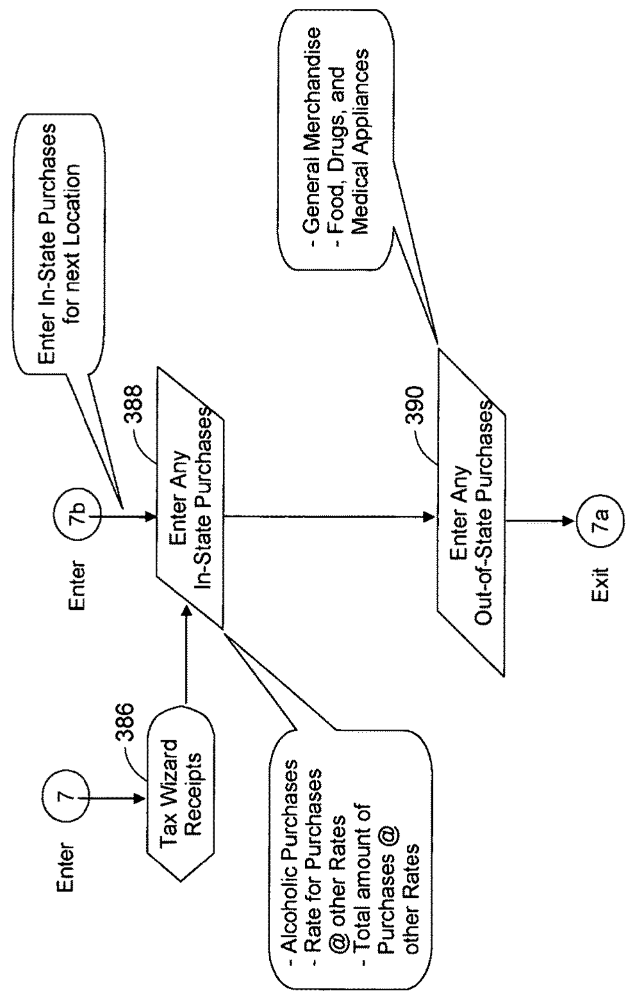
Figure 19:
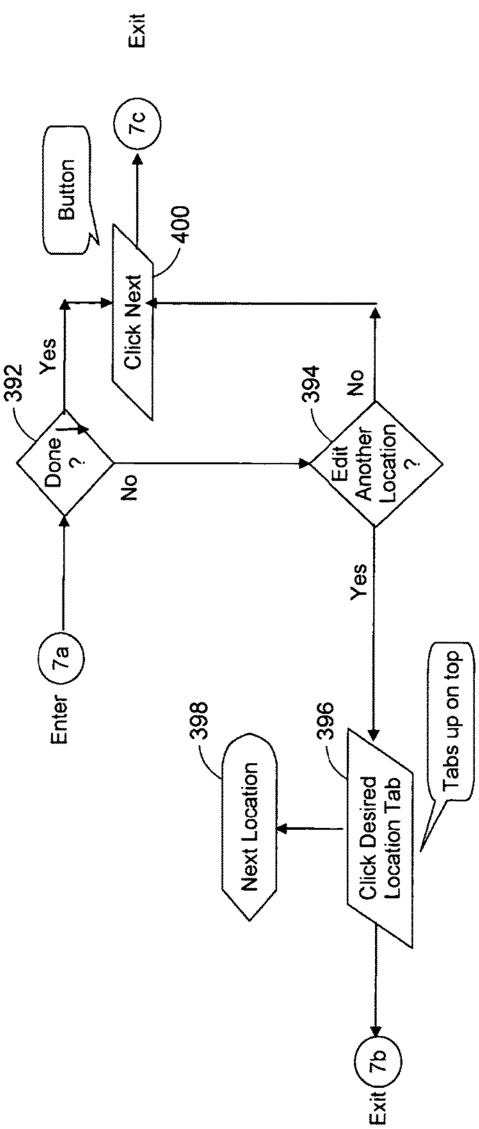

In order to prepare the return, the sales data for all locations must be determined. As mentioned above, the receipts page 132 (FIG. 5E) includes tabs 136 for each of the locations. In order to enter the sales data for other locations, the tab 136 for the desired location is selected and the process is repeated, as indicated by the boxes 380, 382 and 384. When the sales data for all locations has been entered, the user can select the next button 92 (FIG. 5F), as indicated by the box 384 to proceed to the purchase page 138 (FIG. 5G) as indicated by the box 386 (FIG. 18).

Figure 20:
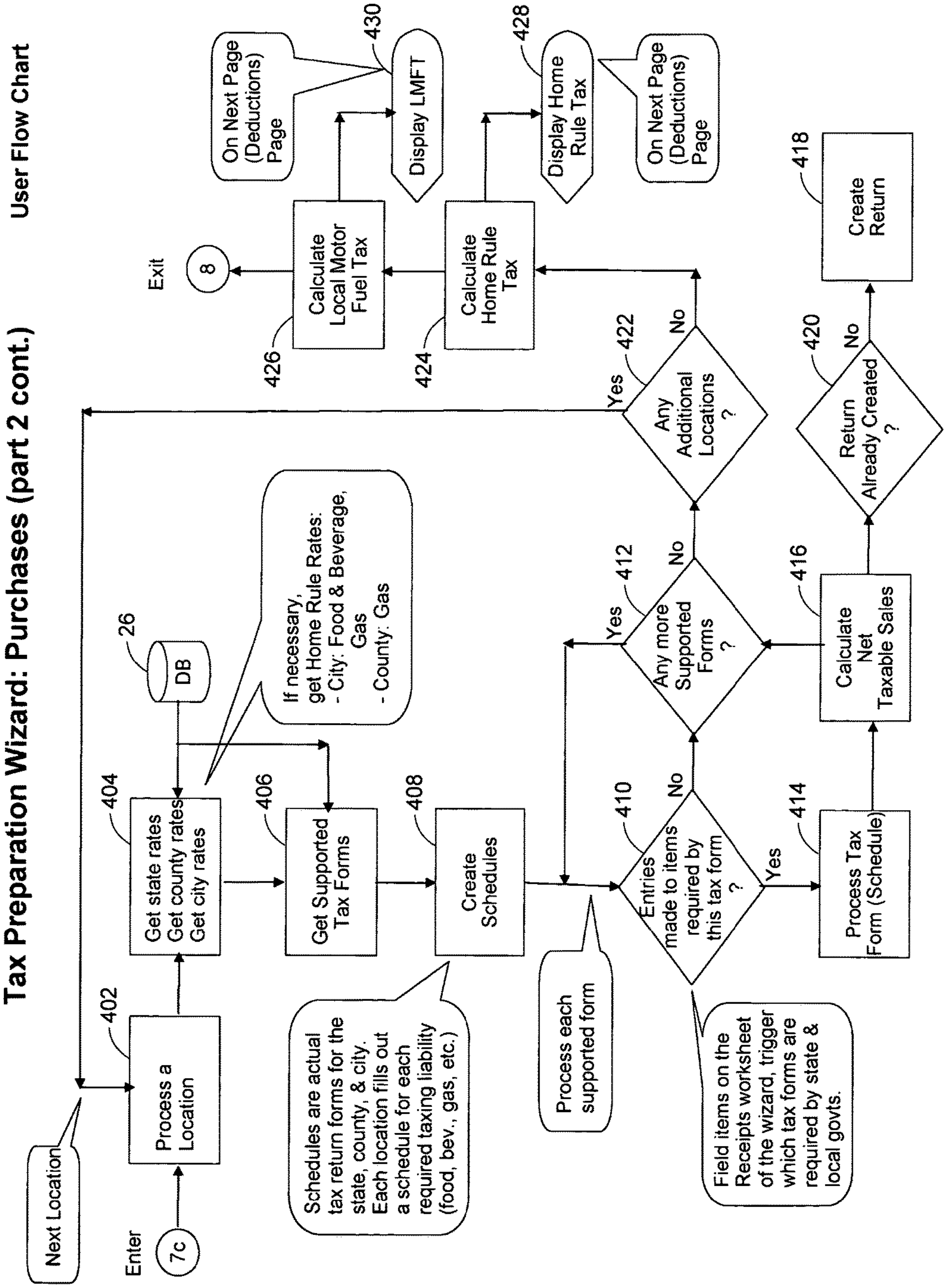

As mentioned above, the purchase page 138 (FIG. 5G) includes text boxes for in-state purchases and out of state purchases, as indicated by the boxes 386 (FIG. 18) and 390 for each location. The in-state and out of state purchase data must be entered for each location, as indicated by the boxes 392 and 394 (FIG. 19) by clicking the tab 142 (FIG. 5G), as indicated by the box in order to display the page 138 for the selected location, as indicated by the box 398. After the purchase data for all of the locations has been entered, the user can select the next button 92 (FIG. 5G), as indicated by the box 400 in order to process a location, as indicated by the box 402 (FIG. 20). In order to process a location, the system obtains the state rates, county rates and the city rates from the system database 26 (Figs. (FIGS. 1A and 1B), as indicated in step 404 (FIG. 20). The system also obtains all of the multi-level supported tax forms from the database 26 (FIGS. 1A and 1B) based upon user input as discussed above, as indicated by the box 406 (FIG. 20) and creates the schedules, as indicated by the box 408. The schedules are the actual tax return forms for the state, county and city. The system populates a schedule for each required tax liability (i.e. food, beverage, gas, etc.).

Sales entries on the receipts page 132 (FIGS. 5E and 5F) trigger which tax forms are required by the state and local taxing authorities. A tax form is processed, as indicated in steps 410-414 based upon entries on the receipts page 132 (FIGS. 5E and 5F). in order to calculate the net taxable sales, as indicated in step 416. The system then creates the returns, if a return has not already been created, as indicated by step 420.

The net taxable sales are calculated for all locations, as indicated by the box 422. When the net taxable sales has been calculated for all locations, the home rule tax is automatically calculated, as indicated by the box 424. The local motor fuels tax is also automatically calculated, as indicated by the box 426. The home rule tax and the local motor fuel tax are displayed on the deductions page 144 (FIG. 5H), as indicated by the boxes 428 and 430.

Figure 21:
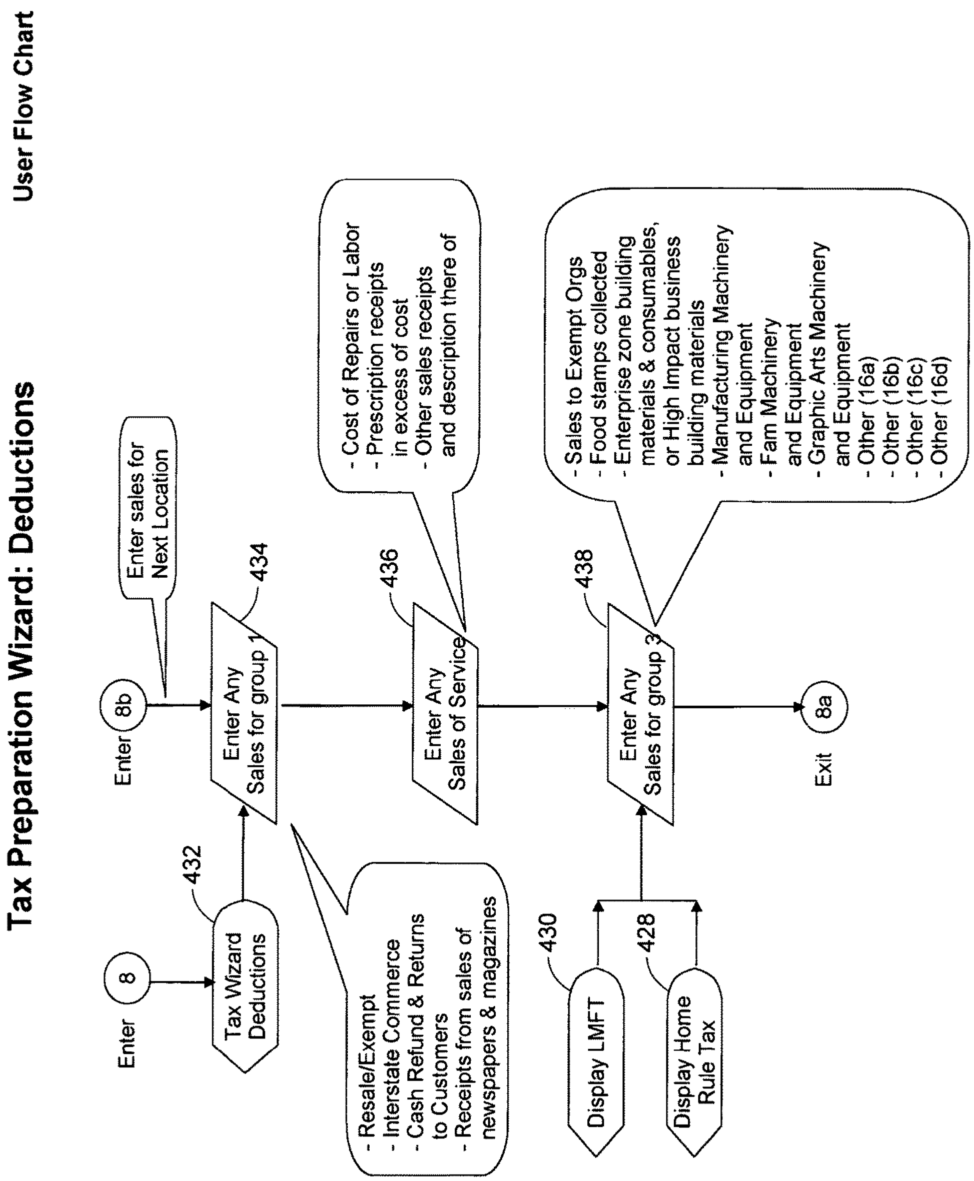
Figure 22:
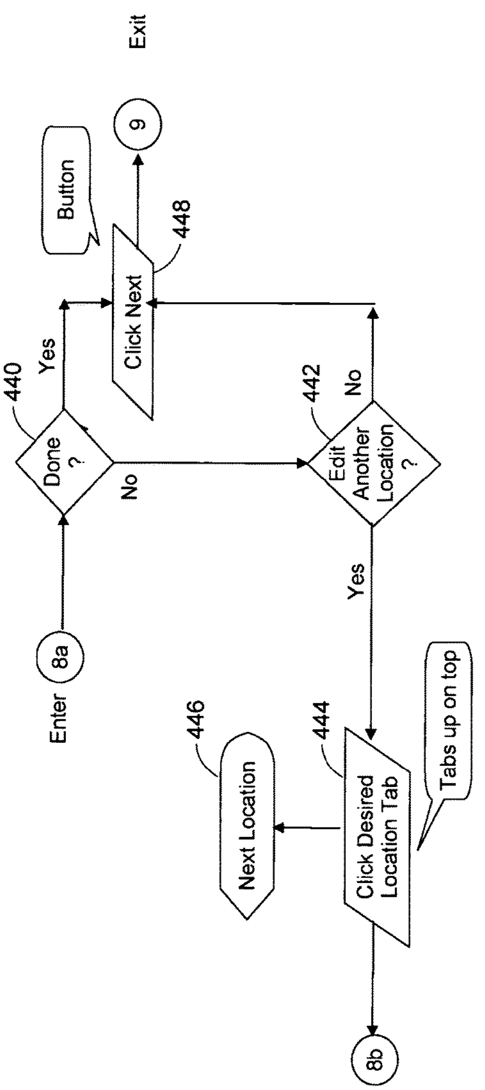
Figure 23:
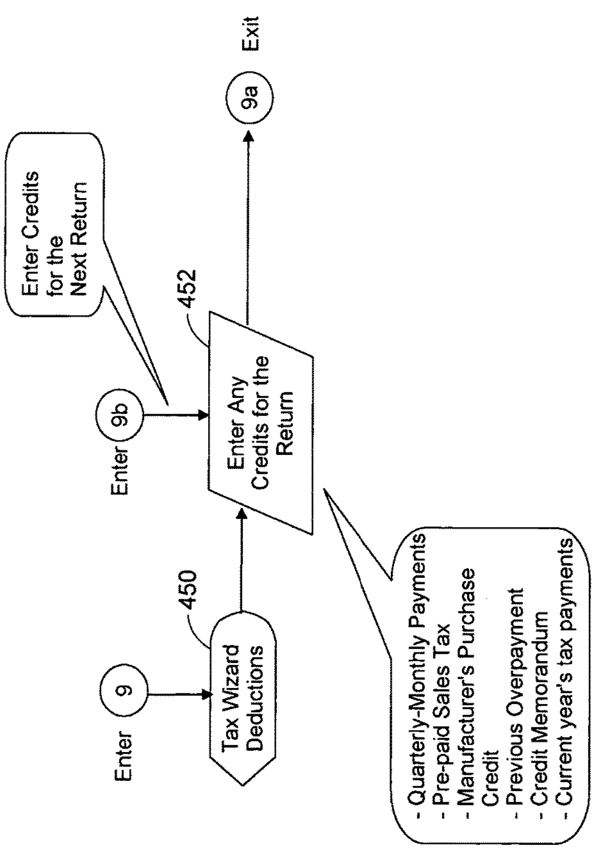
Figure 24:
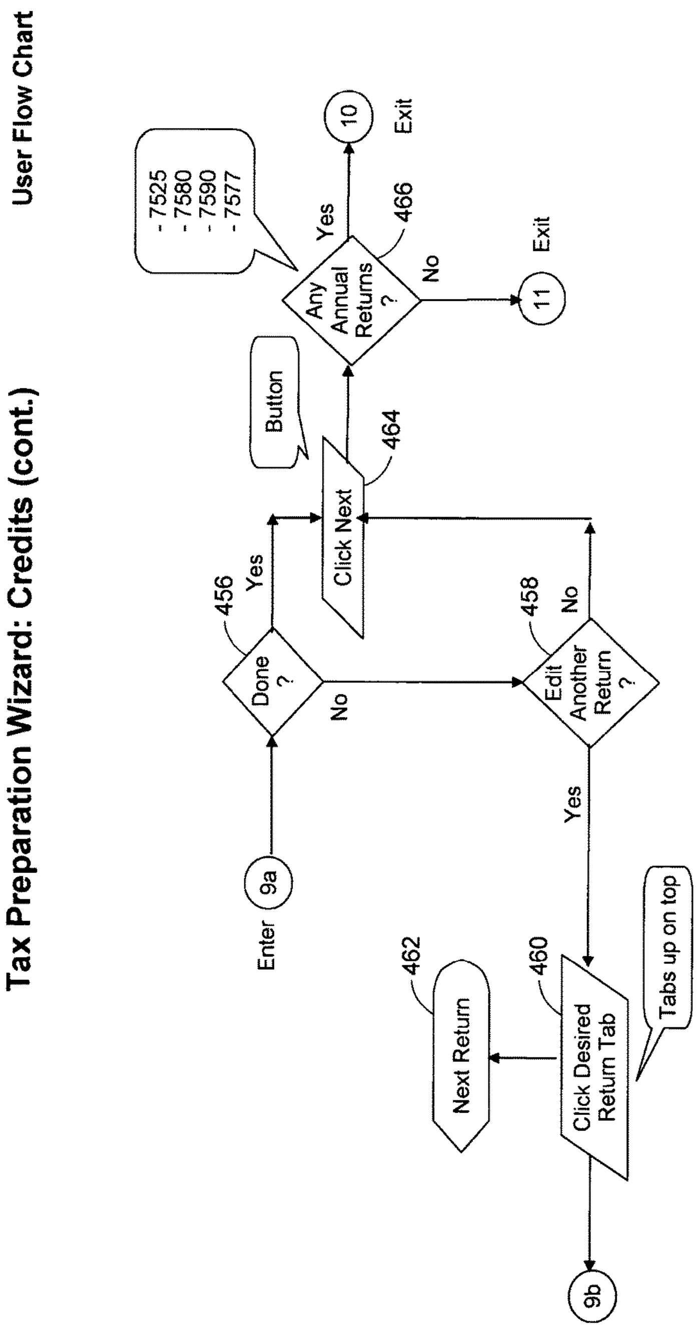

After the home rule tax and the local motor fuel tax are calculated, the system displays the deductions page 144 (FIGS. 5H and 5I), as indicated by the box 432 (FIG. 21). As mentioned above, the deductions page includes a number of text boxes for entering data regarding deductions. Deduction data may be broken down into three categories as shown in FIG. 21. Except for the local motor fuel tax and home rule tax, as indicated by the boxes 428 and 430, the balance of the deduction data is entered by the user, as indicated by the boxes. Data regarding deductions must be entered for each location. As mentioned above, the deductions page 144 (FIGS. 5H and 5I) includes tabs 148 for the various locations. Thus, the deduction data is entered for all of the locations, as indicated by the boxes 440-446. After the deduction data for all locations has been entered, the next step of the process can be initiated by selecting the next button 92 (FIGS. 5H and 5I), as indicated by the box 448 (FIG. 22), which causes the credits page 150 (FIG. 5J) to be displayed, as indicated by the box 450 (FIG. 23).

Figure 25:
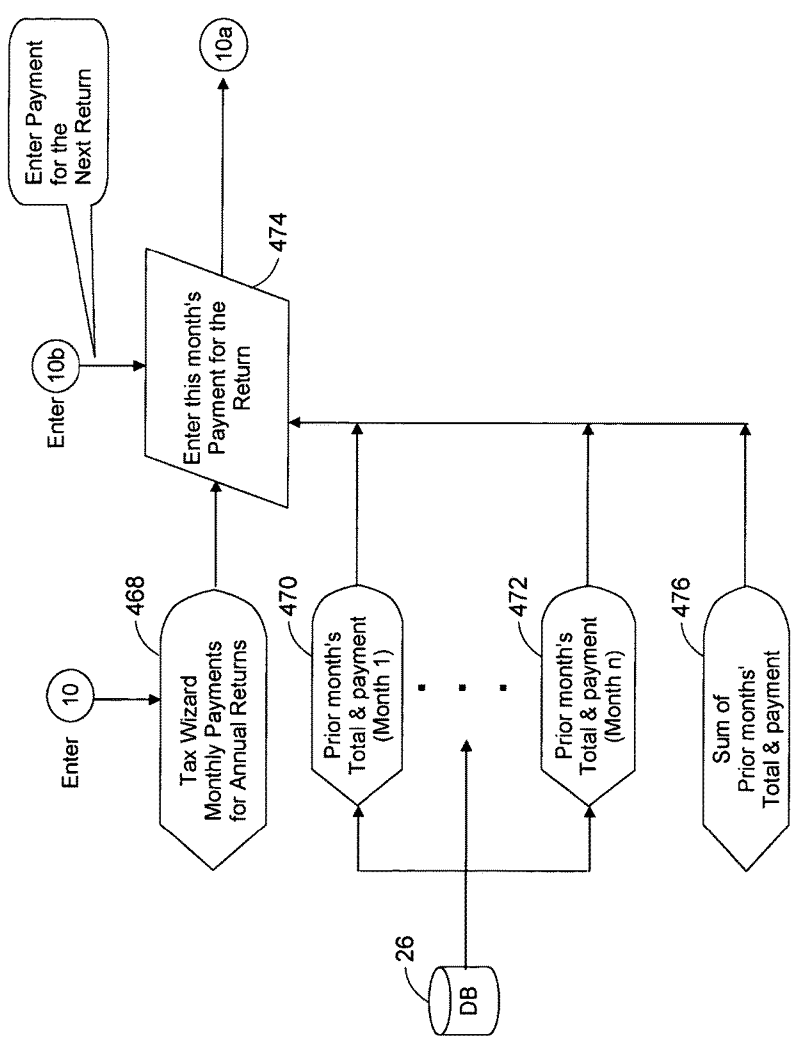
Figure 26:
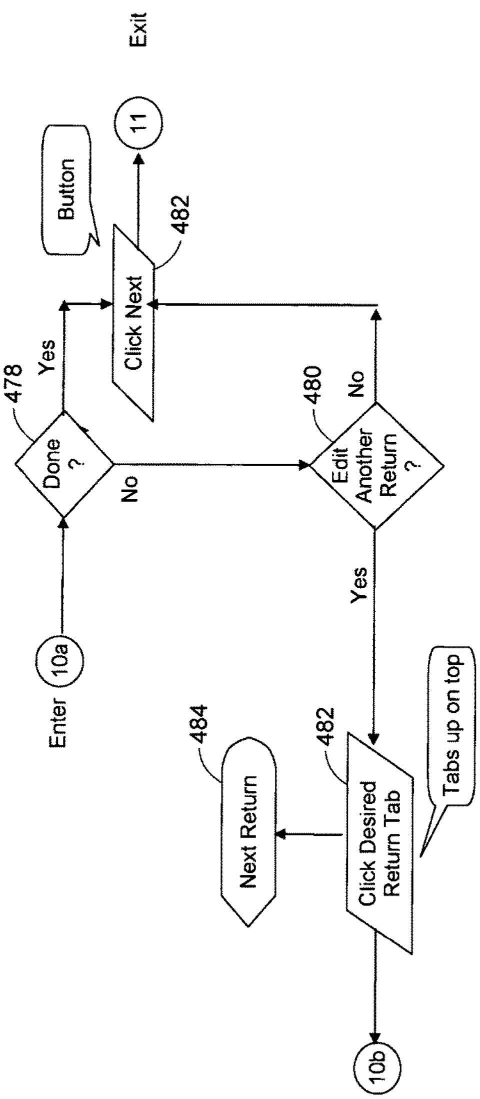

As mentioned above, the tax credit page 150 includes a number of text boxes for entering tax credits, as indicated by the box 452. After the tax credits have been entered, the user can edit the return or edit other returns by selecting a tab 454 (FIG. 5J) on the top of the credits page 150 and repeat the process of entering or editing tax credits, as indicated by the boxes 456-462. After the returns have been edited, selection of the next button 92 (FIG. 5J), as indicated by the box 464, advances the system to the next step in the process as to whether annual returns are required, as indicated by the box 466. If annual returns are required, the system displays monthly payments for annual returns, as indicated by the box 468 (FIG. 25). The user database 26 is used to provide data regarding prior months payments, as indicated by the boxes 470 and 472. The prior month's payments are summed with the current payment, as indicated by the boxes 474 and 476 for the return.

Figure 27:
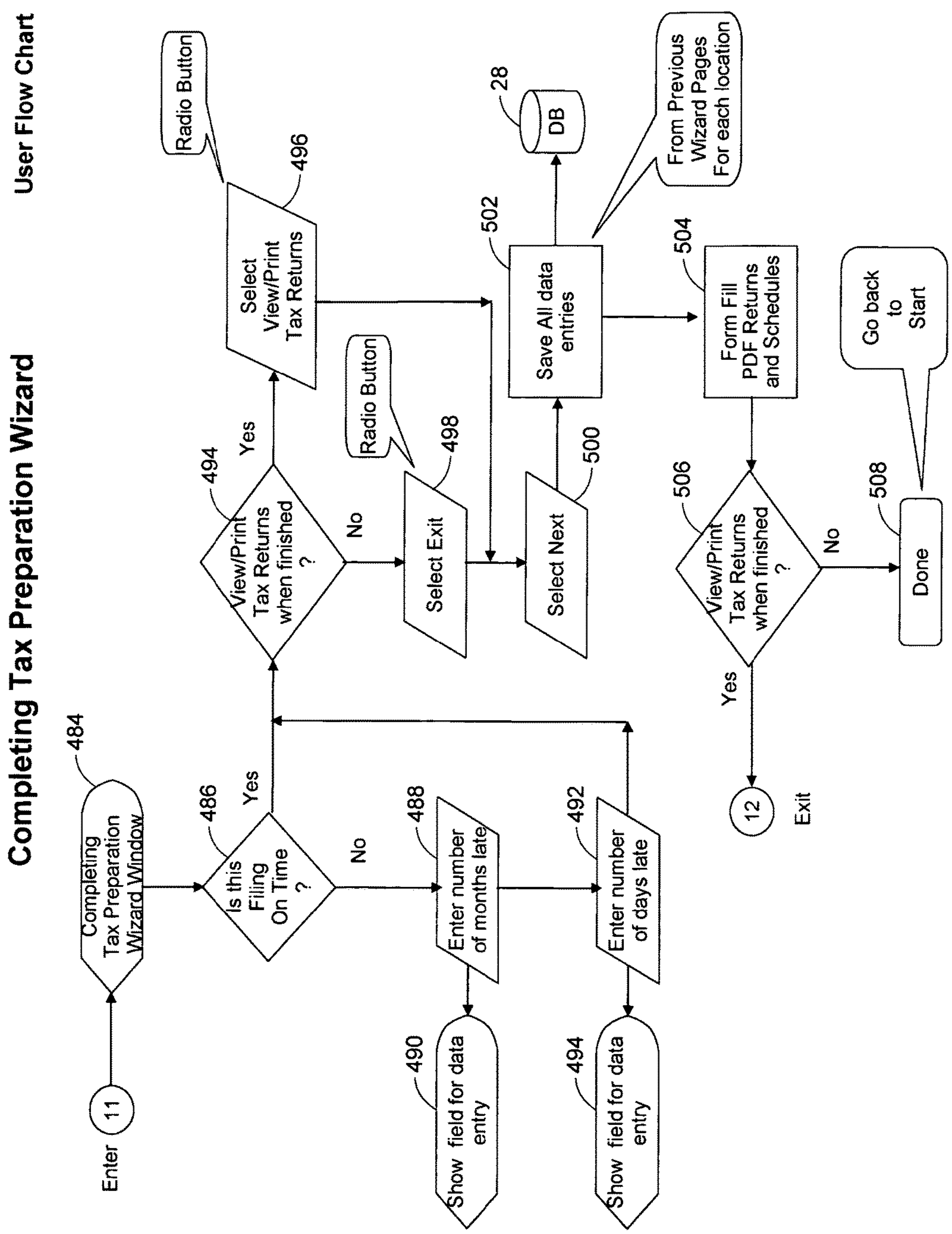

Total payments for other returns can be edited by selecting the appropriate tab 454 (FIG. 5J), as indicated by the boxes 478-484. After the payment data for the all of the returns has been input, the tax preparation is completed by selecting the next button 92 (FIG. 5J), as indicated by the box 482 which causes a tax preparation completion window to be displayed in step 484 (FIG. 27). If the radio button 126 (FIG. 5D) on the welcome window 98 was selected, as indicated by the box 486, the tax preparation completion window generates fields for entering the months or days the return is late, as indicated by the boxes 488-492.

In accordance with an important aspect of the invention, the text boxes on the data entry pages, discussed above, are configured to accept the required information including deduction data and other data applicable to all of the required multi-level tax returns. Thus, once the data is entered in the data entry pages, all calculations are made automatically, as discussed above, i.e. FIGS. 5E-5I, the data and the calculations are inserted for all of the multi-level tax forms automatically which greatly facilitate preparation of all state and local tax returns.

For example, specific fuels sales tax exemptions for all types of fuels on lines 8*a*-8*j* of the state tax return (FIG. 72C) are automatically calculated for the system. Normally, these calculations are extremely voluminous and cumbersome. The system in accordance with the present invention automatically calculates this exemption (i.e. deduction) and populates lines 8*a*-8*i* of FIG. 72C.

Another benefit of the program is that all deductions at all levels are calculated and automatically populated in the appropriate form. For example, home rule tax and local MFT tax for local tax payments are automatically calculated and deducted at the state tax return, for example, as shown in line 16, FIG. 72D.

The tax preparation completion window (not shown) includes radio buttons for selecting view/print returns, exiting the page and a next navigation button. From this page, the user can view or print the return, as indicated by the boxes or exit the page, as indicated by the box 498. The user can also select a next navigation button (not shown), as indicated by the box 500, which causes all data for each location to be saved in the user database 28 (FIGS. 1A and 1B), as indicated by the box 502 (FIG. 27). After the data has been saved, the system automatically fills in the tax returns and schedules, as indicated by the box 504. The filled forms can be viewed, as indicated by the box 506 or the user can exit, as indicated by the box 508.

If the user decides to view the returns, actual returns are displayed, as indicated by the box 230 (FIG. 28). The returns can be printed by selecting the print button 166 (FIG. 5L), as indicated by the boxes 510 and 512 (FIG. 28). The schedules can also be viewed by selecting a schedule tab 162 (FIG. 5L), which causes the schedules to be displayed, as indicated by the boxes 514-520 (FIG. 28). The schedules can also be printed by selecting the print button 166 (FIG. 5L), as indicated by the boxes 522 and 524 (FIG. 28). After the schedules have been viewed and/or printed, the user can view more returns, as indicated by the boxes 526 and 528, by selecting a returns tab 160 (FIG. 5L), as indicated by the box 530.

Afterwards, the system returns to start, as indicated by the box 532. Alternatively, the user can close the returns window, as indicated by the box 534, which causes the system to return to start.

Efile Functionality

After the tax returns have been in the manner as discussed above, the return can optionally be filed electronically with the appropriate tax authority. In particular, in order to electronically file a return, the efile return icon 78 (FIG. 5A) on the task panel 54 on the main page 50 is selected. Once the efile icon 78 is selected, the system extracts the data from the user database 28 (FIGS. 1A and 1B) for each tax return that is to be filed, as indicated by the box 600 (FIG. 29). The data is formatted, for example, by the system application 24 (FIG. 1A), as indicated by the box 602 and sent to one or more servers 23, 25 (FIGS. 1A and 29) in step 604. As will be discussed in more detail below, the servers 23, 25 establish a connection with the taxing authority 34 (FIGS. 1A and 29), for example, the Illinois Department of Revenue (IDOR), and submit the response electronically thereto. As is known in the art, the taxing authorities including IDOR do not confirm to the sender that the tax return was successfully filed. As such, each return that was electronically filed had to be manually confirmed. In accordance with an important aspect of the invention, the servers 23, 25 (FIGS. 1A and 29) automatically poll the taxing authority 34 to determine the status of the electronically filed tax return and automatically return the status to the system application (FIG. 1A) as indicated by the boxes 606 and 608. (FIG. 29).

Figure 30:
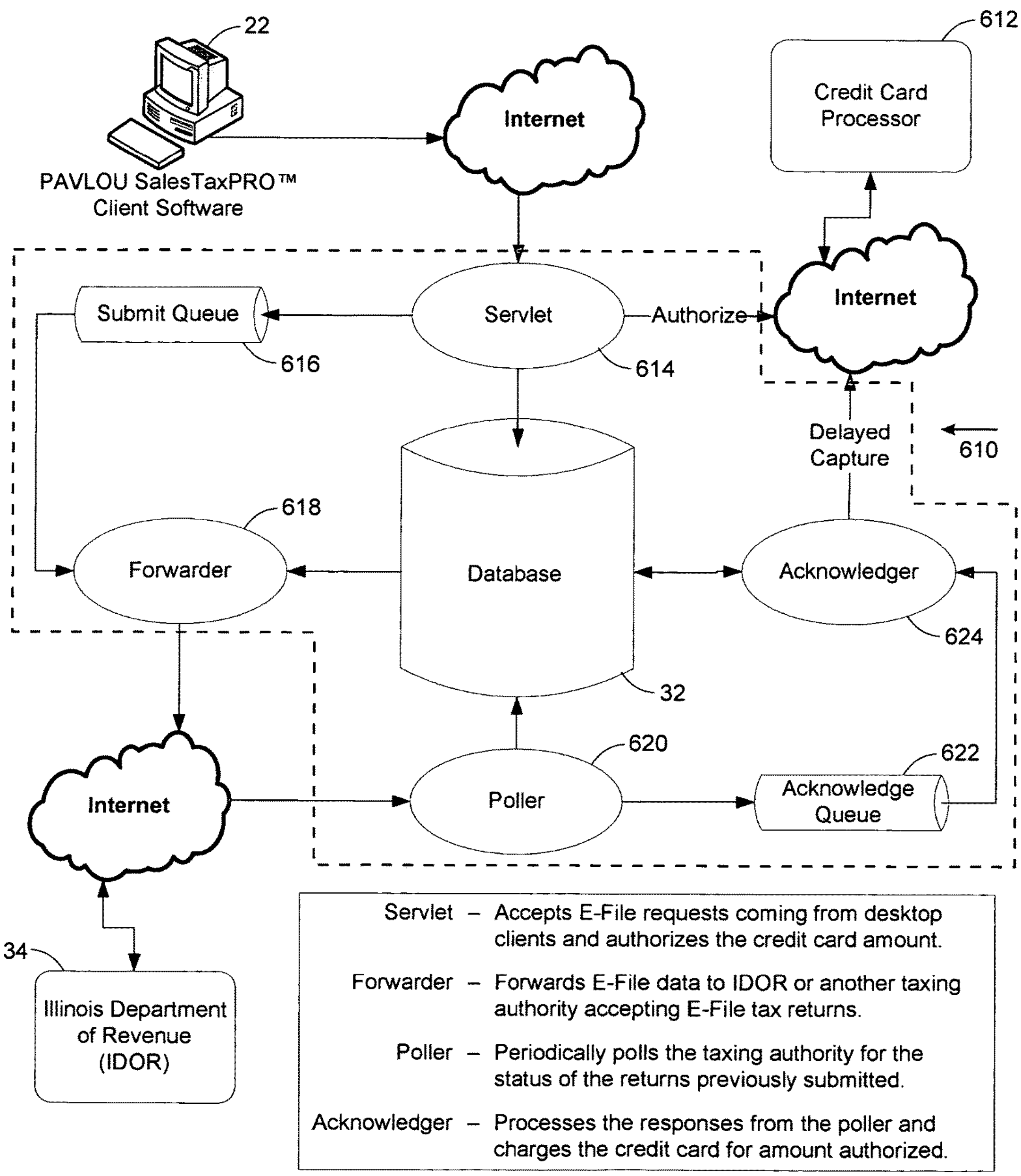
FIG. 30 illustrates the architecture of the E-File servers in accordance with the present invention, shown connected to a single client, a credit card processor and a taxing authority over a public communication network.

The architecture for the E-file server 23, 25 is illustrated in FIG. 30 and shown within the dashed box 610. As shown, the E-file server 23, 25 is connected to client 22 over a private or public communication network, such as the Internet. The E-file server 23, 25 may also be connected to a conventional credit card processor 612 as well as a taxing authority 34, such as IDOR, over a private or public communication network, such as the Internet. As shown, a servlet software module 614 accepts E-File requests from clients 22 and obtains credit card authorization from the credit card processor 612 for the amount of the return plus processing fees. As mentioned above, the formatted tax return data, credit authorization data, as well as tax paper data is stored in the server database 32. The tax returns are filed electronically by the E-File servers 23, 25 after the credit card authorization is received. As such, requests for E-filing from the client 22 are directed to a submit queue 616 which maintains the requests after authorization is received. These requests are forwarded to a forwarder module 618, which extracts the tax return data from the server database 32 and forwards it to the desired taxing authority 34.

As mentioned above, various known taxing authorities 34 do not acknowledge receipt of E-filed tax returns. In accordance with an important aspect of the invention, once a tax return is E-filed with a taxing authority 34, the system automatically polls the taxing authority 34 for the status of the previously submitted tax return. In particular, requests for status are initiated by a poller module 620 which initially checks the server database 32 to ascertain whether the taxing authority 34 previously acknowledged an E-filed return. If not, a request for acknowledgement is sent to the taxing authority 34 by way of the forwarder module 618. This process is repeated until the taxing authority 34 acknowledges that a previously E-filed return has been received. The status of the E-filed returns is returned by the taxing authority 34 to the poller module 620. The poller module 620 forwards the acknowledgment to an acknowledgement queue. These acknowledgements are processed by an acknowledger module 624. The acknowledger module processes the responses by charging the credit card for the appropriate response and storing the acknowledgement in the server database 32.

In general, in order to initiate electronic filing, the system optionally requires that the client have a valid subscription to the E-file service. Accordingly, clients must log in for E-file service. Initially, clients are required to activate their subscription or license. Thereafter, each time a client requests E-file service, the subscription or license is verified. In the event that the client forgets the login password, the system allows the client to select a new password and log in. After login, after the client's subscription or license is verified, one or more returns can be submitted in a single batch by the client. The system then creates a unique key for that client that associates the client with a subscription.

Once licensing is verified, as mentioned above, credit card transactions are handled by the credit card processor 612 (FIG. 30), for example, Verisign. New and renewed subscriptions are handled immediately as "sale" transactions. Transactions for a return are submitted using a two-step method, for example, by initially requesting authorization from the credit card processor 612 and charging the credit card by way of a delayed capture after confirmation of the electronically filed tax return is acknowledged by the taxing authority 34. Whenever the client credit card is charged, a transaction ID for example from the credit card processor 612 is returned and stored in the server database 32 for future references. All communications between the client 22 and the server 23, 25 as well as communications with the credit card processor 612 are stored in the server database 632. In order to electronically file a tax return with a taxing authority 34, one or more connections to the taxing authority 34 are automatically opened by the efile servers 23, 25 in order to submit the returns.

As mentioned above, the client 22 can determine the status of any returns submitted by contacting the server of the taxing authority 34. Although there is no time limit for processing a request, the efile servers 23, 25 may return a failure status if processing takes more than a predetermined amount of time.

Figure 31:
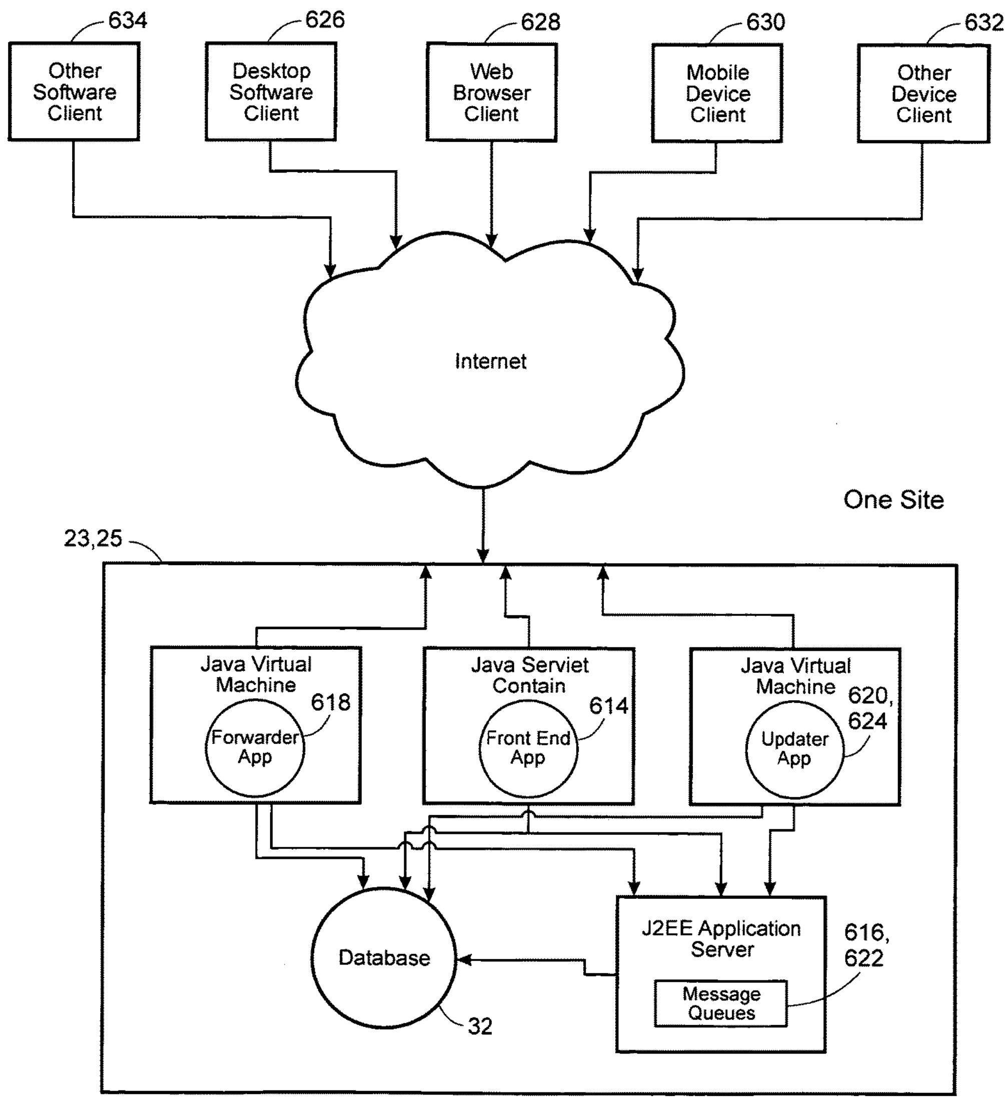
FIG. 31 is a diagram illustrating the architecture of the E-File servers in accordance with the present invention connected to different types of clients over a public communication network.
Figure 32:
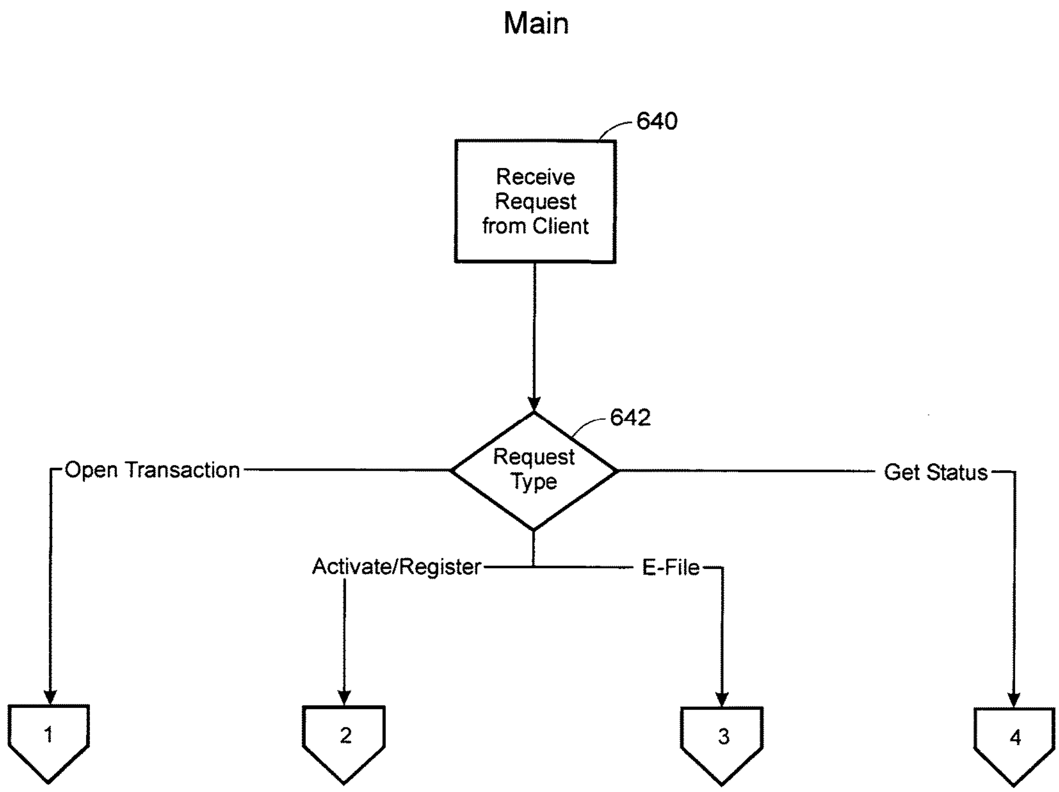
FIGS. 32-38 are flow charts for the E-File servers illustrated in FIGS. 30 and 31.

FIG. 31 is a block diagram illustrating the architecture of the system in accordance with the present invention configured as a client server. As shown in FIG. 31 the system in accordance with the present invention is configured to operate with various clients including a desktop software client 626, a web browser client 628, a mobile device client 630, as well as other device clients 632 and other software clients 634. These clients 628-634 communicate with the E-file servers 23, 25 by way of a private or public communication network such as the internet. As discussed above and illustrated in FIG. 30, the E-file servers 23, 25 are configured to include a front-end application, such as a Java servlet container 614, a forwarder application 618, and updater application which includes the poller module 620 and an acknowledger module 624, as well as a server application which includes the message queues, which, in turn, includes the submit queue 616 and the acknowledge queue 622. Other architectures are within the broad principles of the present invention.

Figure 33:
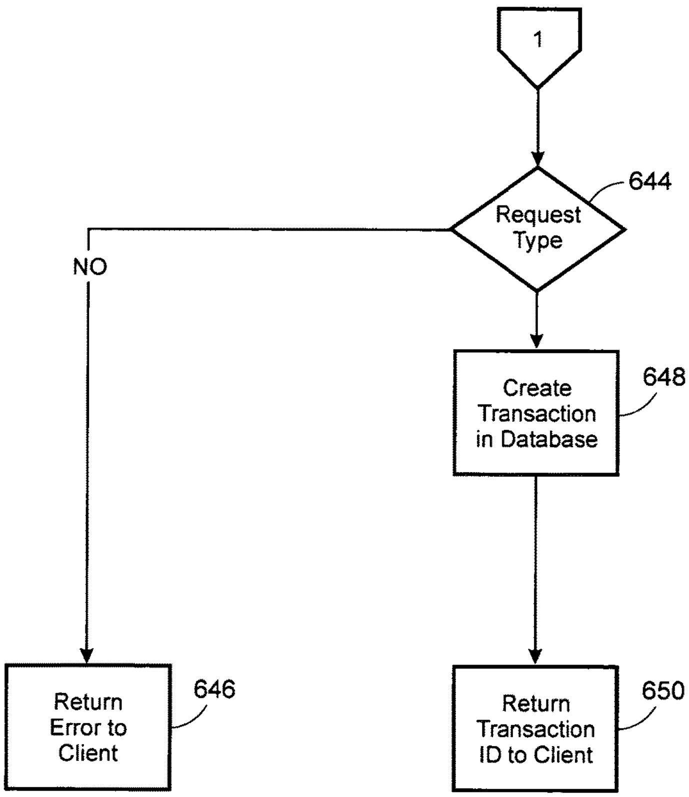
Figure 34:
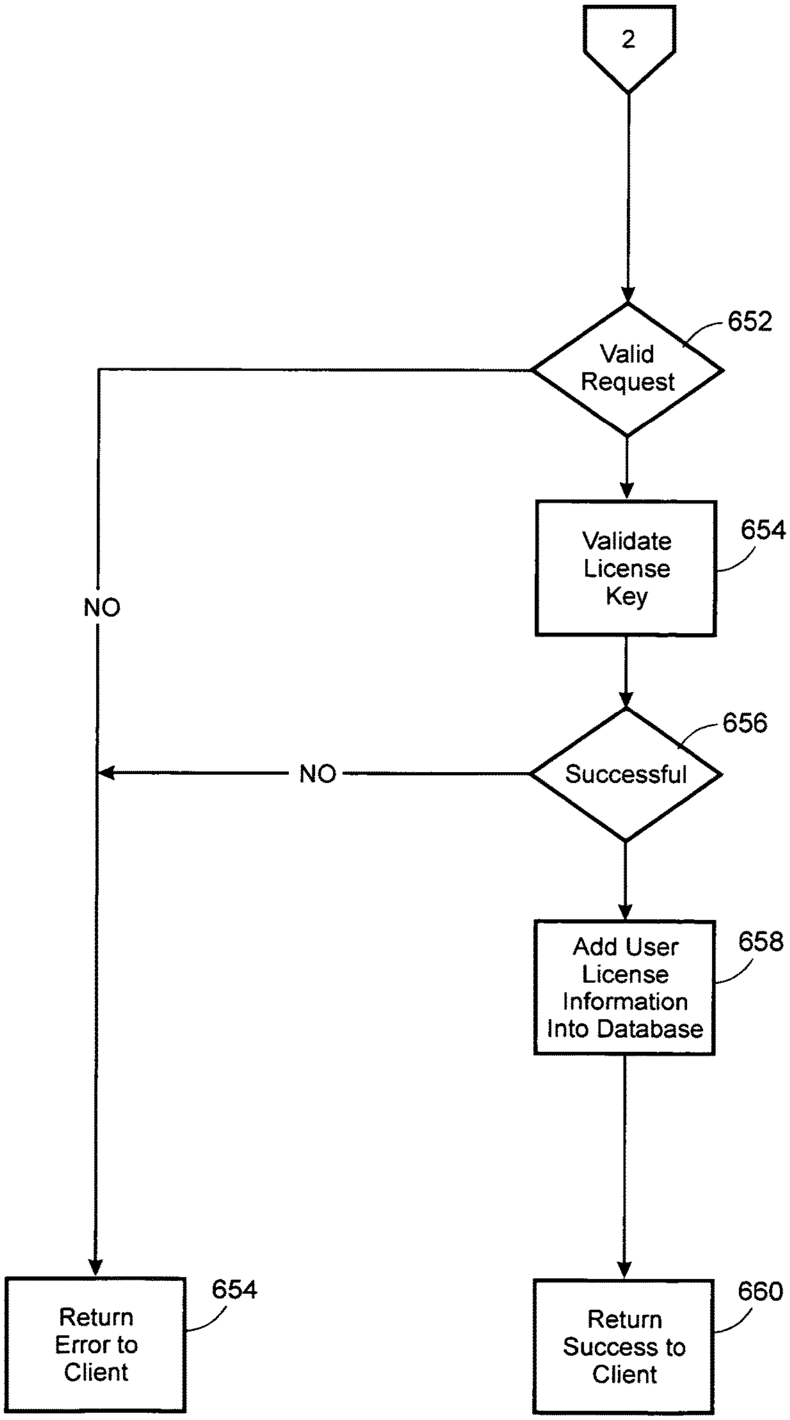

FIGS. 32 through 38 are flow charts for the E-file servers 23, 25. Initially, in step 640, a request is received from one of the clients 628-634. The E-file servers determine the type of requests in step 642. Various types of requests are possible. For example, referring to FIG. 33, the system checks in step 644 whether the request is a request from a client subscriber. If not, an error message is returned to the client 628, 634 (FIG. 31) in step 646. If the request is from a subscriber, a transaction (i.e. open e-file connection for client) is created in the database 32 (FIG. 31) in step 648 (FIG. 33). The transaction ID is returned to the client 628-634 (FIG. 31) in step 650. If the request is to activate a license, the system determines in step 652 (FIG. 34) whether the request is valid. If not, an error message is returned to the client 628-634 (FIG. 31) in step 654 (FIG. 34). Alternatively, if the request is a valid request as determined in step 652, the client's license key, as discussed above, is validated in step 654. In step 656, the system checks whether the license key was successfully validated. If not, an error message is returned in step 654. If the license key is successfully validated, the user's license information is added to the database 32 (FIG. 31) in step 658 (FIG. 34) and the client 628-634 (FIG. 31) is notified of the successful validation in step 660 (FIG. 34).

Figure 35:
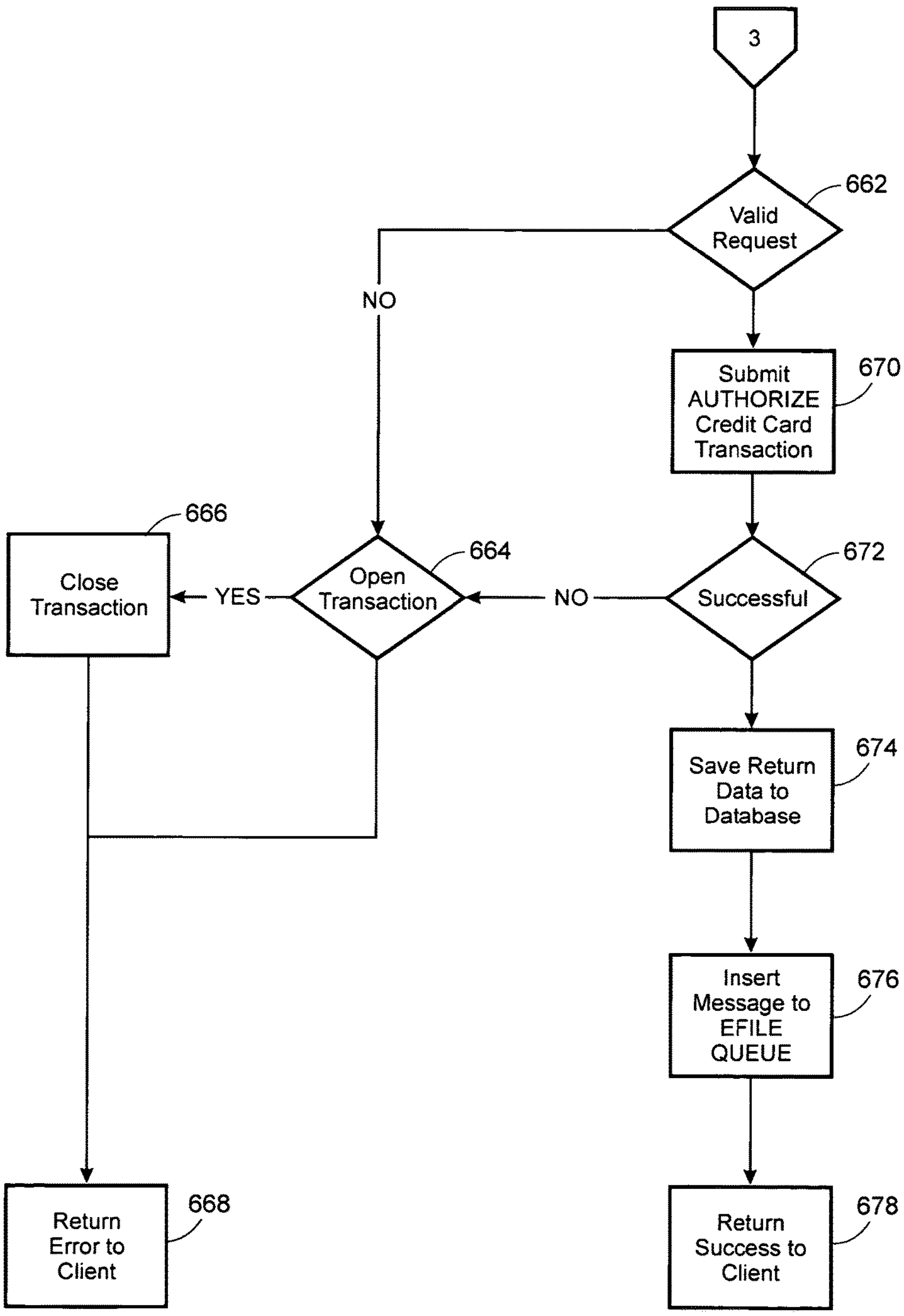

If the communication is a request for electronic filing, the system checks in step 662 whether the request is valid. If not, the system checks in step 664 whether there is an open transaction. If so, the transaction is closed in step 666 and an error message is returned to the client 628-634 (FIG. 1) in step 668 (FIG. 35). If the request is not valid and there is no open transaction, an error message is also returned to the client 628-634 (FIG. 31) in step 668.

If the request for electronic filing is valid, as determined in step 662, the E-file servers 23, 25 await authorization of a credit card transaction in step 670. If the authorization is successfully received as determined in step 672, the request for electronic filing is processed as discussed below. If not, an error message is returned to the client as discussed below.

Assuming that the credit card authorization was successfully authorized as returned from the credit card processor 612 (FIG. 30), this data is saved in the database 32 (FIGS. 30 and 31) in step 674 (FIG. 35). This information regarding the authorization is inserted into the submit queue 616 in step 676 (FIG. 35) with the status being returned to the clients 628-634 (FIG. 31) in step 678 (FIG. 35).

Figure 36:
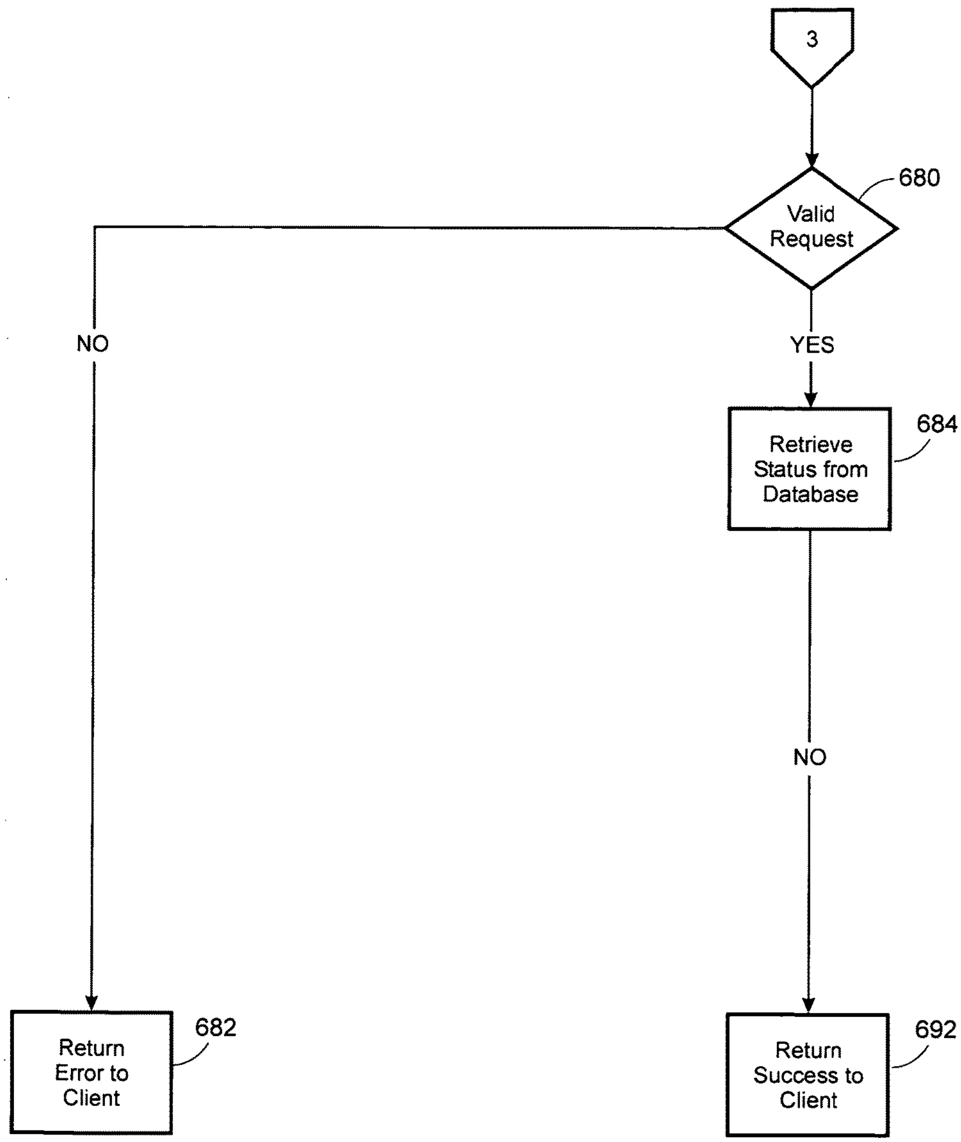

FIG. 36 illustrates the logic for obtaining the status of a recently filed tax return with a taxing authority 34 (FIG. 30). Once a request for efiling is received from a client 628-634 (FIG. 31), the tax return is electronically filed with the taxing authority (FIG. 30) as will be discussed below. For those tax returns that have been automatically filed, the system checks with the taxing authority 34 (FIG. 30) to determine the status of the efiled return. As mentioned above, acknowledgements from the taxing authority 34 are stored in the database 32 (FIG. 30). Initially, the system determines in step 680 whether the request from the client 628-634 (FIG. 31) is valid. If not, an error message is returned to the client 628-634 in step 682 (FIG. 36). The system will extract the status from the database 32 and return it to the client in step 692.

Figure 37:
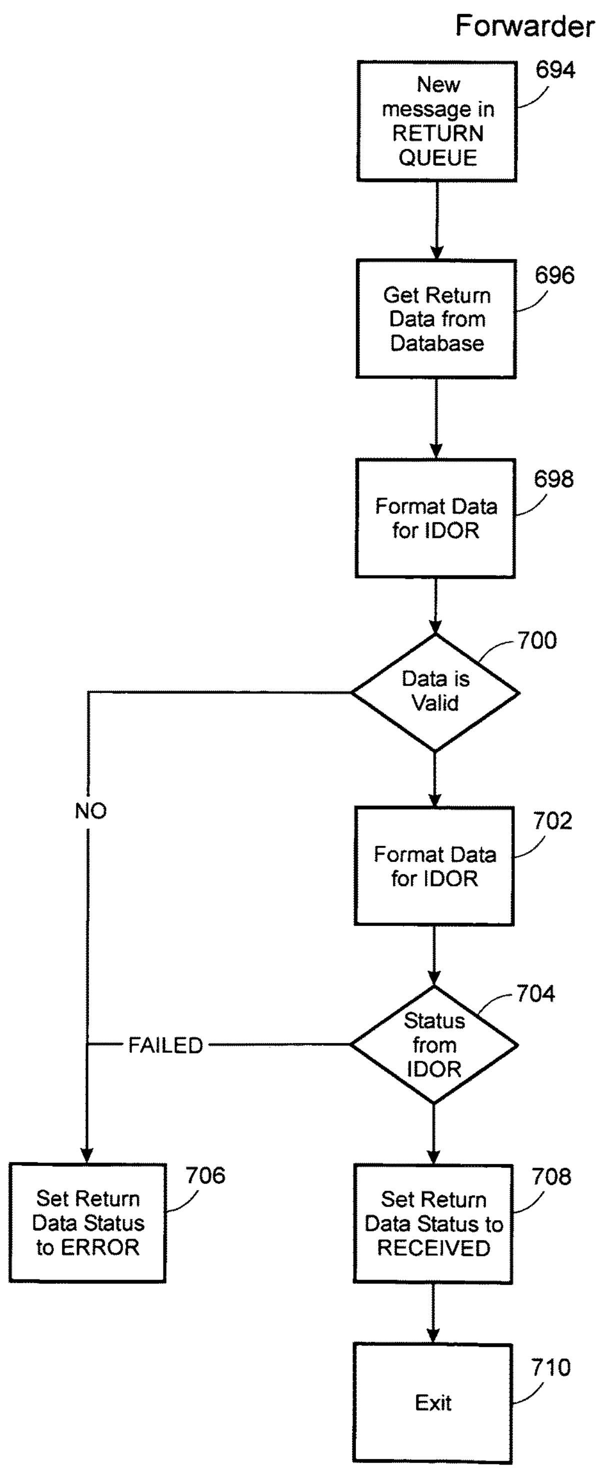

FIG. 37 is a flowchart for the forwarder module 618. This module awaits for a message in the return queue that triggers the task to find the corresponding efile request, format it and forward it to the taxing authority 34. The return queues are received from the client 629-634 (FIG. 31) in the serv let 614 (FIG. 30). Once an efiled request is received by the servlet 614 as indicated in step 694, the system retrieves the return data from the database 32 (FIG. 30) in step 696. The data is then formatted for the appropriate taxing authority in step 698. The system checks in step 700 whether the data is valid, for example, checksum or parity bit, or other known method. If so, the return data is submitted to the taxing authority 34 (FIG. 30) in step 702. The system then checks in step 704 whether the tax return has been acknowledged by the taxing authority 34 in step 704. If not, an error message is returned to the client 628-634 (FIG. 31) in step 706. If not, the return data status in the database 32 is updated to receive status as indicated in step 708. The system returns in step 710.

Figure 38:
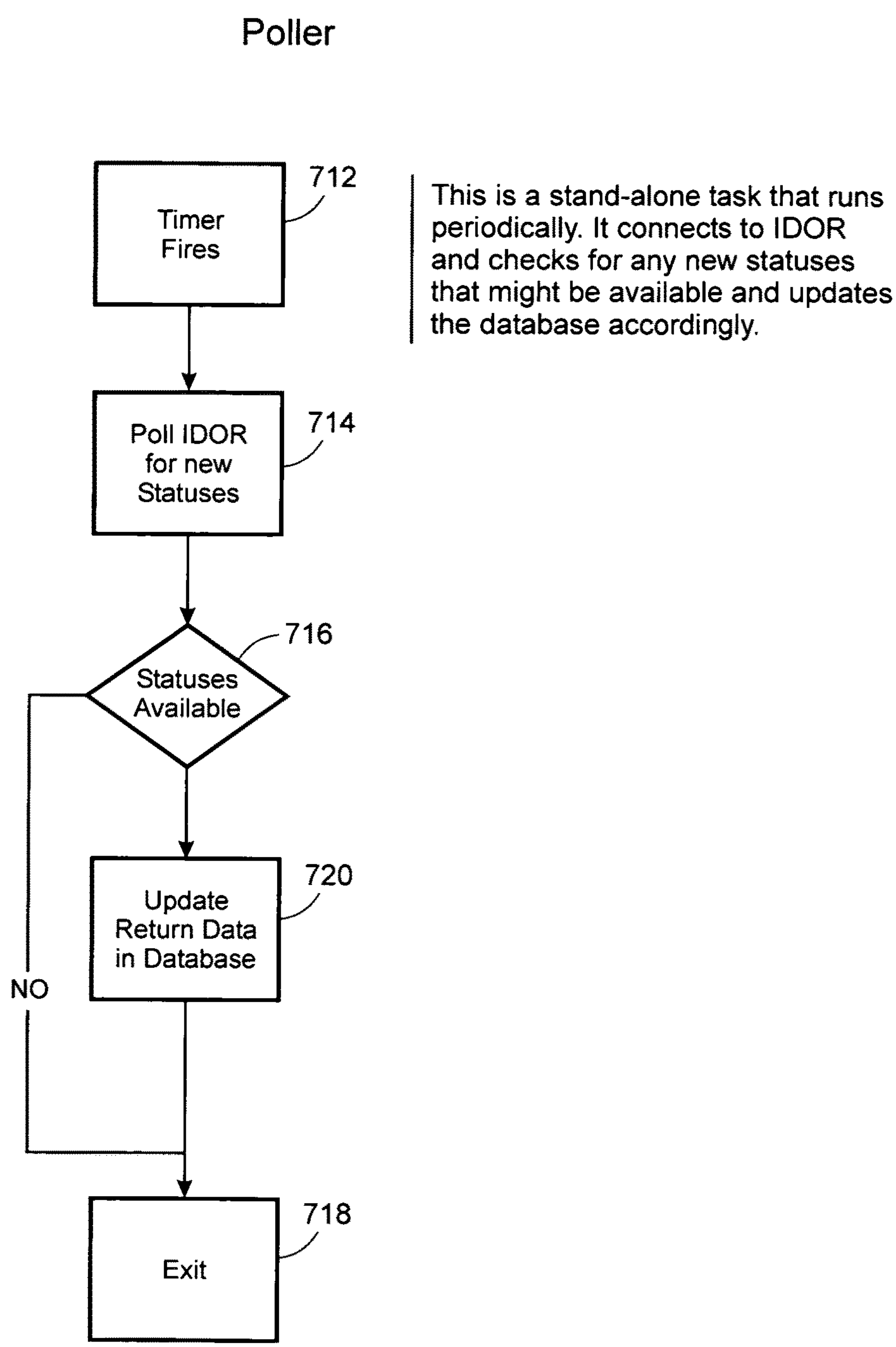

As mentioned above, the system automatically checks the status with the taxing authority and returns the status to the client 628-634 (FIG. 30). As illustrated in FIG. 38, the system may be configured to check the status with the taxing authority 34 (FIG. 30) on a periodic basis. As such, the servers 23, 25 establish connections with the servers at the taxing authority 34 on a periodic basis as indicated in step 712 (FIG. 38). After the connection is established, the system in accordance with the present invention polls the servers at the taxing authority 34 by way of the poller module 620 (FIG. 30) in step 714. The poller 620 determines whether any status information is available in step 716. If not, the system exits in step 718 and waits for the next period in which to poll the taxing authority servers. If status is available, the acknowledge queue 622 and acknowledger 624 (FIG. 30) update the return data in the database 32 (FIG. 30) in step 720 (FIG. 38).

Point of Sale (POS) Embodiment

Figure 39:
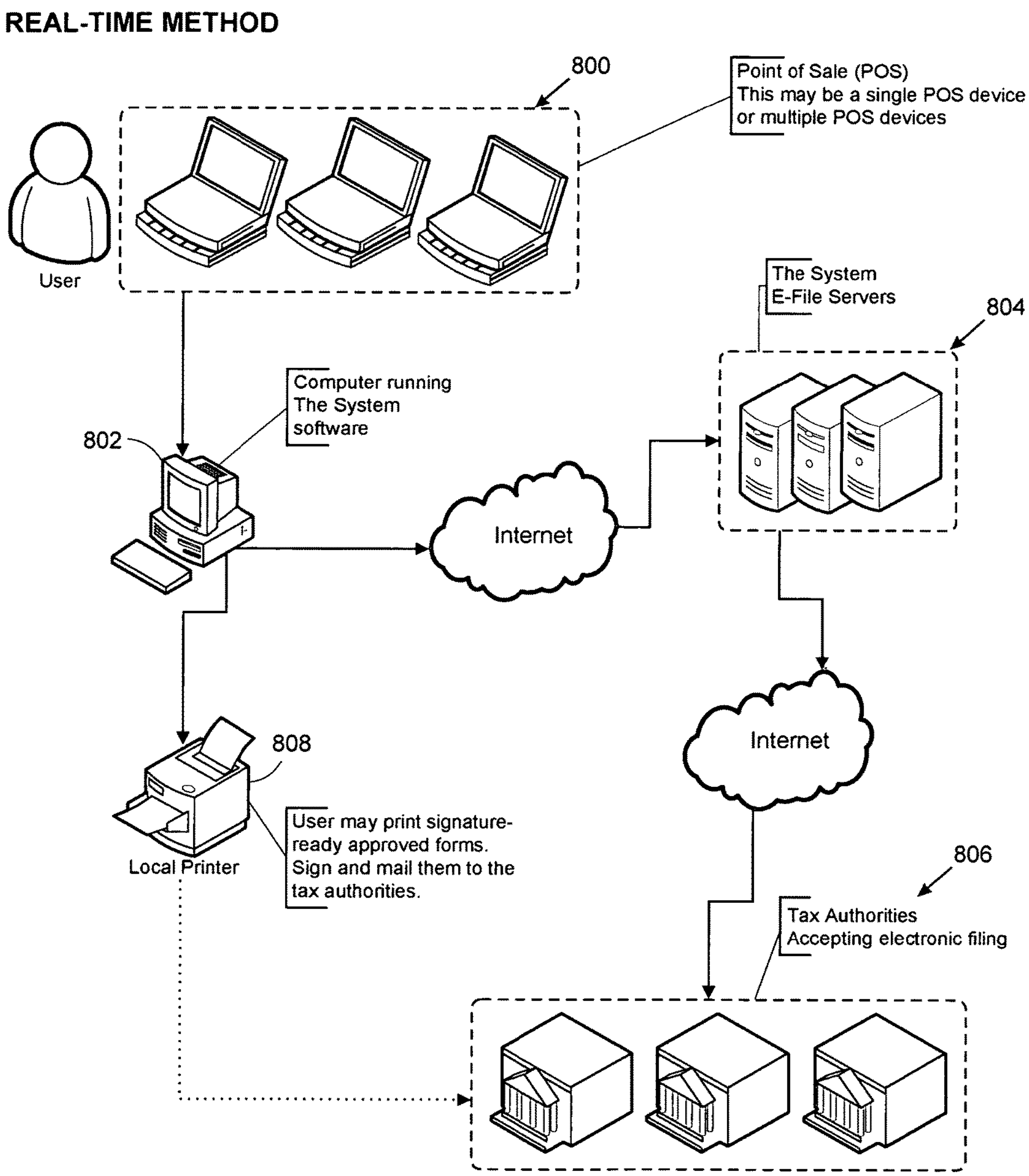
FIG. 39 illustrates an alternate embodiment of the invention in which extracts data directly from point of sale (POS) devices.

FIG. 39 illustrates an alternative embodiment in which data may be extracted directly from the point of sale (POS) devices. In this embodiment, rather than manual input of all of the various data into the graphical user interface, at least a portion of the data is directly fed from the POS devices, generally identified with the reference numeral 800, to a system application running on a computing platform, such as a desktop or server 802. In this embodiment, the description of the system application 802 is similar to the system application described above. Returning back to FIG. 39, the computing platform 802 is connected to one or more E-File servers, generally identified with the reference numeral 804, by way of a private or public communication network, such as the internet. The E-File server 804 may also be connected to remote servers of one or more tax authorities generally identified with the reference numeral 806. Depending on the requirements of the taxing authority 806, the forms may be electronically signed or printed by way of a local printer 808 and transferred in pdf or other form to the taxing authority 806.

Alternatively, the system application 802 and the efile server may be resident on a single server. In such an application (not shown), the POS devices 800 which may be desktop clients or web clients are connected to the combined server by way of a private or public communication network such as the internet.

Figure 40:
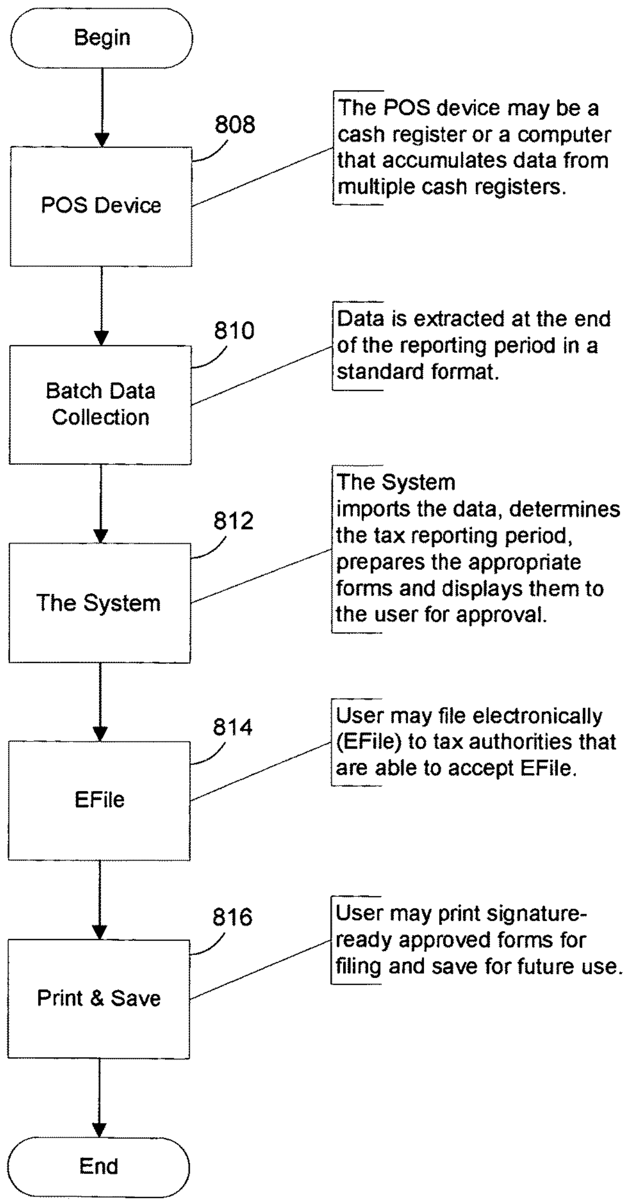
FIG. 40 is a flow chart for the embodiment illustrated in FIG. 39.

An exemplary flowchart for the embodiment illustrated in FIG. 39 is shown in FIG. 40. Various conventional methods are known for interfacing a system application with a POS device. In such an application, the POS device may be a cash register or a computing platform that accumulates data from multiple cash registers as indicated by the box 808. In this embodiment, the data is collected for a predetermined period of time, for example, a reporting period, and processed on a batch basis, as indicated by the box 810. The data from the POS devices is then processed by the system application as indicated by the box 812. As discussed above, the system application processes the data and prepares tax returns in a format suitable for fling with a taxing authority. These tax returns are then electronically filed with the appropriate taxing authority as indicated by the box 814. Copies of the prepared tax returns may be printed and saved for future use as indicated by the box 816.

Tax Levels

Figure 41:
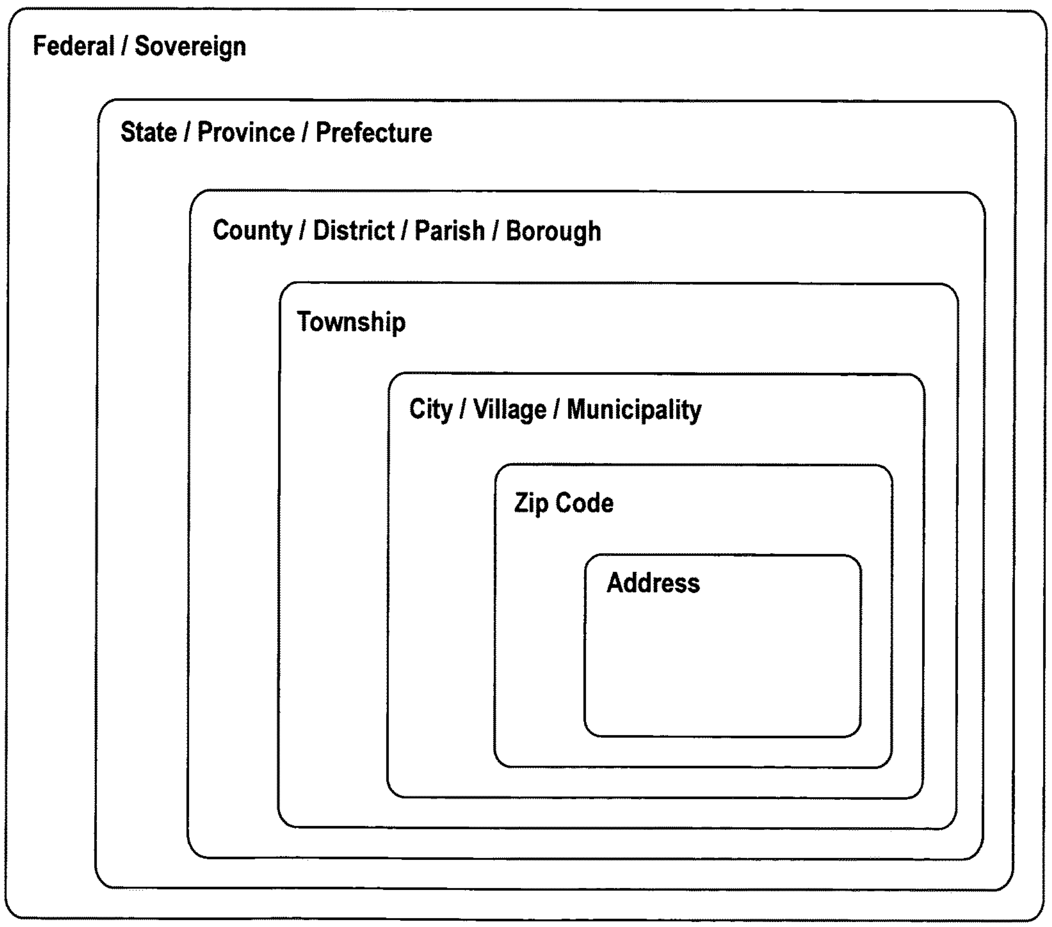
FIG. 41 is a diagram illustrating all of the various levels of tax returns which can be prepared with the system in accordance with the present invention.
Figure 42:
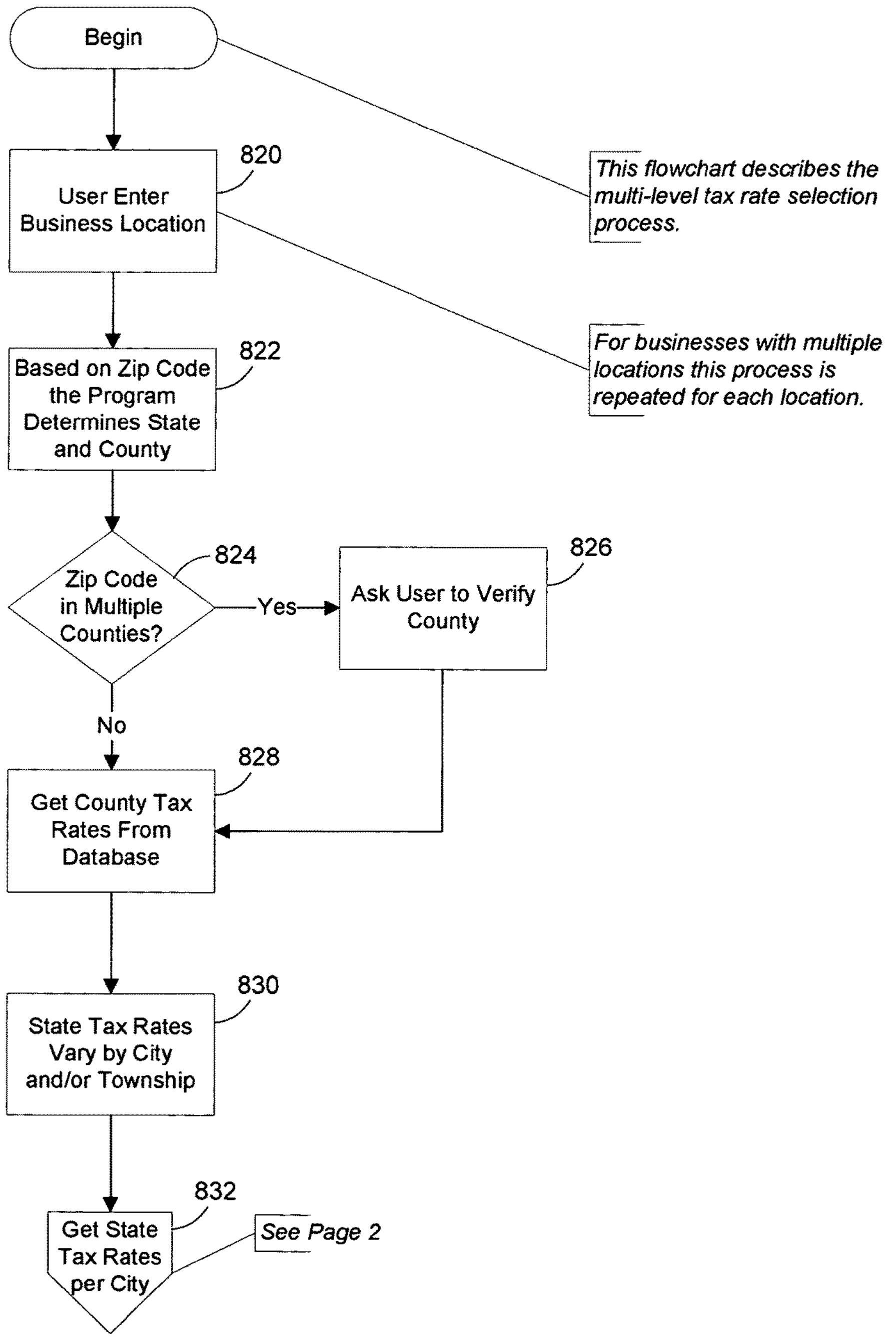
FIGS. 42-44 are flow charts which illustrate how the system prepares tax returns at various levels.

FIG. 41 illustrates a multi-level sales and use tax system. As will be discussed in more detail below and illustrated in the flowcharts 42 through 44, the system in accordance with the present invention is able to prepare all of the necessary tax returns for a multi-level system. Referring to FIG. 42, the address including the zip code of the business location for which the tax returns are to be prepared is entered in step 820. For businesses with multiple locations, step 820 is repeated. Based on the zip code, the system automatically determines all of the various state, county and local tax returns that need be prepared in step 822. In step 824, the system checks whether the zip code entered in step 820 covers multiple counties. If so, the system requests verification of the county from the user in step 826. If the zip code only covers a single county, the system obtains the county tax rates from the system database 26 (FIGS. 1A and 1B) in step 828 (FIG. 42). Since the system knows that the state tax rates vary by city and/or township, as indicated by the box 830, the system obtains the state tax rate for the city in which the business is located in step 832. Since the state tax rates can also vary by city and/or township, the system looks up the city and township in the state's tax listing in step 834. In step 836, the system determines whether the city is in the state rate list. If not, the system next checks whether the city is dependent upon another city in step 838. If the city is dependent upon another city, the system then looks up the city and township for that city in the state tax listing in step 34 and continues. If the city is not dependent upon another city and is not listed in the state tax list, the system utilizes the township tax rate as indicated by the box 840.

Figure 43:
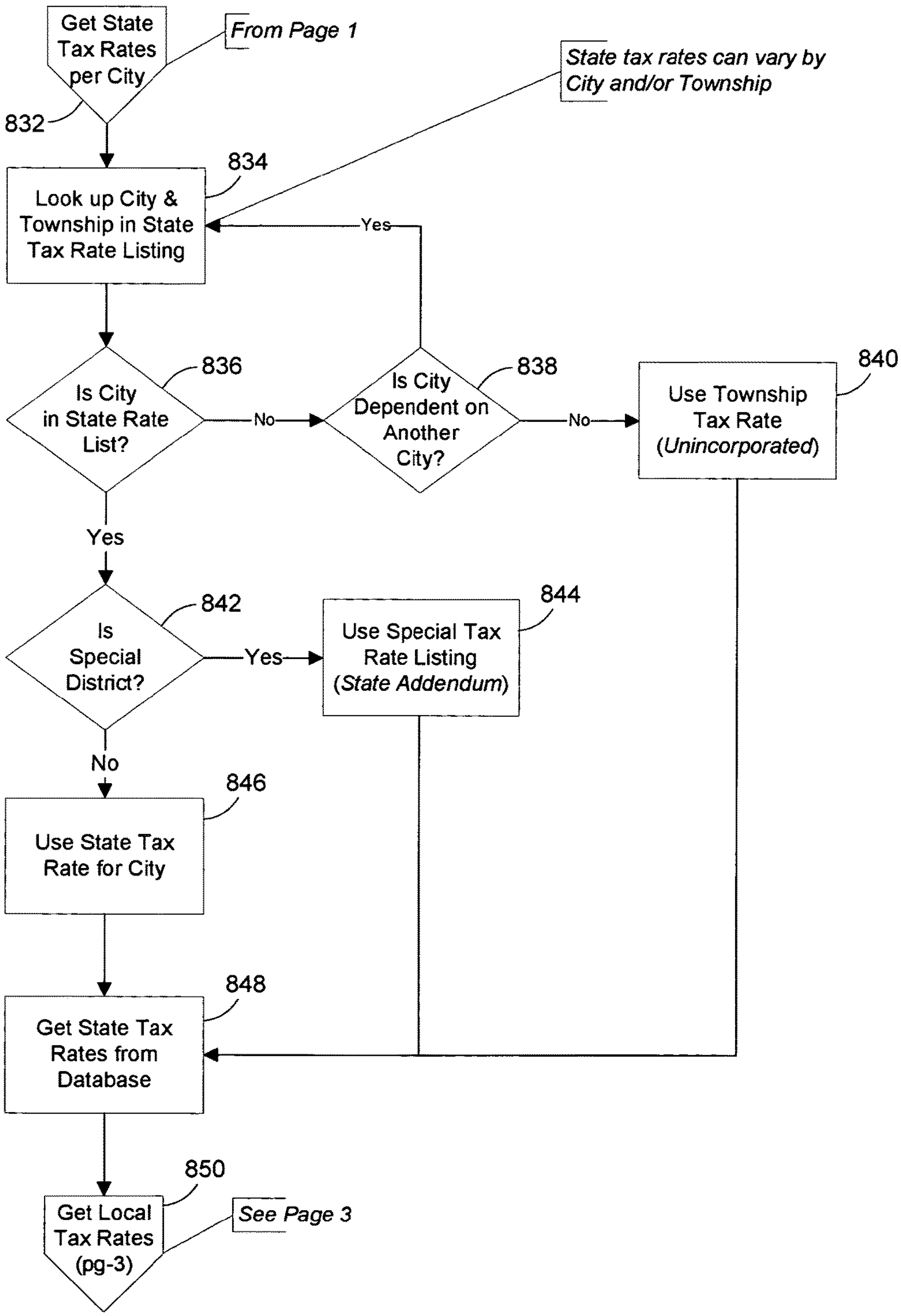
Figure 44:
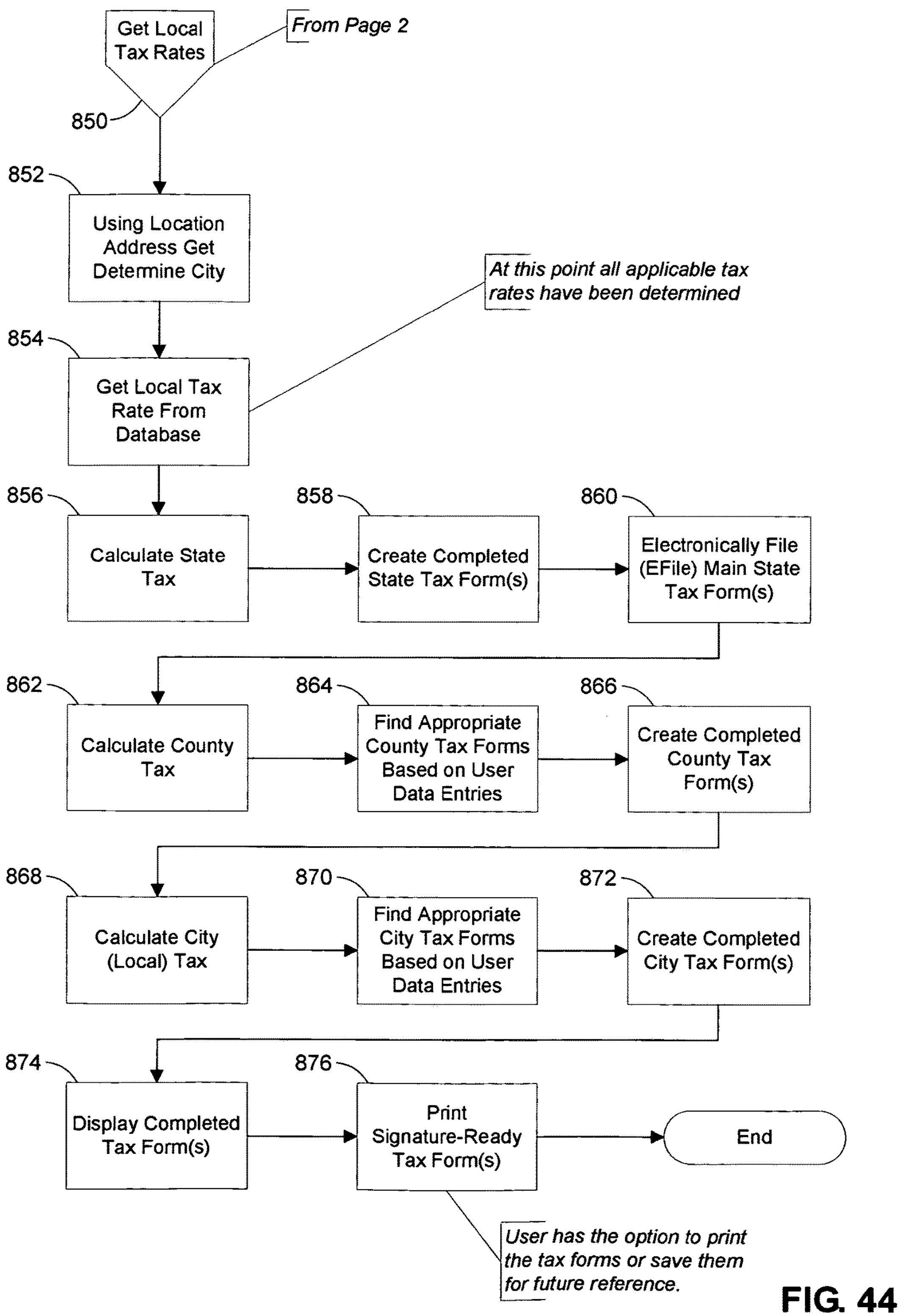
Figure 45:
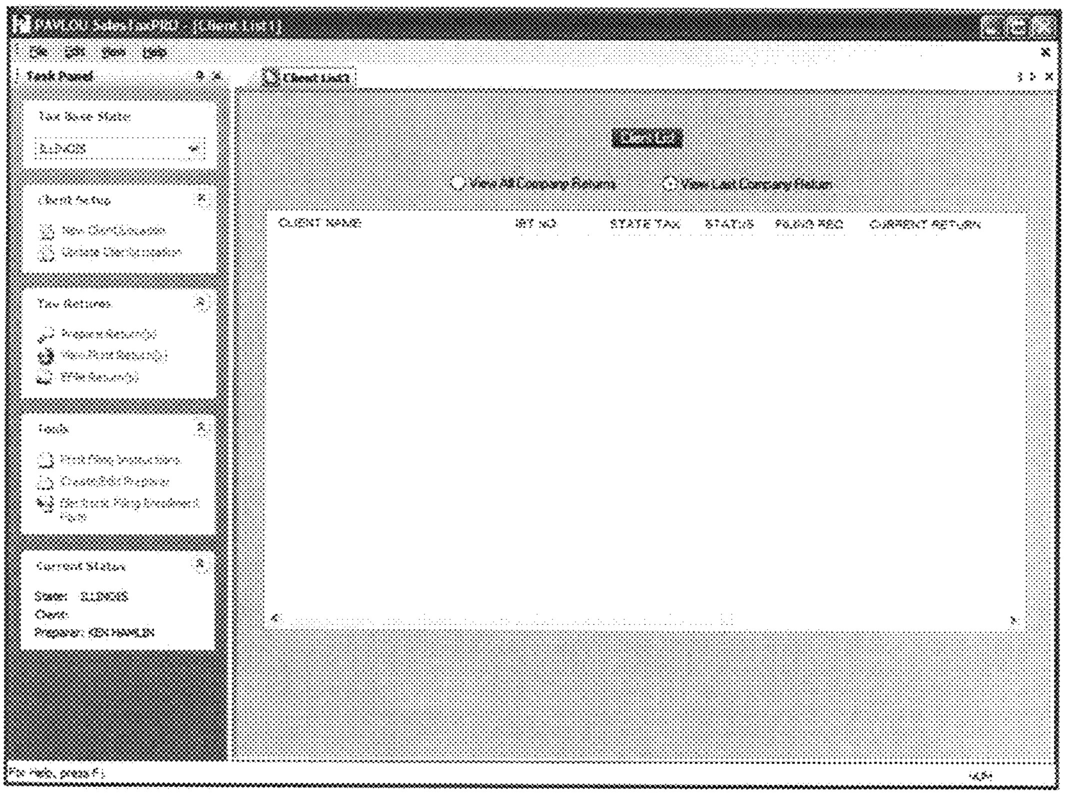
Figure 46:
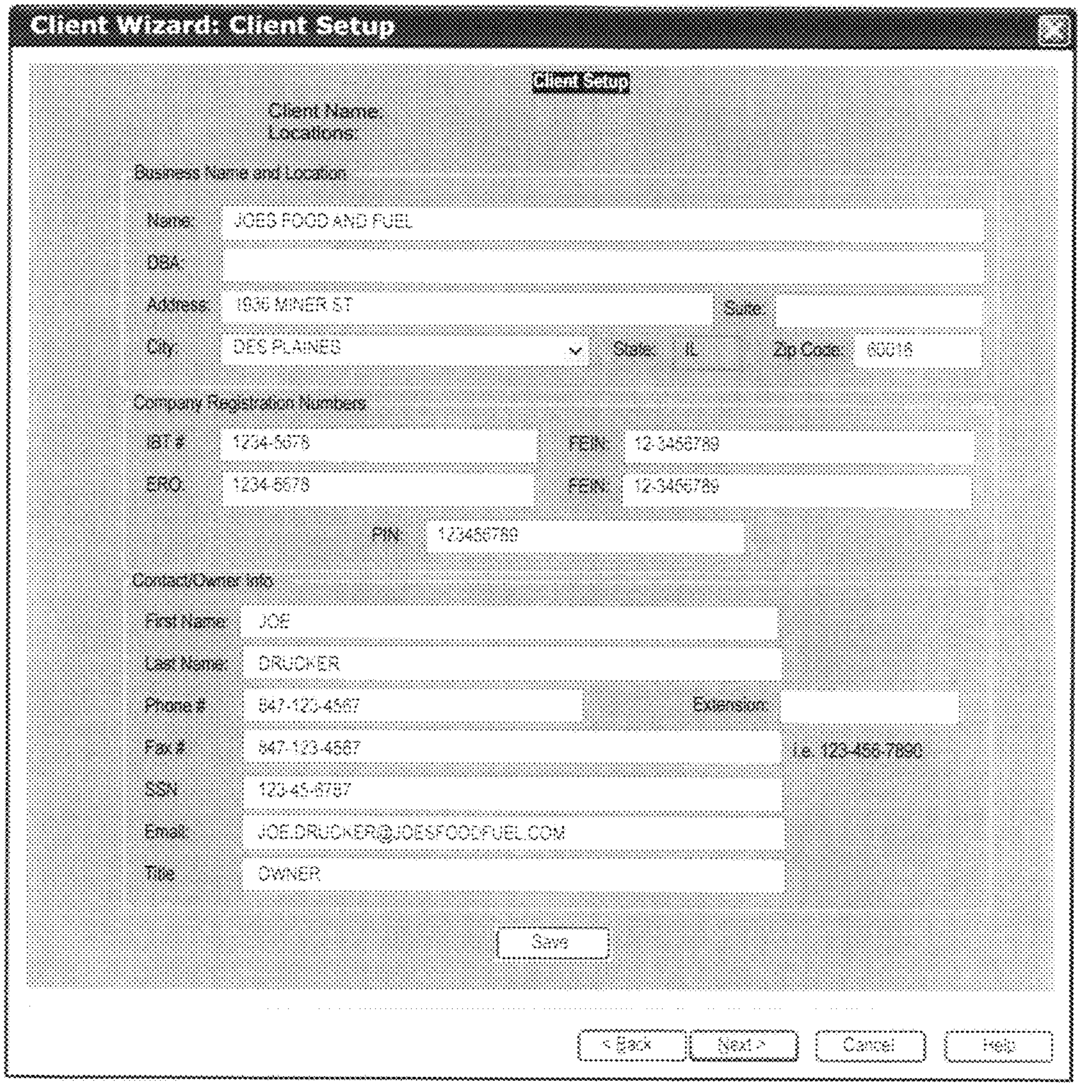
Figure 47:
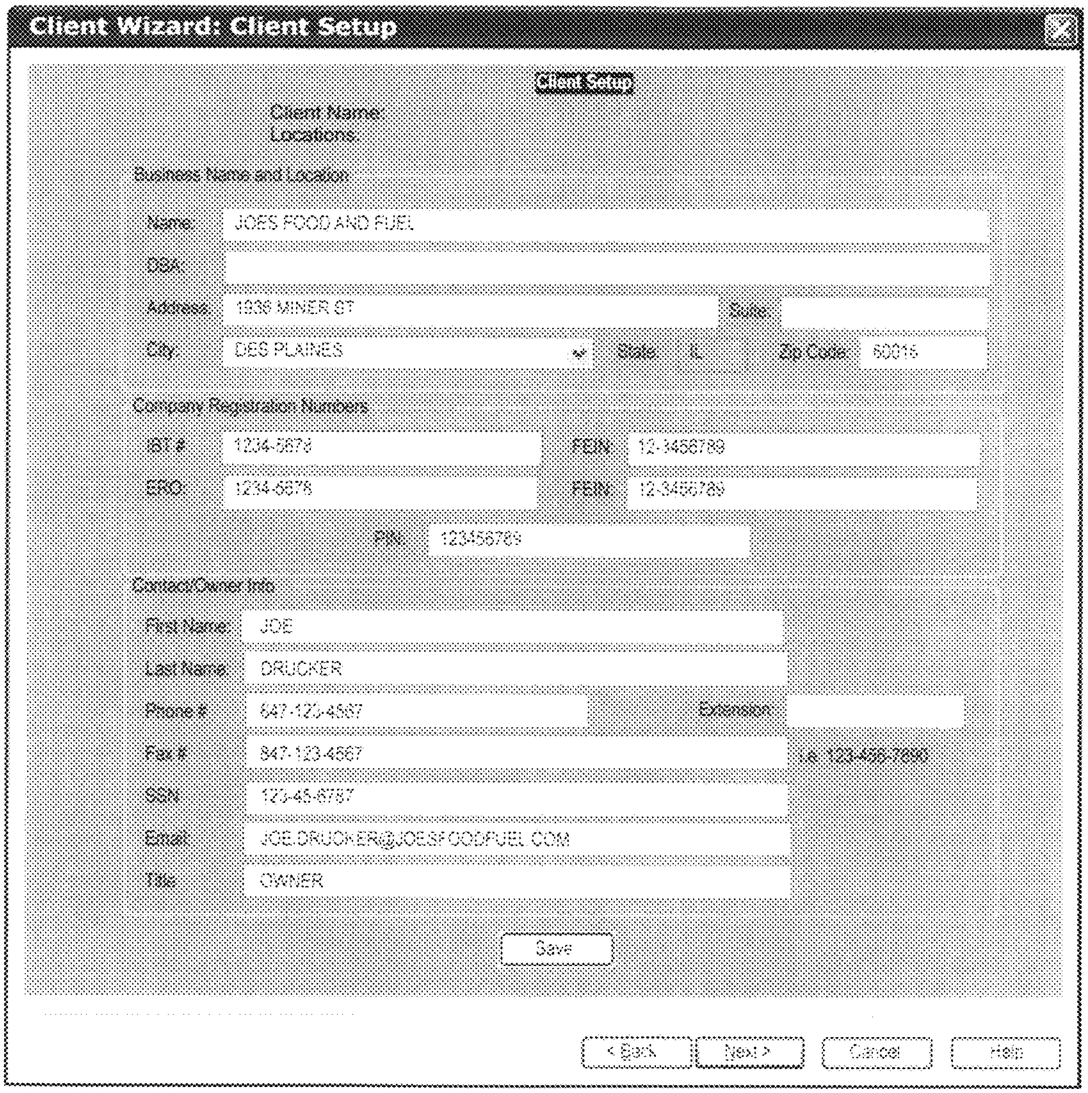
Figure 48:
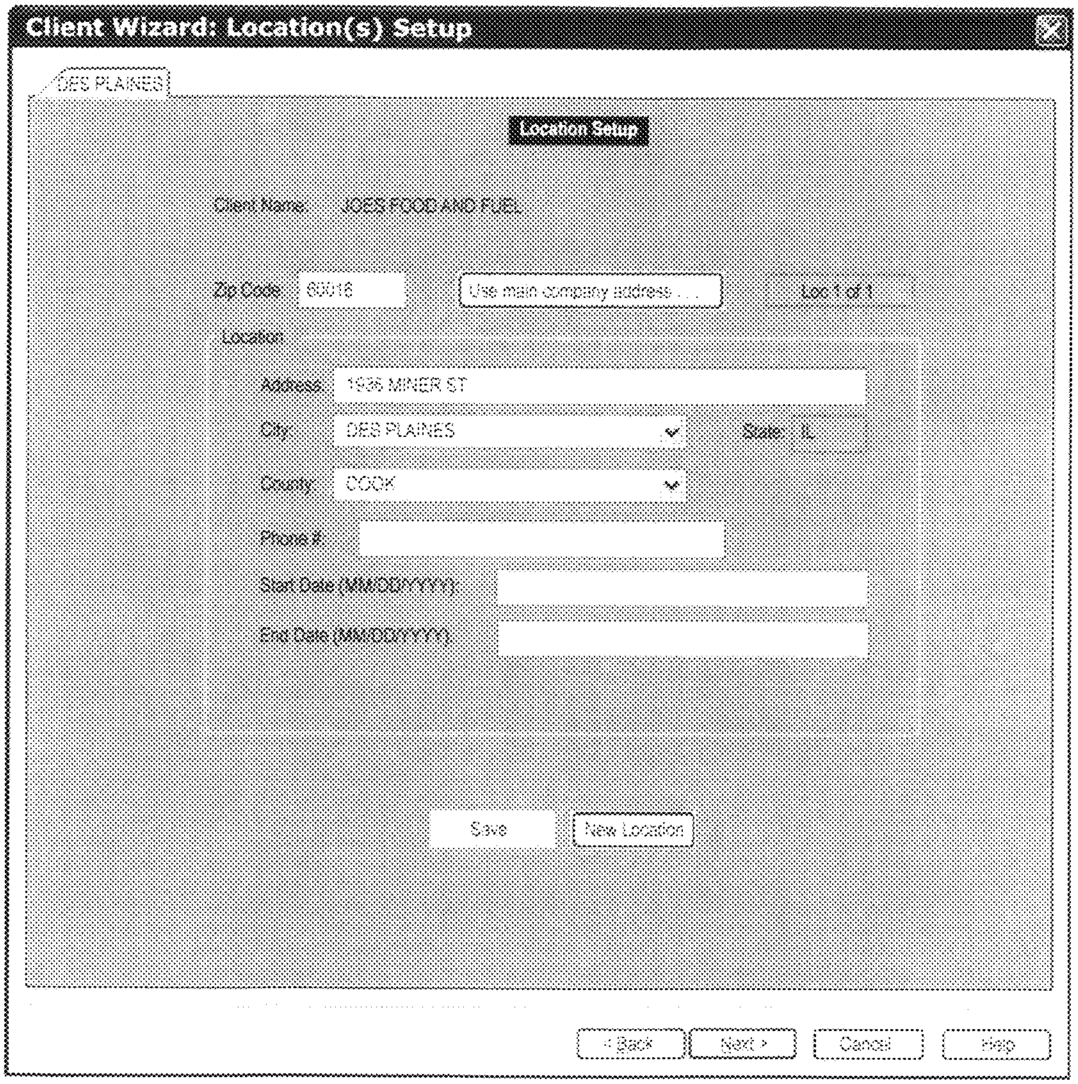
Figure 49:
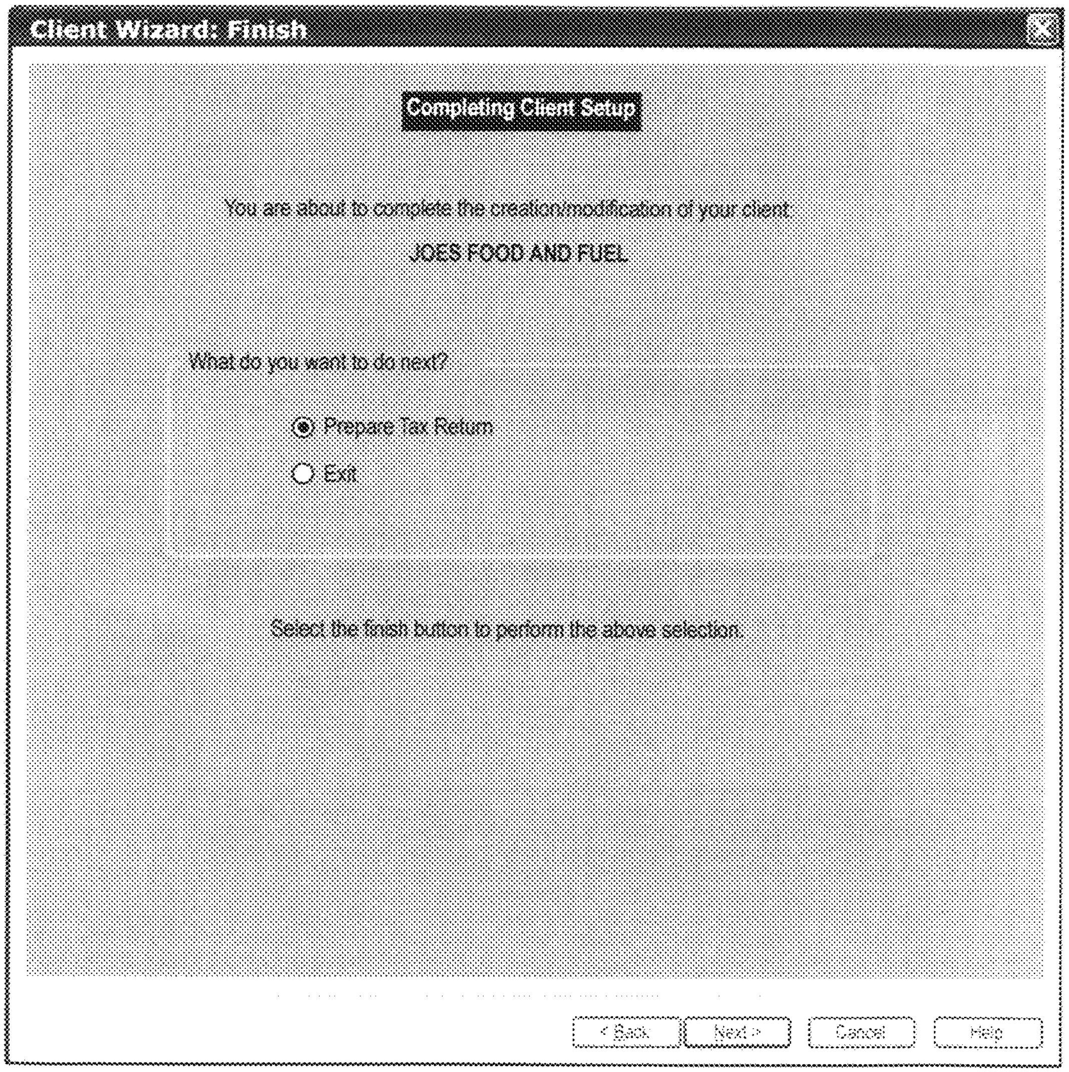
Figure 50:
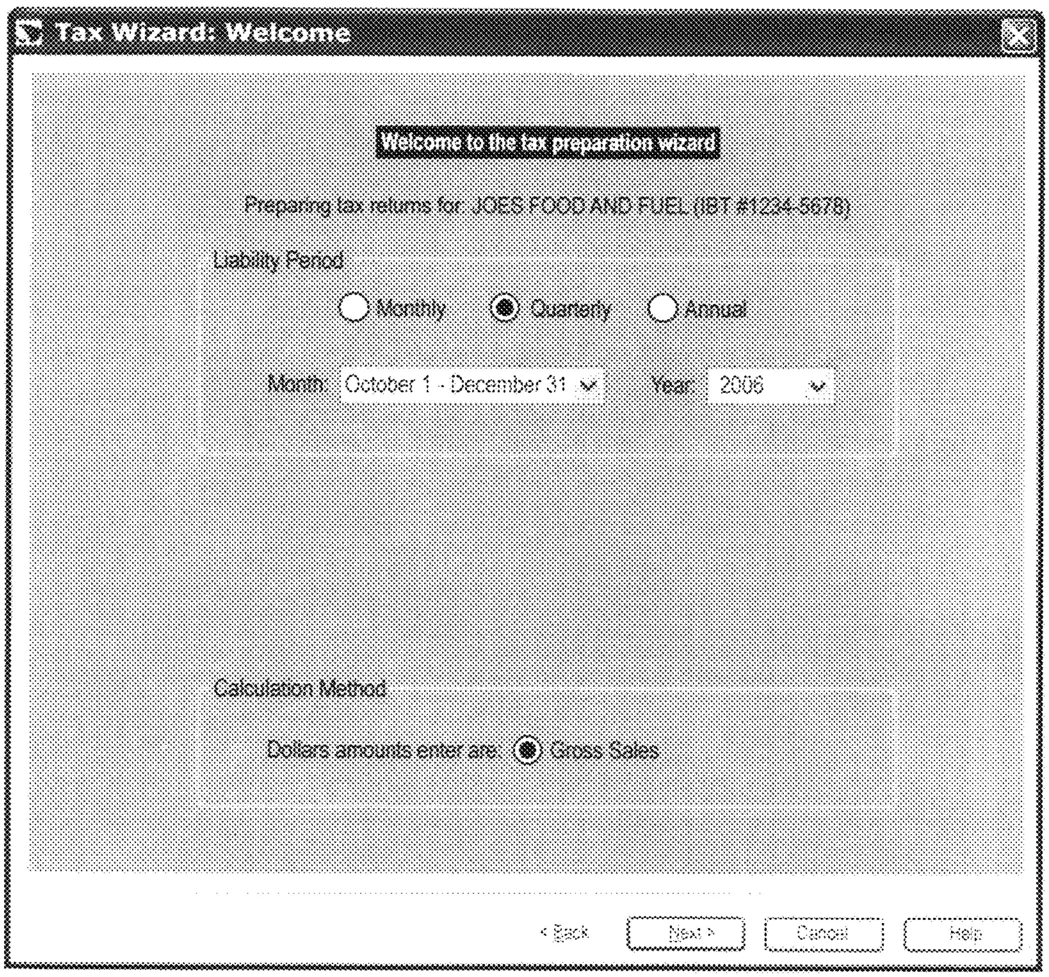
Figure 52:
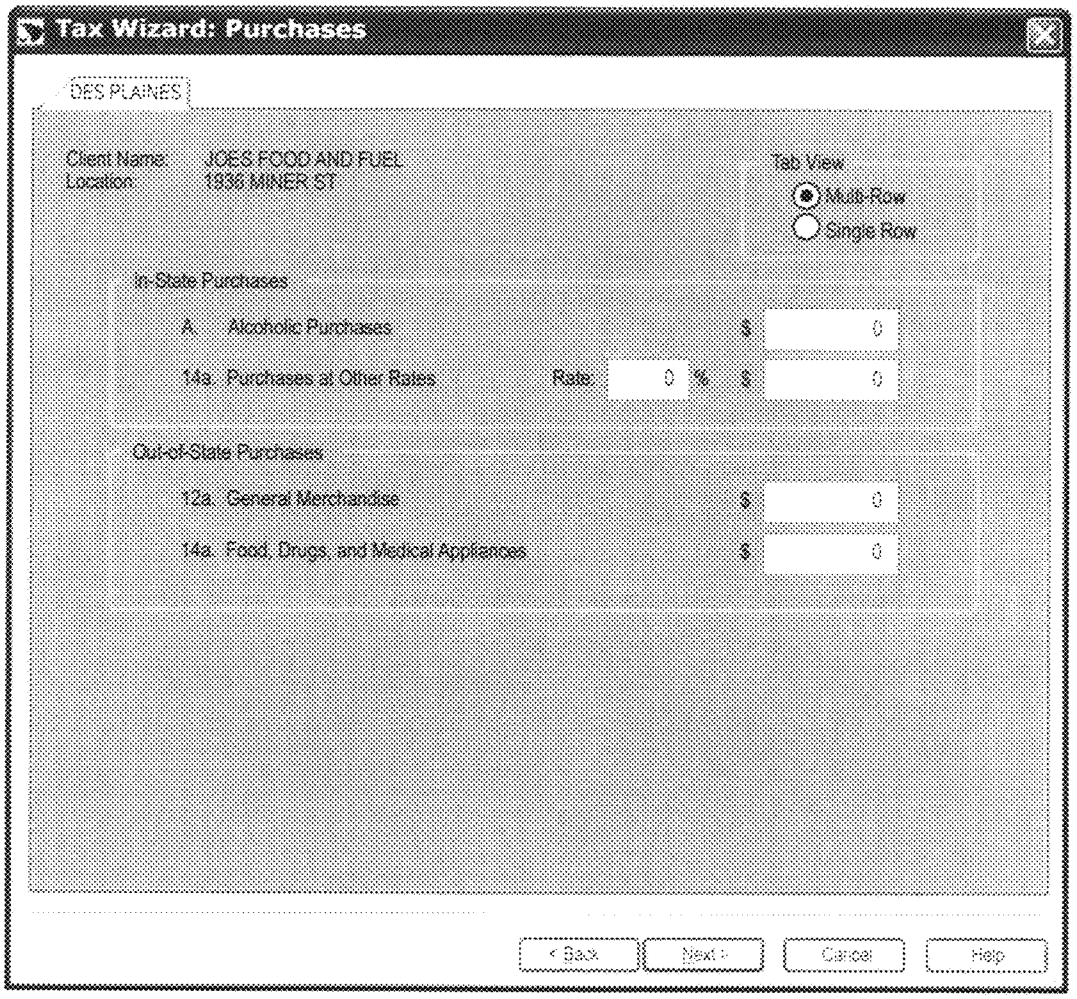
Figure 53:
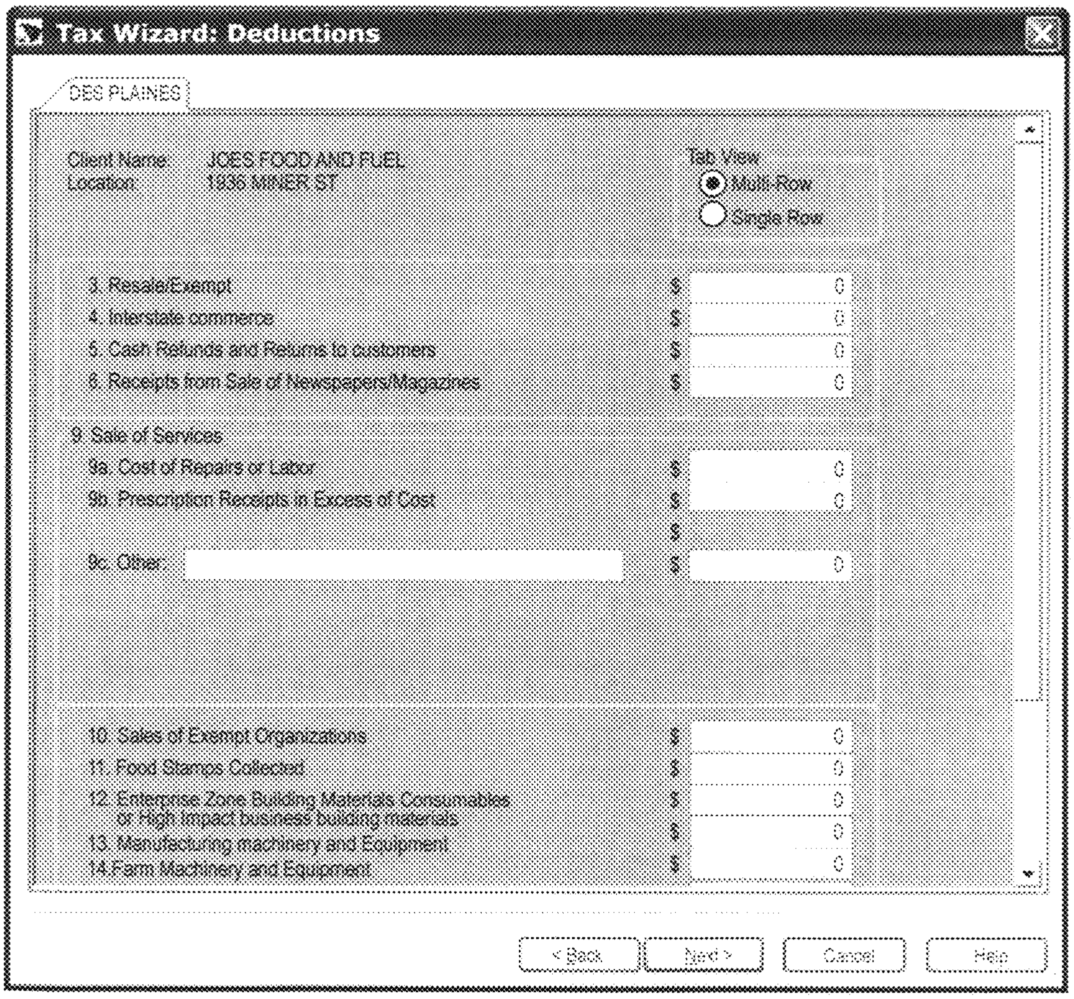
Figure 54:
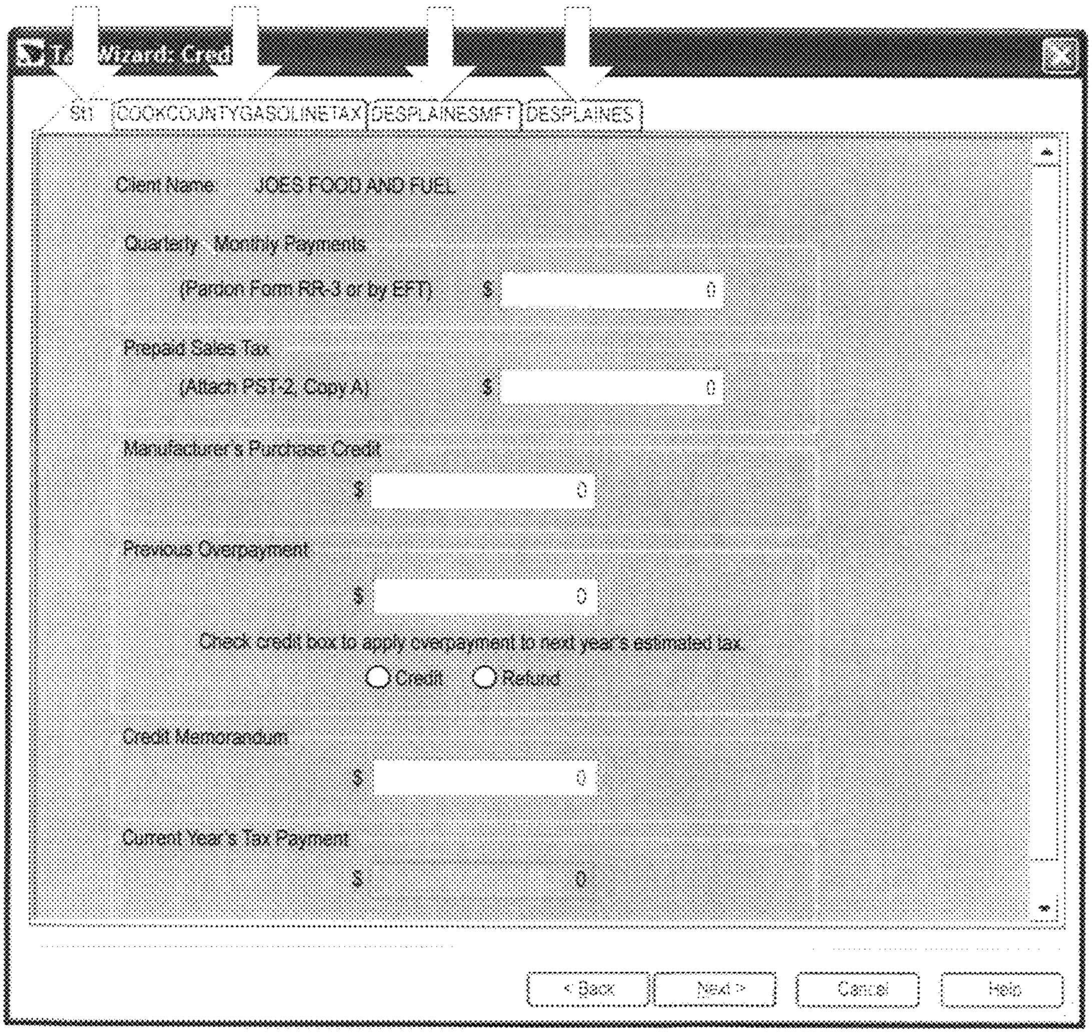
Figure 55:
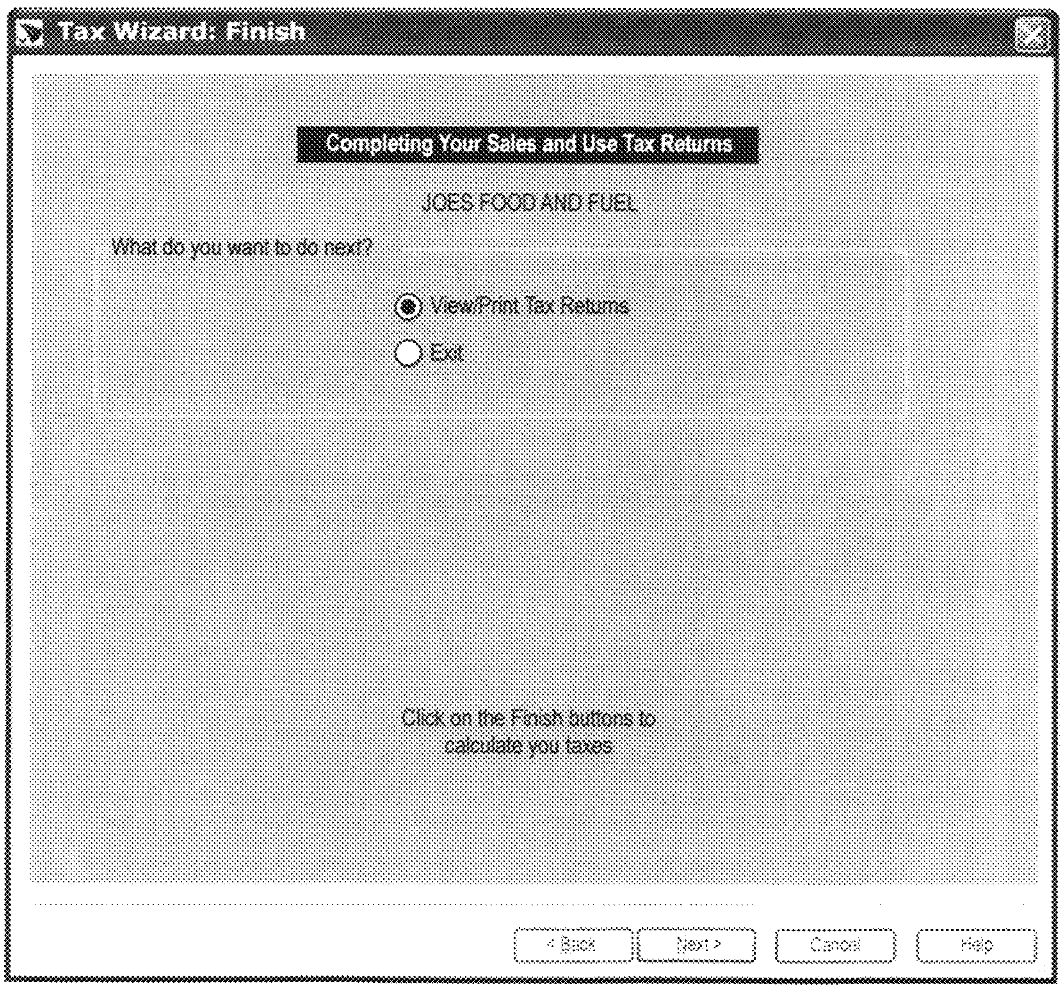

If the system determines that the city is in the state rate list, the system next determines whether the city is in a special district as determined in step 842. If the city is in a special district, the special tax rate listing is used as indicated in step 844. If not, the system determines to use the state tax rate for the city as determined in step 846 and gets the state tax rates from the system database 26 (FIGS. 1A and 1B) in step 848 (FIG. 43). Next, in step 850, the system obtains the local tax rates. Once the local tax rates are obtained, the system using the location address determines the local tax rates from the system database 26 (FIGS. 1A and 1B) as indicated in steps 852 and 854.

After all of the appropriate tax rates are obtained in the manner as discussed above, the system calculates the state tax as indicated in step 856; creates completed state tax forms, as indicated in step 858 and electronically files the state tax forms with the state taxing authority as indicated by the box 860. Once the state tax forms have been completed, the system calculates the county tax as indicated in step 862. The system also finds the appropriate county tax forms based on user data entries in step 864 and creates completed county tax forms in step 866. The system can also calculate city or local taxes in step 868 and find the appropriate city tax forms based on the user entries as indicated by the box 870 and create the completed city tax forms in step 872. After all of the appropriate taxes have been calculated and the appropriate forms created, the system can display the completed tax forms in step 874 and print signature ready tax forms in step 876 or electronically file those forms with any taxing authority that accepts electronic filing.

Multi-Level Tax Preparation Example

Figure 56:
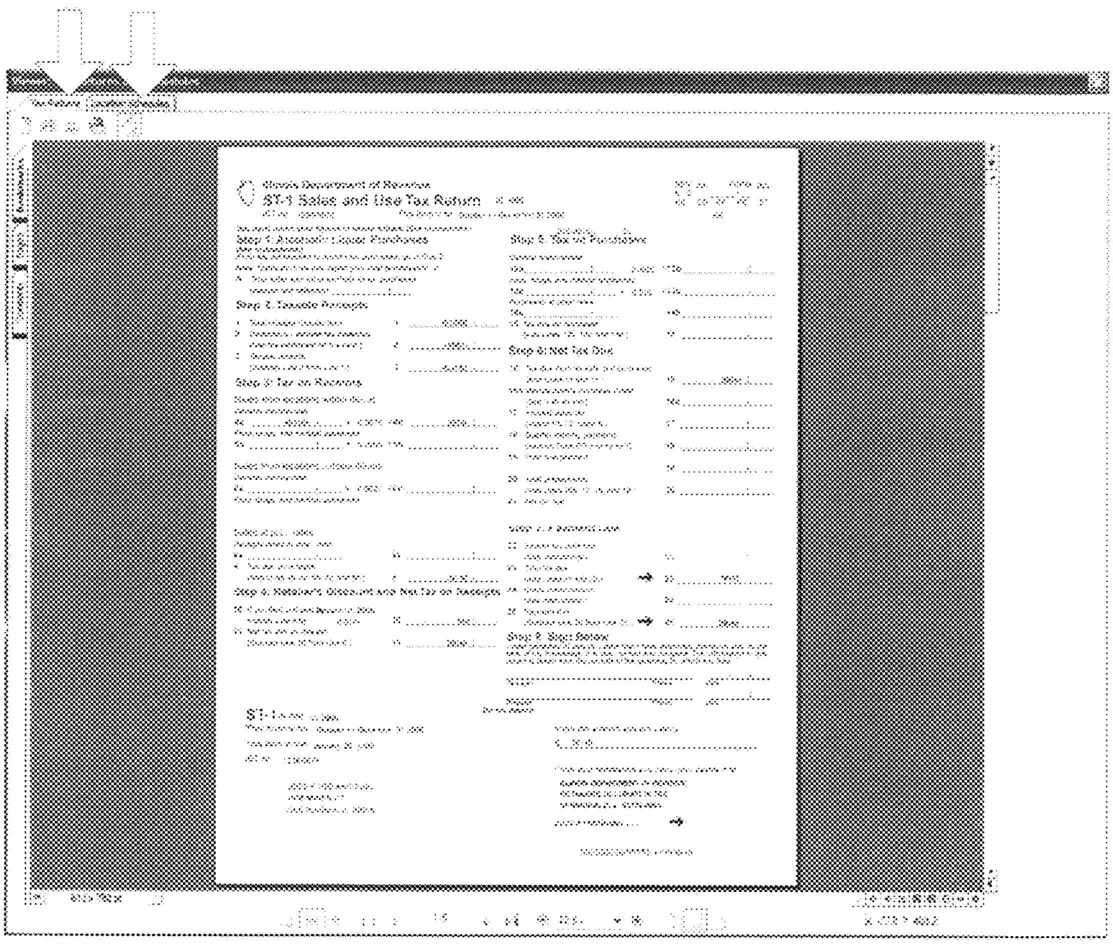
Figure 57:
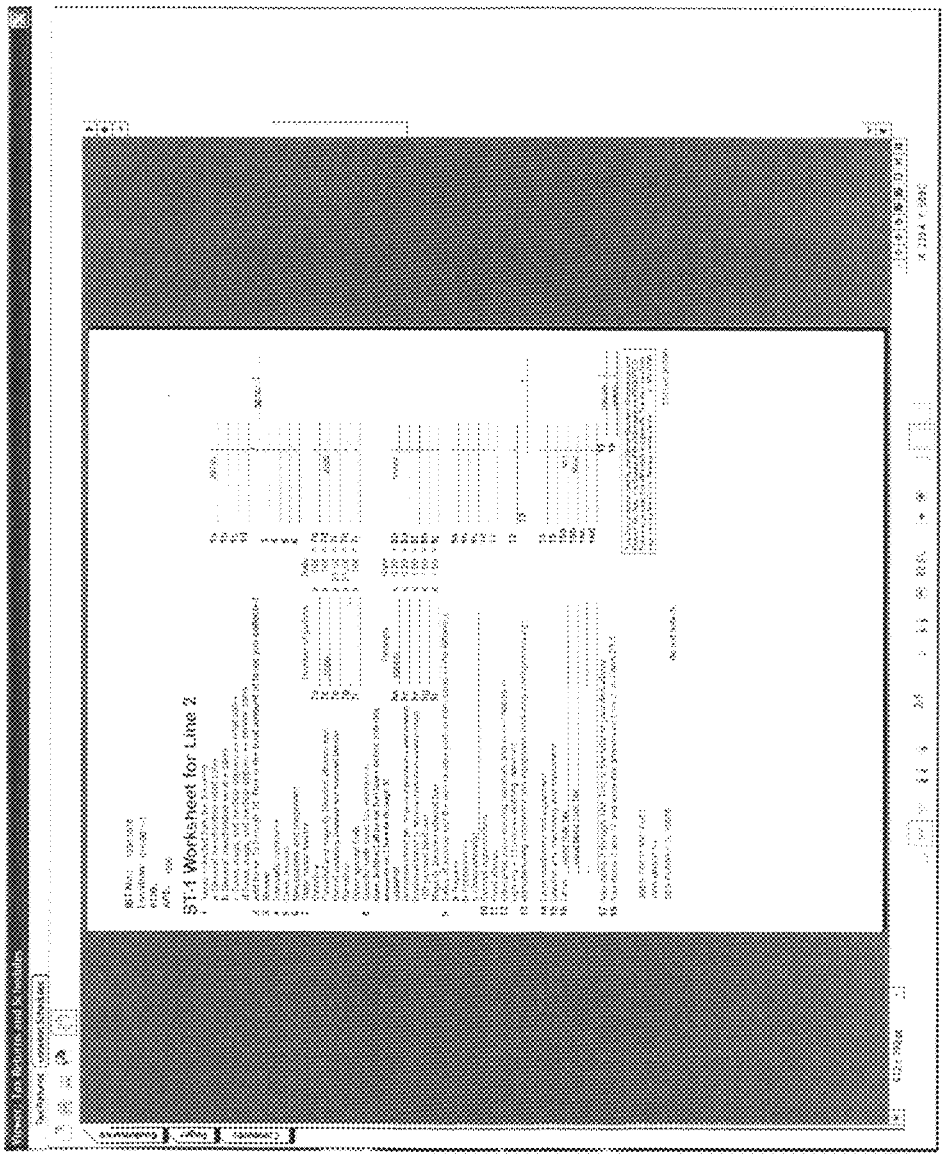
Figure 58:
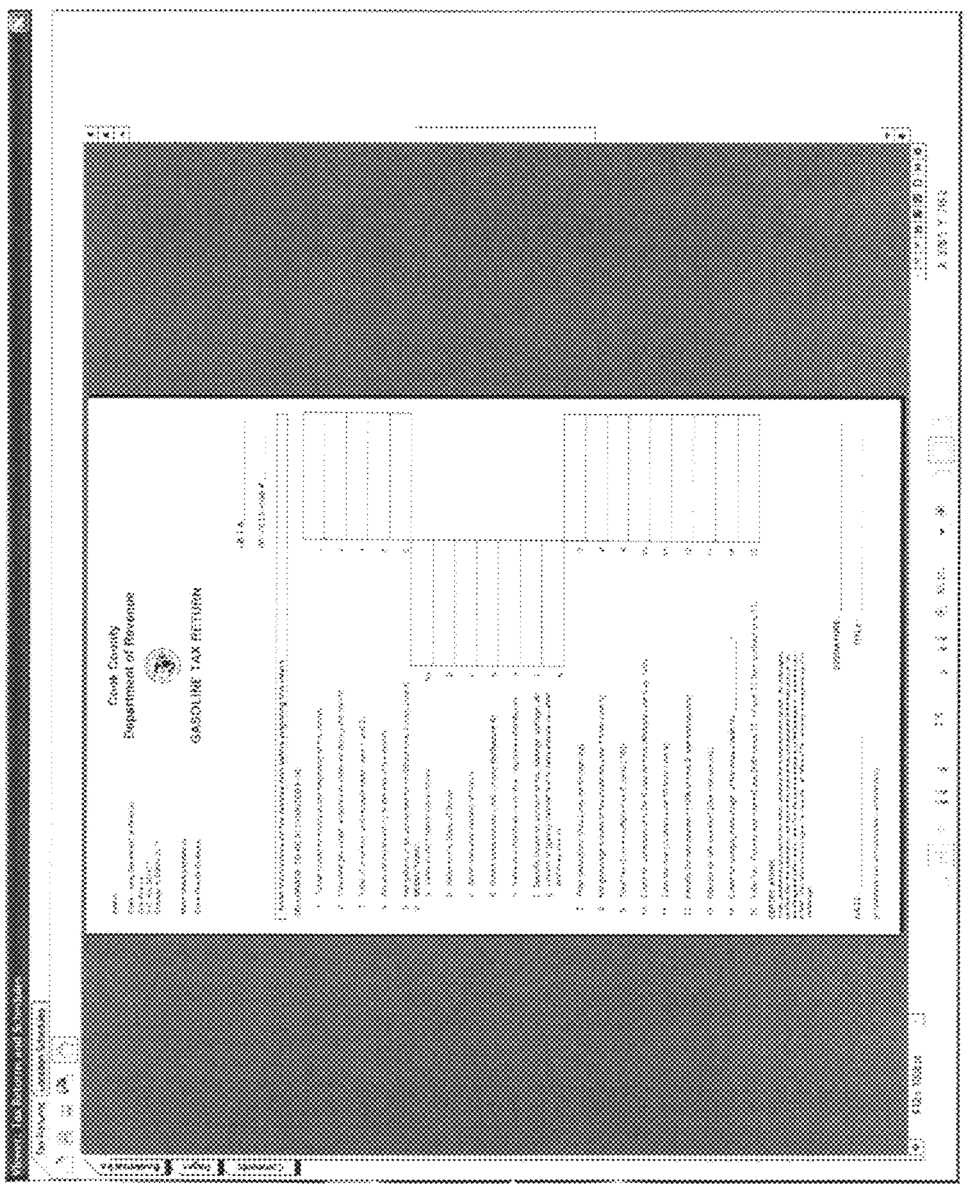
Figure 59:
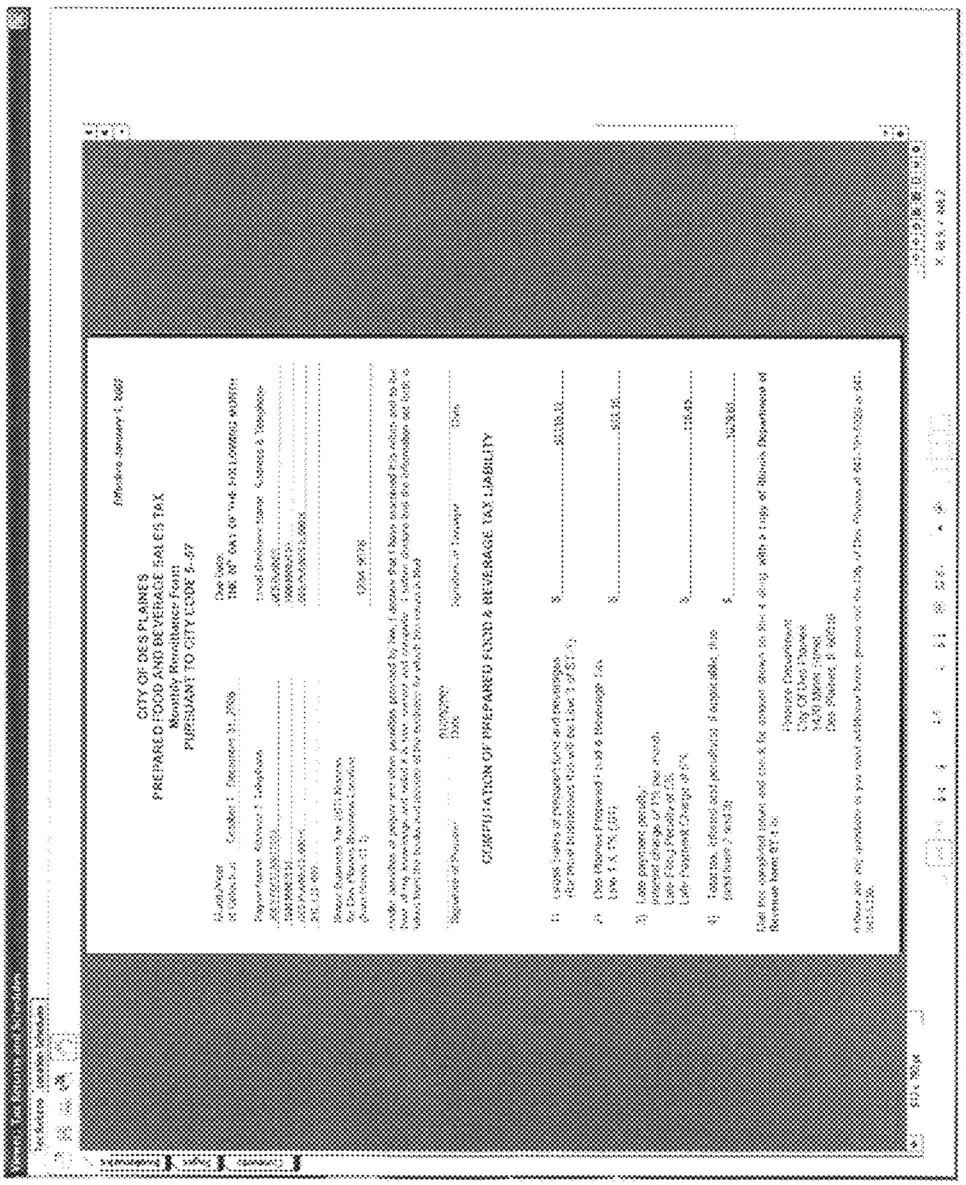
Figure 60:
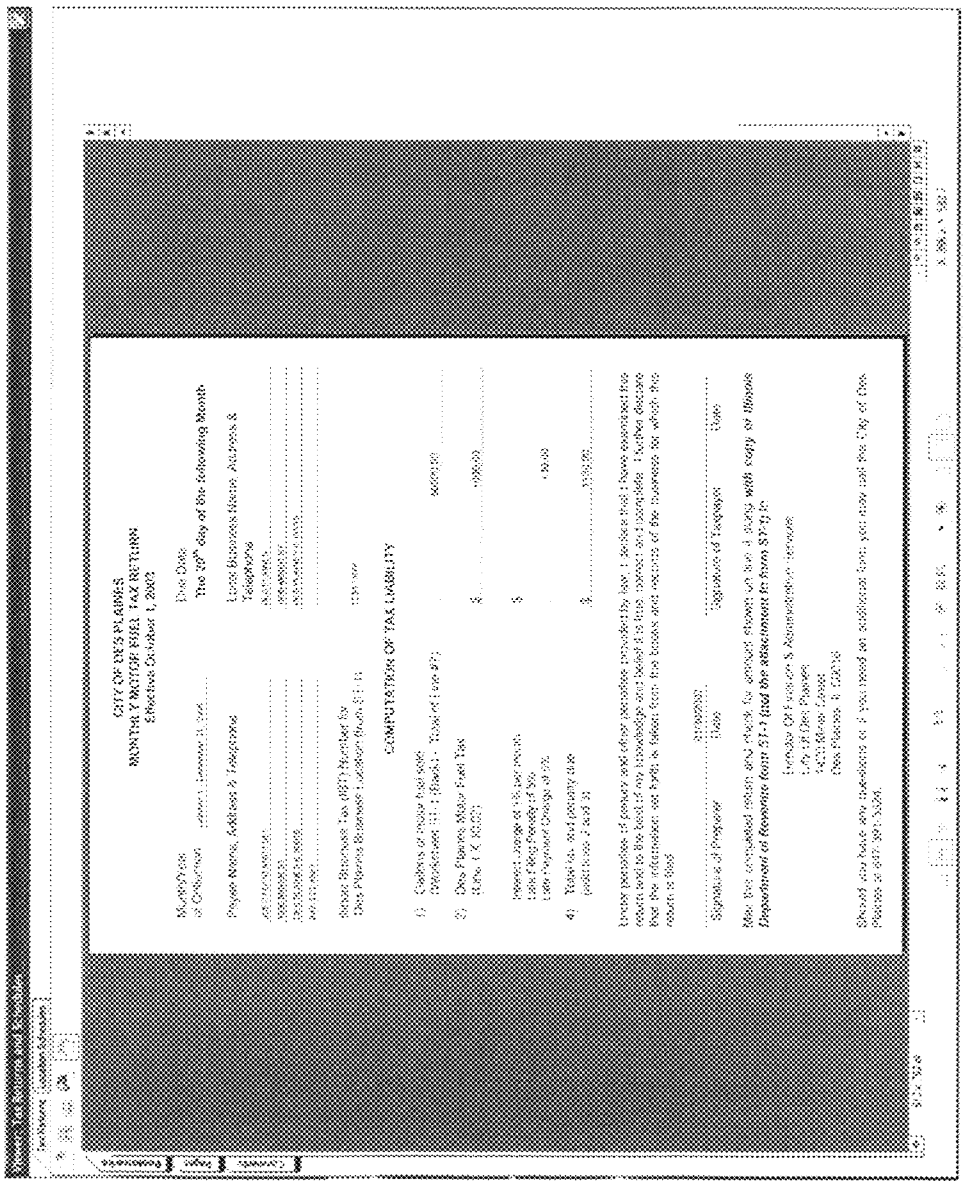
Figure 61:
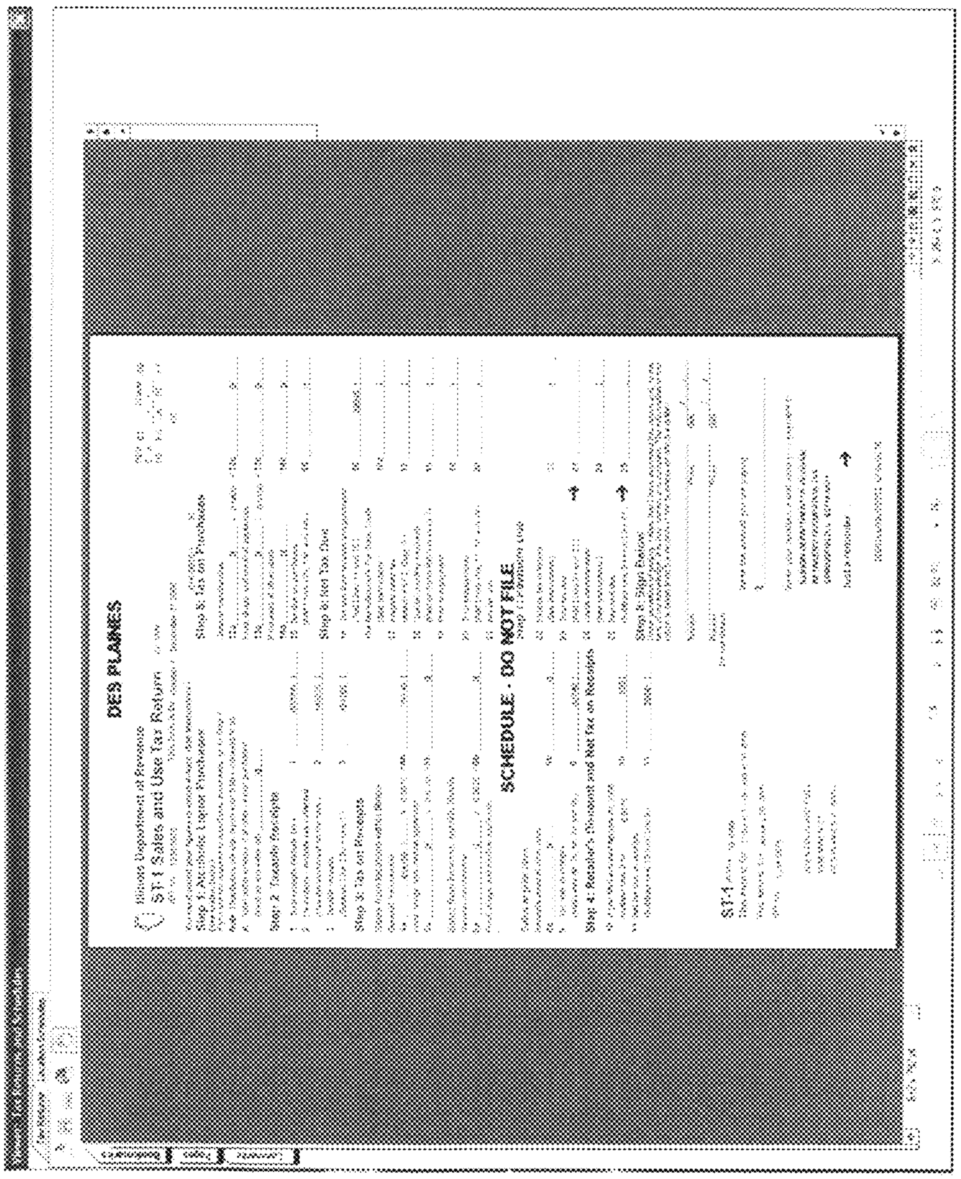
Figure 62:
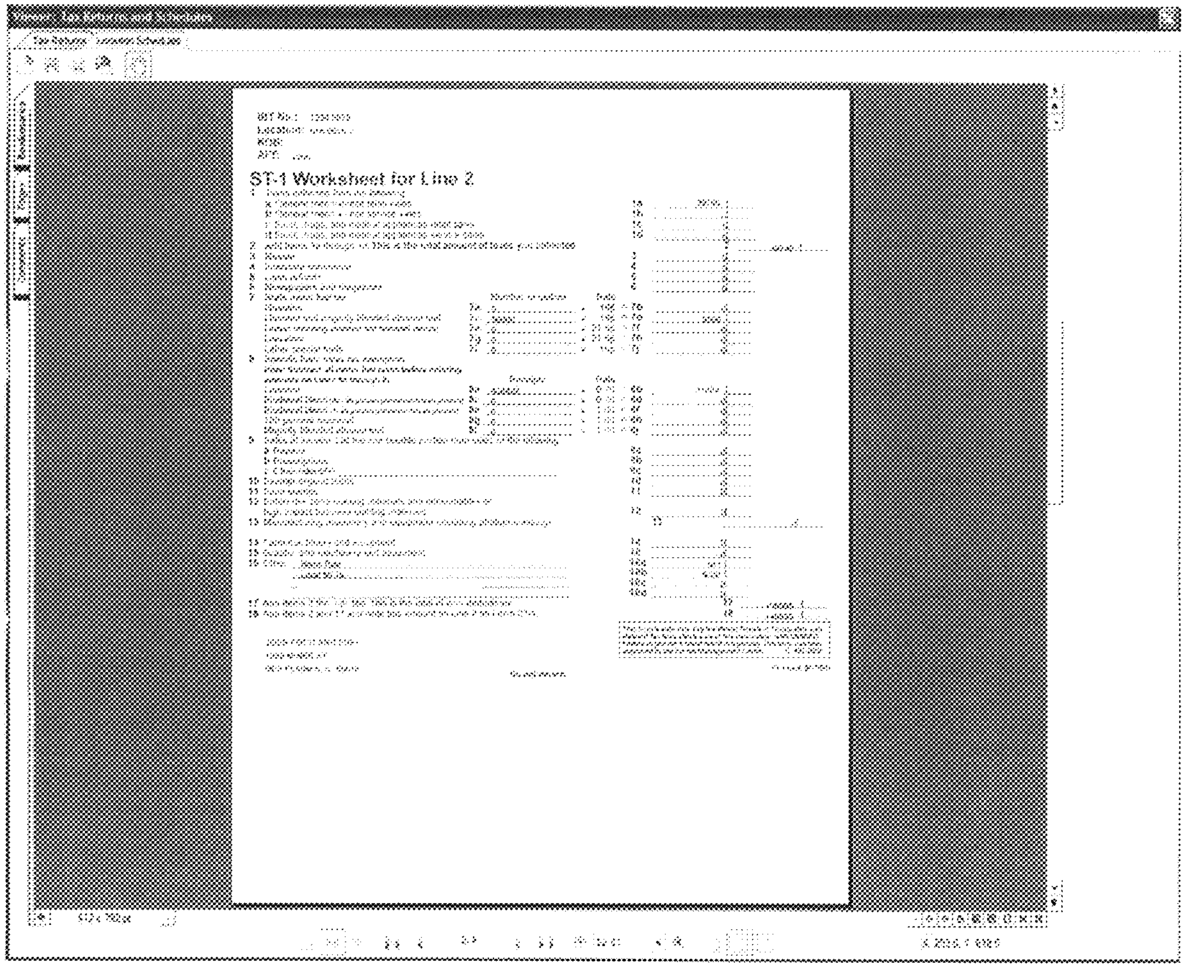
Figure 63:
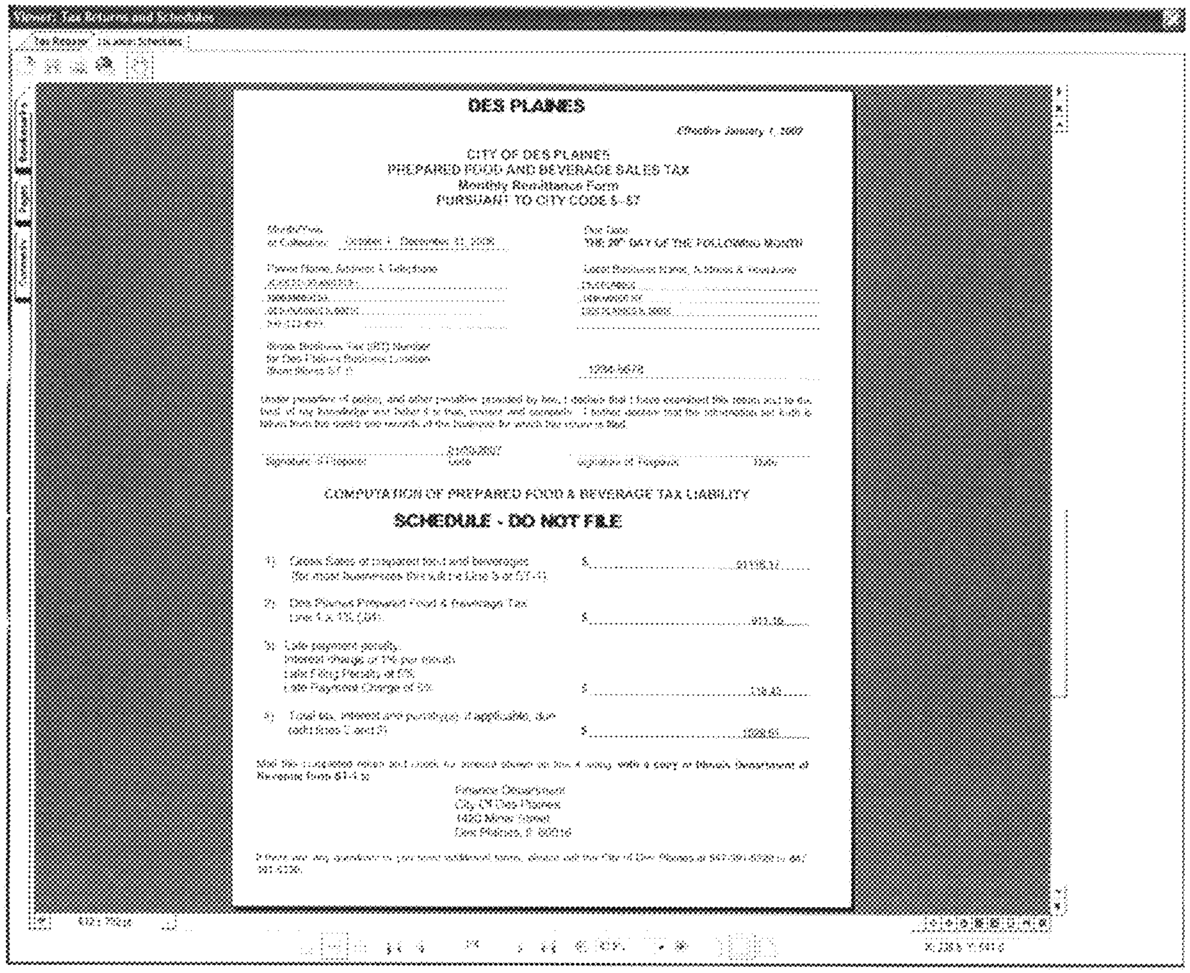
Figure 64:
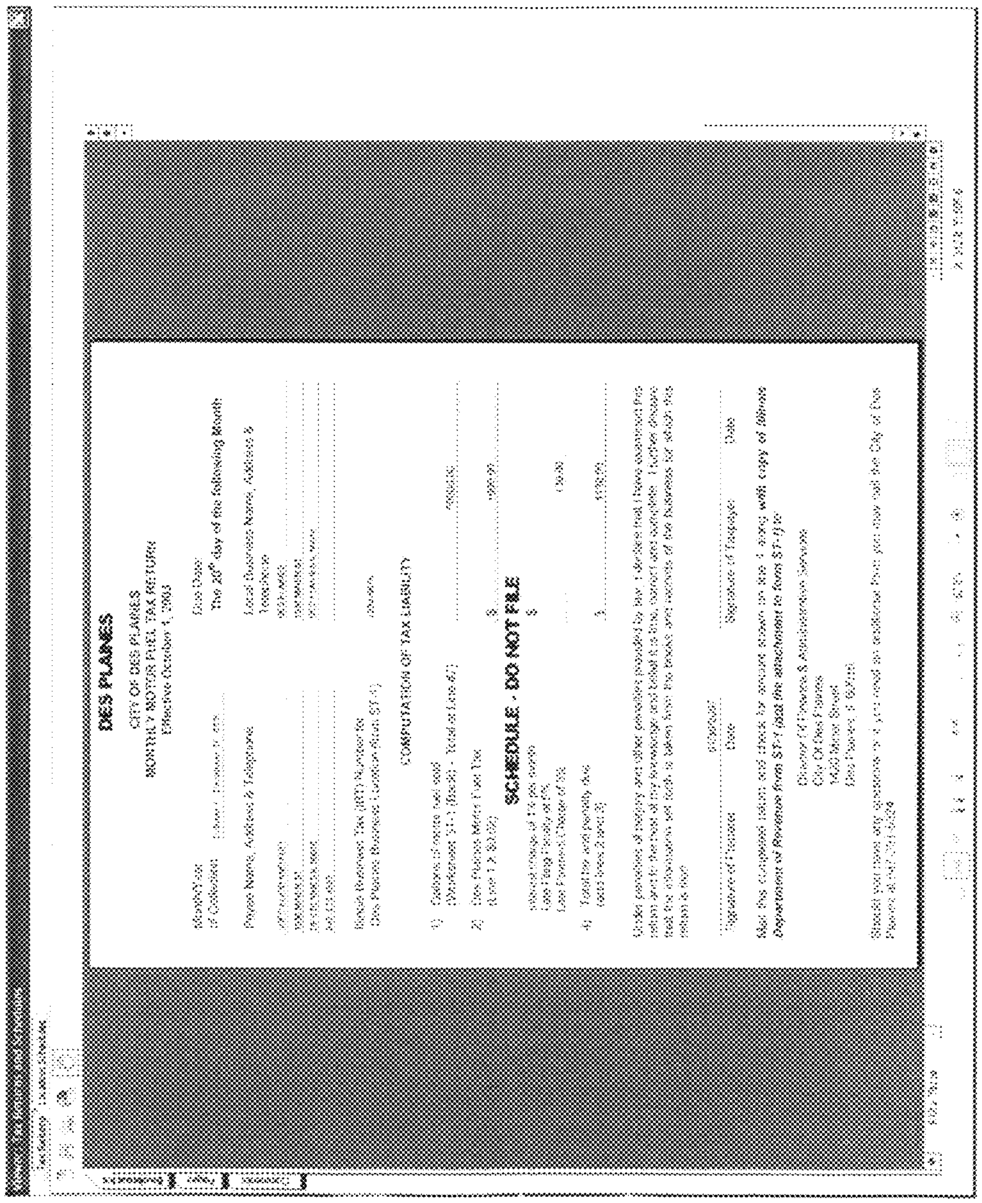
Figure 66:
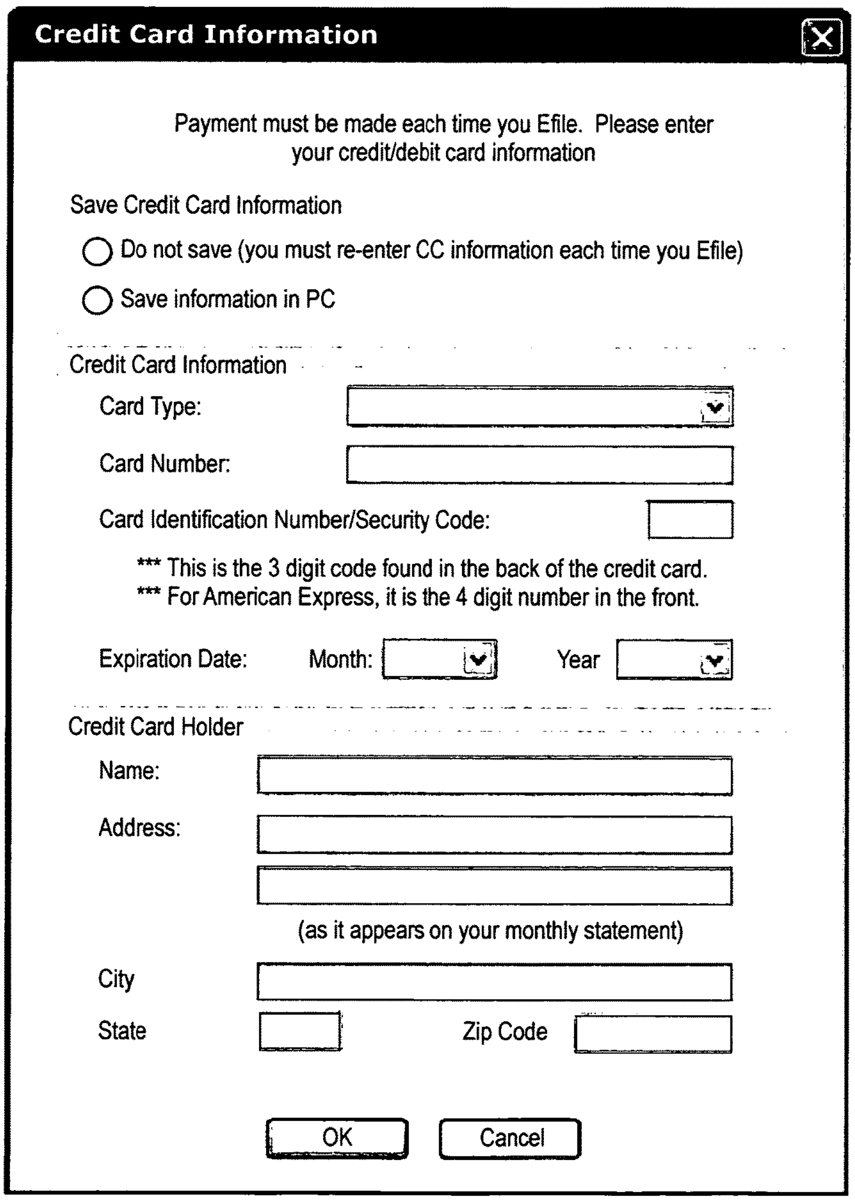
Figure 67:
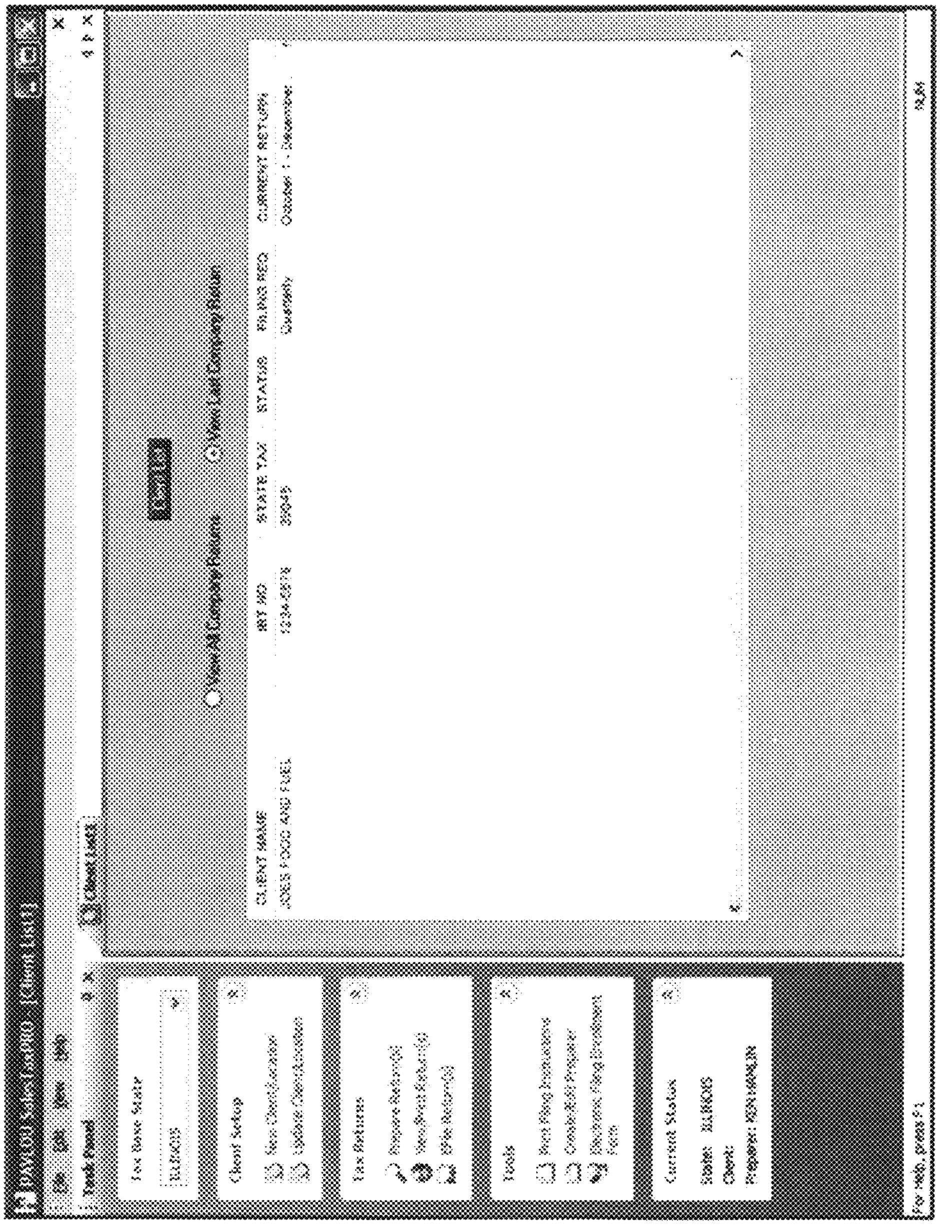

FIGS. 45-67 illustrate an example of preparation of multi-level tax return forms for an exemplary convenience store located in Des Plaines, Ill. in the county of Cook. FIGS. 45-55 illustrate the step-by-step entry of the data into the system in order to perform the various tax returns for the exemplary gas station/convenience store mentioned above. As illustrated in FIGS. 56 and 57, an Illinois Sales and Use Tax Return ST1 is prepared. In this example, because of the merchandise being sold by the business and the location of the business, this particular business is subject to multiple levels of tax. In addition to the Illinois state sales and use tax, a business is also subject to various other levels of tax. For example, the combination gas station/convenience mart located in Des Plaines, Ill. must also file the following tax returns: Cook County Department of Revenue Gasoline Tax Return (FIG. 58); City of Des Plaines Prepared Food and Beverage Sales Tax Return (FIG. 59); and City of Des Plaines Monthly Motor Fuel Tax (FIG. 60). Schedules for the various tax returns that are not suitable for filing are illustrated in FIGS. 61 through 64. After all of the forms have been completed, the user can select the efiling option on the main page as illustrated in FIG. 65. As mentioned above, in order to use an electronic filing option, the user must submit credit card information. Thus, once the efile option is selected, a credit card information window is displayed as illustrated in FIG. 66. After the credit card information is selected, the client information is saved by the system and a user can continue working on the system or can exit the system as illustrated in FIG. 67.

Exemplary Tax Forms

FIGS. 68A through 72D illustrate exemplary tax forms prepared by the system in accordance with the present invention. In particular, FIGS. 68A-68D illustrate Illinois Sales and Use Tax Return ST1. FIG. 69 illustrates a Cook County Department of Review Gasoline Tax Return. FIG. 70 illustrates a City of Des Plaines Prepared Food and Beverage Sales Tax Return. As indicated above, in accordance with an important aspect of the invention, the graphical user interface is configured so that all of the necessary information required for all of the various tax returns required from a business subject to multiple taxing authority is input on the Gui and automatically displayed on the appropriate form.

For example, the text box as illustrated in FIGS. 5E and 5F relate to sales data that is used by multiple forms. For example, total sales data is automatically inserted on line 1 of the Illinois Sale and Use Tax Return (FIG. 68A). Gasoline sales are required on the Cook County Gasoline Tax Return (FIG. 69). Information regarding sales of prepared food is useful in the City of Des Plaines Prepared Food and Beverage Sales Tax Return. Referring back to FIG. 5E, data added with respect to the number of gallons of gasoline sold is useful on line 1 of the City of Des Plaines Monthly Motor Fuel Tax Return. As such, it should be clear that data entered into the graphical user interfaced by the user or from the POS device is filled in in the appropriate form thus facilitating the preparation of tax returns for businesses operating in multi-level taxing structures. As such, all data is entered into the graphical user interface. In accordance with the present invention, the system determines the appropriate tax return forms that are required based on the zip code of the location of the business and fills in the appropriate data into the appropriate places in those tax forms thus greatly facilitating the preparation of tax returns for businesses that operate in multi-level taxing structures.

Obviously, many modifications and variations of the present invention are possible in light of the above teachings. Thus, it is to be understood that, within the scope of the appended claims, the invention may be practiced otherwise than is specifically described above.

We claim:

1. A computer-implemented method of automatically preparing tax returns of a taxable entity comprising:

receiving by a computer tax information associated with the taxable entity, wherein the tax information includes information regarding a location and a transaction associated with the taxable entity;

automatically determining by the computer a plurality of taxing authorities associated with the location and the transaction;

automatically determining by the computer multi-level tax rates associated with the plurality of taxing authorities based on the received tax information;

automatically calculating by the computer one or more tax amounts based on the received tax information and the multi-level tax rates;

automatically determining by the computer multi-level tax return information based on the received tax information and the one or more calculated tax amounts; and transmitting over a computer network the multi-level tax return information to a computer system associated with one of the plurality of taxing authorities associated with the multi-level tax return information.

2. The method of claim 1 further comprising automatically populating a plurality of tax forms with the multi-level tax return information, the plurality of tax forms respectively associated with the plurality of taxing authorities.

3. The method of claim 2 wherein the plurality of taxing authorities includes at least one state taxing authority and at least one local taxing authority.

4. The method of claim 3 wherein the multi-level tax return information is prepared for all taxing authorities the taxable entity is subject to.

5. The method of claim 1 wherein the multi-level tax rates include different types of tax rates.

6. The method of claim 5 wherein the multi-level tax rates include at least one sales tax rate and at least one use tax rate.

7. The method of claim 1, further comprising automatically triggering preparation of sales and use tax returns in response to receipt of sales and use tax information.

8. The method of claim 1 further comprising automatically calculating one or more tax deductions based on the received tax information.

9. The method of claim 1 further comprising:

formatting the multi-level tax return information in a format required by one or more of the plurality of taxing authorities; and transmitting the multi-level tax return information to at least one of the plurality of taxing authorities.

10. The method of claim 9 further comprising:

receiving payment information relating to the multi-level tax return information; and transmitting the received payment information to a payment processor to facilitate payment of at least one of the calculated tax amounts to at least one of the plurality of taxing authorities.

11. The method of claim 9 further comprising polling at least one of the plurality of taxing authorities for confirmation of receipt of the multi-level tax return information.

12. A computer-implemented system for automatically preparing tax returns of a taxable entity comprising:

at least one database for storing tax information associated with the taxable entity;

a software application stored in a non-transitory memory of a computer, the software application is in communication with the at least one database and operation of the software application causes the computer to:

receive tax information associated with the taxable entity, wherein the tax information includes information regarding a location and a transaction associated with the taxable entity;

automatically determine a plurality of taxing authorities associated with the location and the transaction;

automatically determine multi-level tax rates associated with the plurality of taxing authorities based on the received tax information;

calculate one or more tax amounts based on the received tax information and the multi-level tax rates;

determine multi-level tax return information based on the received tax information and the one or more calculated tax amounts; and transmit over a computer network the multi-level tax return information to a further computer associated with one of the plurality of taxing authorities associated with the multi-level tax return information.

13. The computer-implemented system of claim 12 wherein the software application further causes the computer to automatically populate a plurality of tax forms with the multi-level tax return information, the plurality of tax forms respectively associated with the plurality of taxing authorities.

14. The computer-implemented system of claim 13 wherein the plurality of taxing authorities includes at least one state taxing authority and at least one local taxing authority.

15. The computer-implemented system of claim 14 wherein the multi-level tax return information is prepared for all taxing authorities the taxable entity is subject to.

16. The computer-implemented system of claim 12 wherein the multi-level tax rates include different types of tax rates.

17. The computer-implemented system of claim 16 wherein the multi-level tax rates include at least one sales tax rate and at least one use tax rate.

18. The computer-implemented system of claim 12 wherein the software application further causes the computer to automatically trigger preparation of sales and use tax returns in response to receipt of sales and use tax information.

19. The computer-implemented system of claim 12 wherein the software application further causes the computer to calculate one or more tax deductions based on the received tax information.

20. The computer-implemented system of claim 12 wherein the software application further causes the computer to:

format the multi-level tax return information in a format required by one of the plurality of taxing authorities; and transmit the multi-level tax return information to at least one of the plurality of taxing authorities.

21. The computer-implemented system of claim 20 wherein the software application further causes the computer to:

receive payment information relating to the multi-level tax return information; and transmit the received payment information to a payment processor to facilitate payment of at least one of the calculated tax amounts to at least one of the plurality of taxing authorities.

22. The computer-implemented system of claim 20 wherein the software application further causes the computer to poll at least one of the plurality of taxing authorities for confirmation of receipt of the multi-level tax return information.

* * * * *